(12) United States Patent
Kondo

(10) Patent No.: US 8,305,491 B2
(45) Date of Patent: Nov. 6, 2012

(54) INFORMATION PROCESSING APPARATUS, INFORMATION PROCESSING METHOD, AND COMPUTER PROGRAM

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1173 days.

(21) Appl. No.: 11/857,189

(22) Filed: Sep. 18, 2007

(65) Prior Publication Data

US 2008/0088740 A1 Apr. 17, 2008

(30) Foreign Application Priority Data

Oct. 12, 2006 (JP) .................................. 2006-278352

(51) Int. Cl.
*H04N 11/22* (2006.01)
(52) U.S. Cl. ....................... 348/455; 725/571; 725/564
(58) Field of Classification Search .................. 348/445, 348/571, 564
See application file for complete search history.

(56) References Cited

U.S. PATENT DOCUMENTS

| | | | |
|---|---|---|---|
| 5,130,800 A * | 7/1992 | Johnson et al. | ............... 348/564 |
| 5,537,149 A | 7/1996 | Teraoka et al. | |
| 7,266,254 B2 * | 9/2007 | Ishikawa et al. | ............... 382/305 |
| 2004/0218099 A1 * | 11/2004 | Washington | .................. 348/571 |

FOREIGN PATENT DOCUMENTS

| | | |
|---|---|---|
| JP | 9-163260 | 6/1997 |
| JP | 2759727 | 3/1998 |
| JP | 2002-262248 | 9/2002 |
| JP | 2004-159081 | 6/2004 |
| JP | 2005-303796 | 10/2005 |
| JP | 2006-33380 | 2/2006 |

* cited by examiner

*Primary Examiner* — Nasser Goodarzi
*Assistant Examiner* — Jivka Rabovianski
(74) *Attorney, Agent, or Firm* — Oblon, Spivak, McClelland, Maier & Neustadt, L.L.P.

(57) ABSTRACT

An image processing apparatus for displaying an input image on a display, includes an image converting unit for converting the input image into an equiaspect ratio image, the equiaspect ratio image having the same aspect ratio as the input image, having one of a horizontal size and a vertical size thereof equal to one of a horizontal size and a vertical size of a display screen of the display, and having an image size thereof being equal to or smaller than the size of the display screen, an additional image generating unit for generating an additional image from the input image, a combination image generating unit for generating a combination image into which the equiaspect ratio image and the additional image are combined, and a display control unit for causing the display to display the combination image.

16 Claims, 34 Drawing Sheets

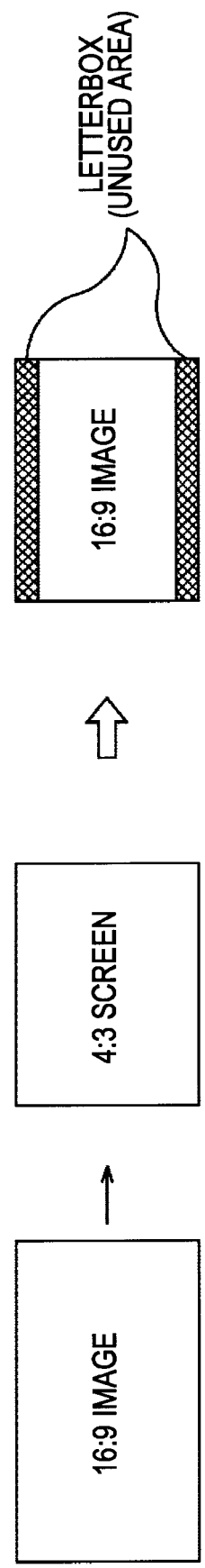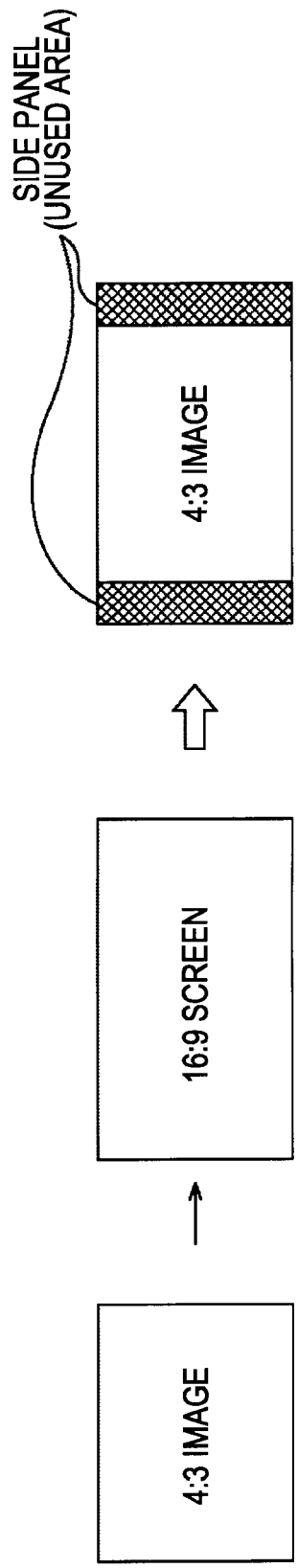

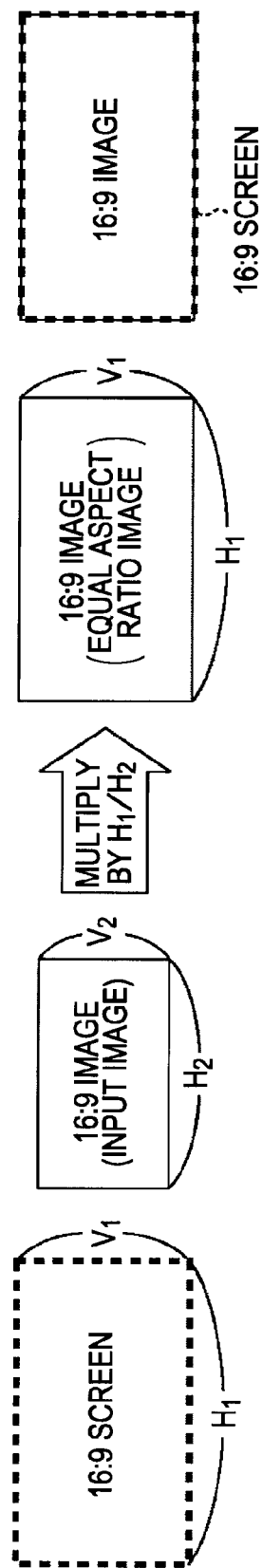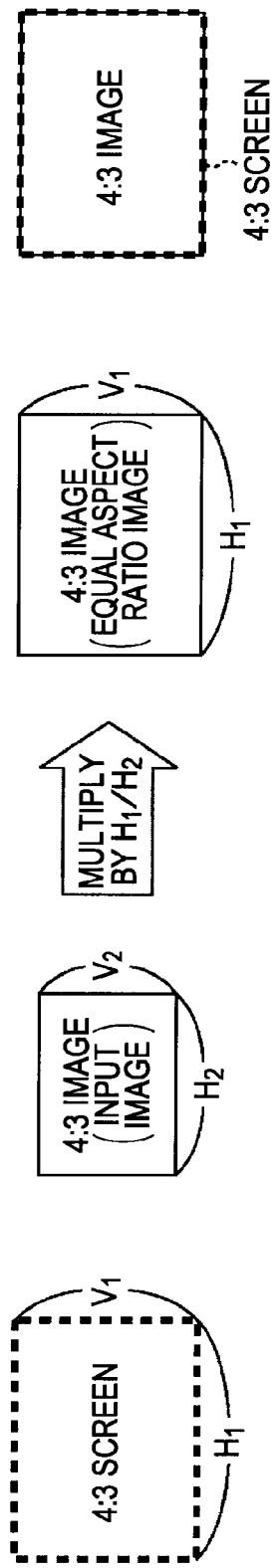

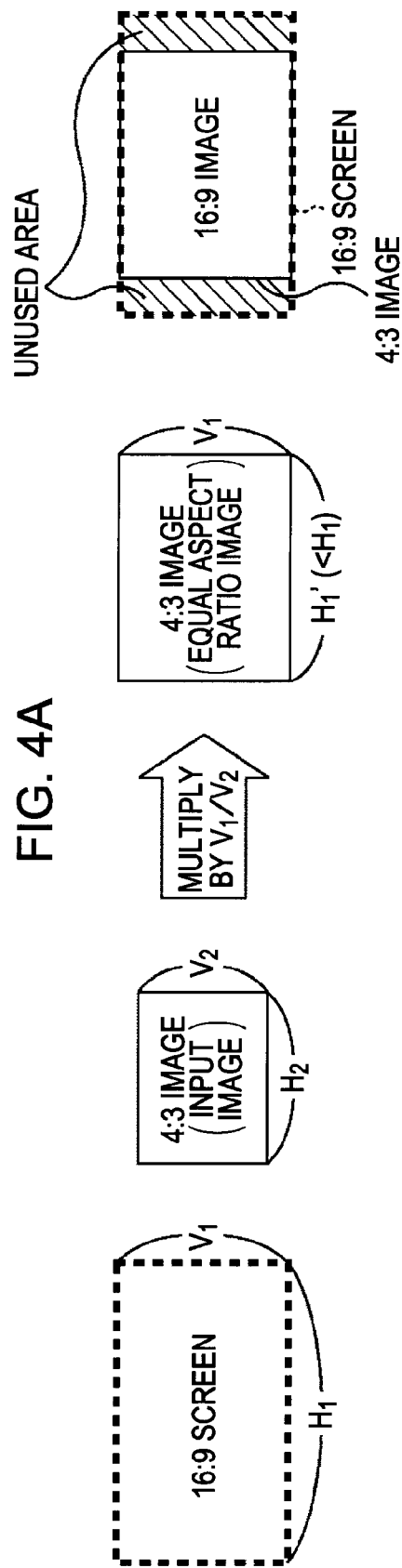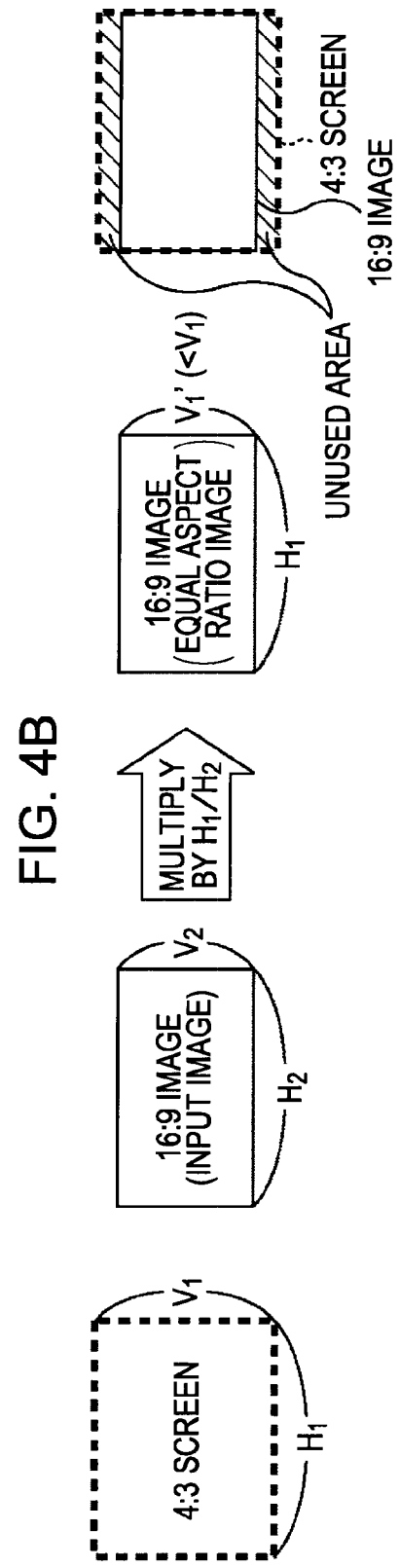

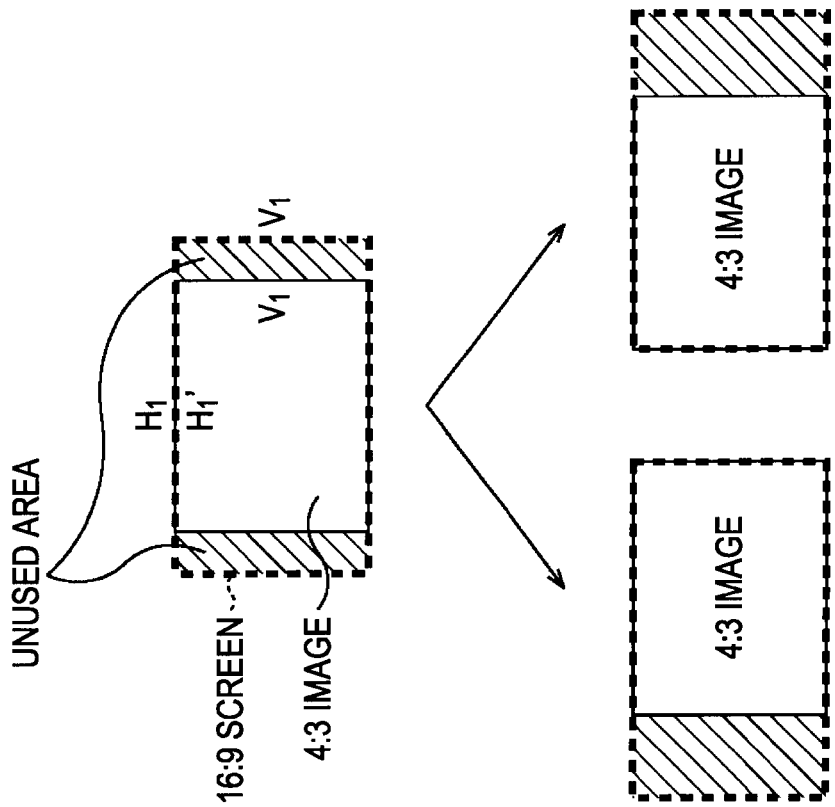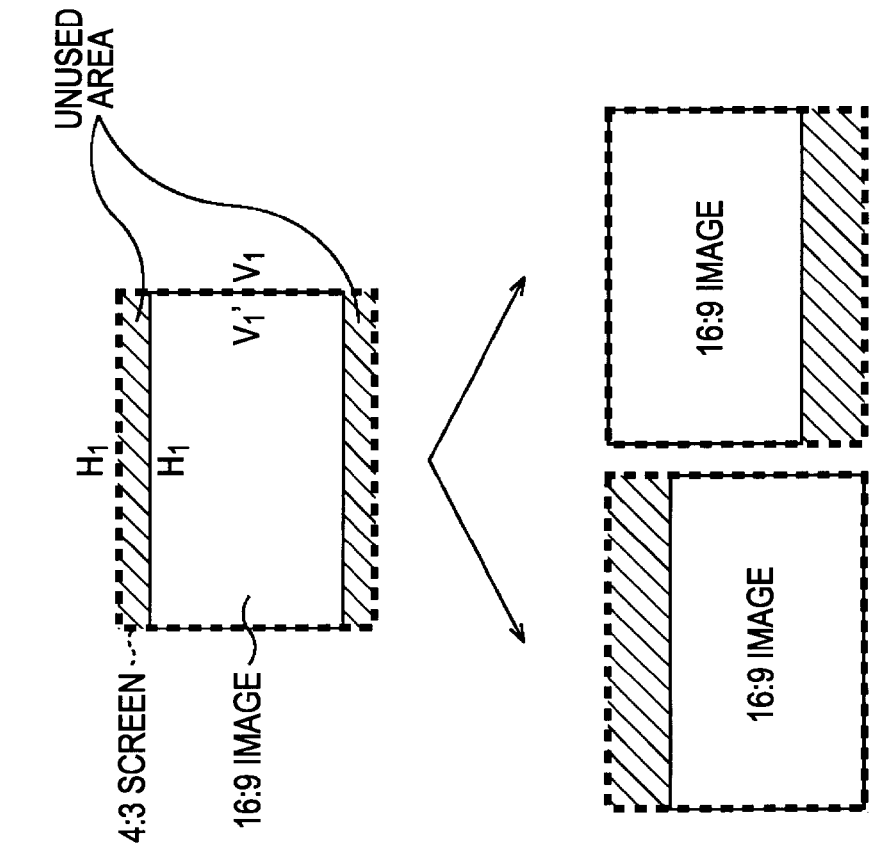

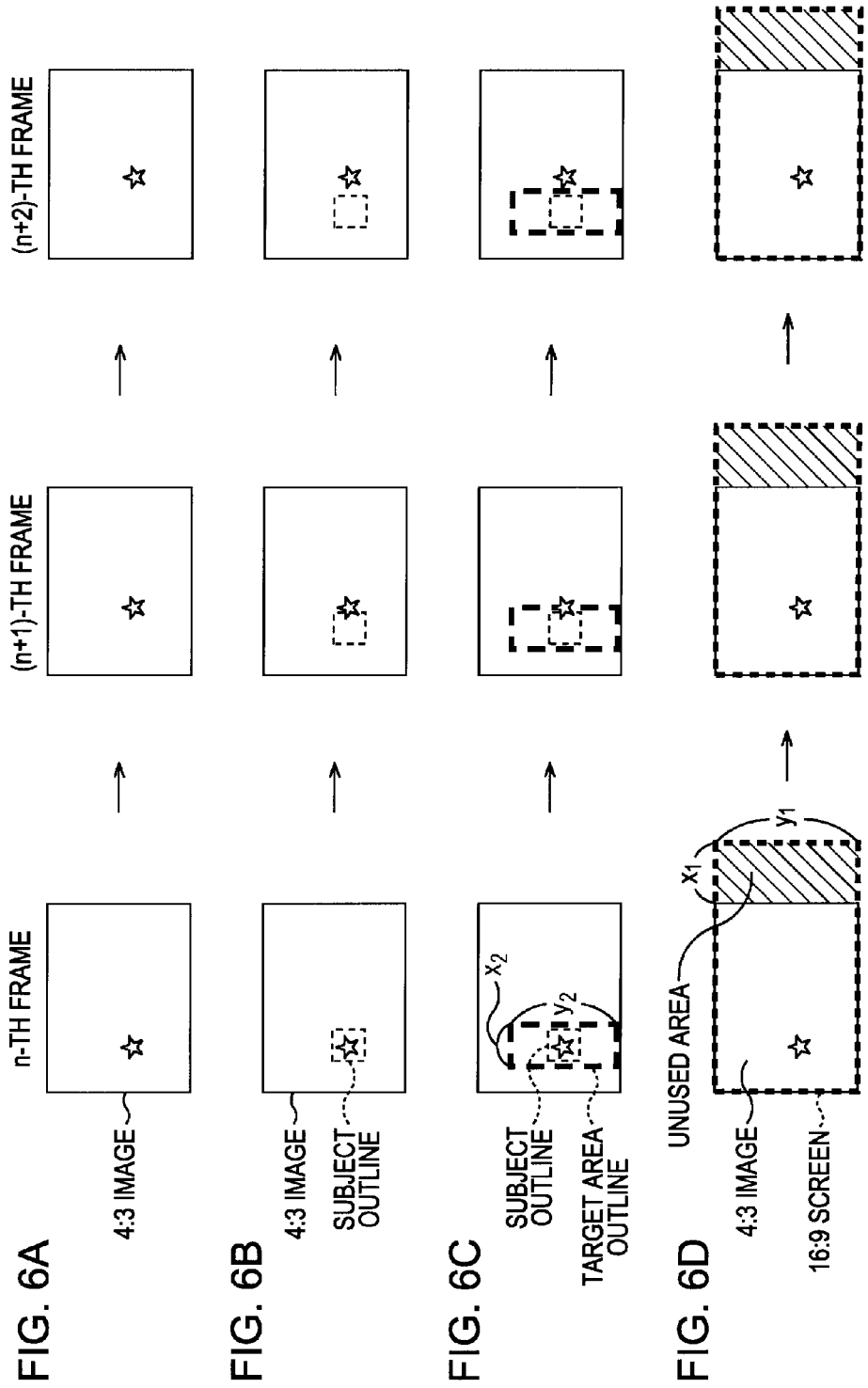

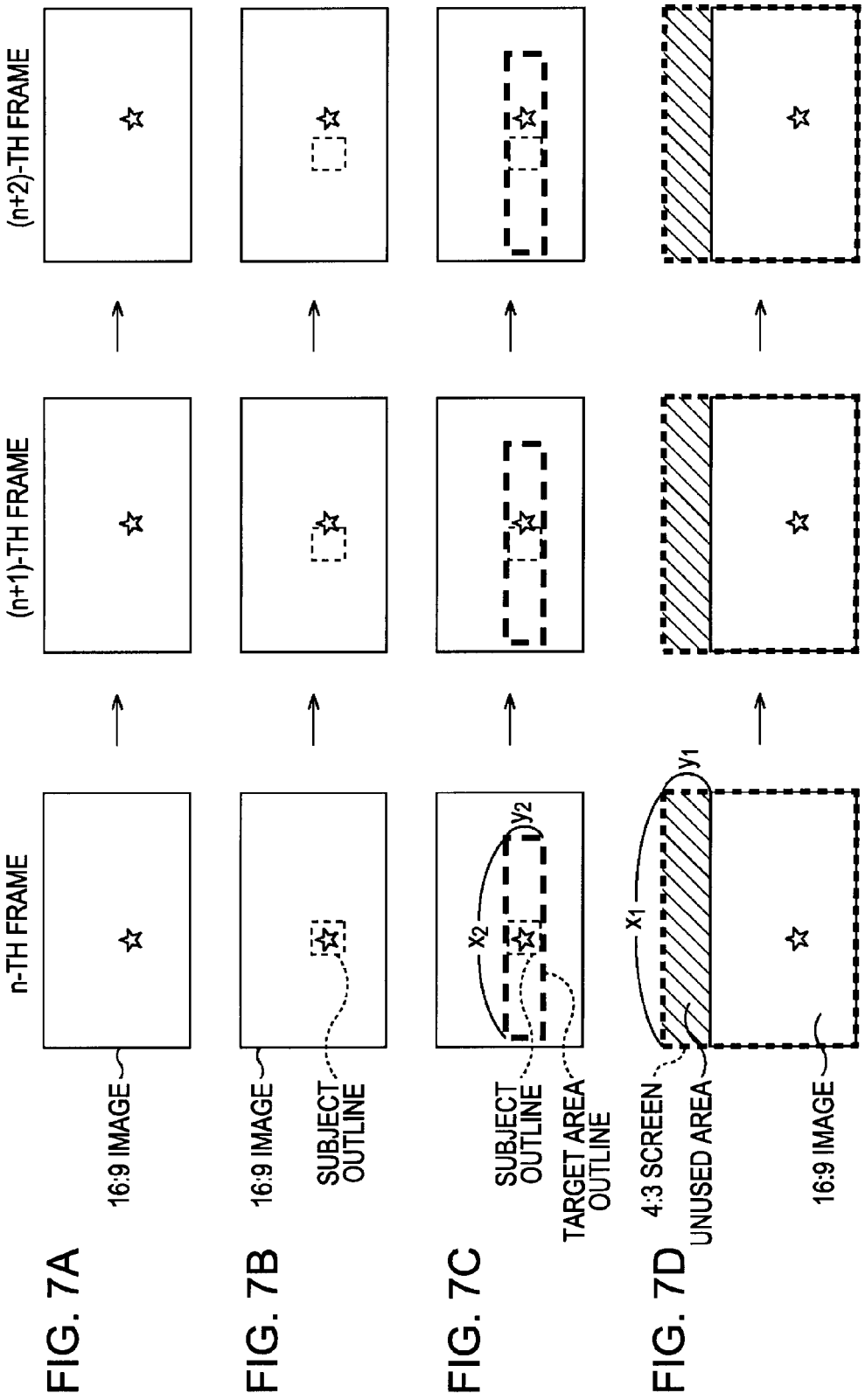

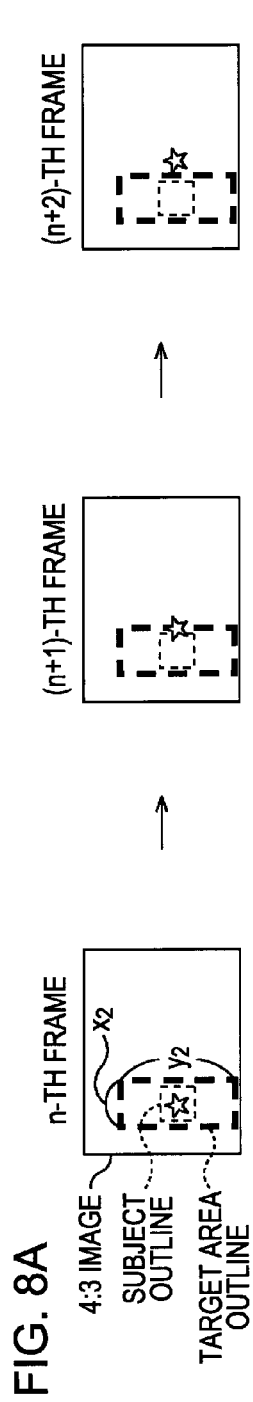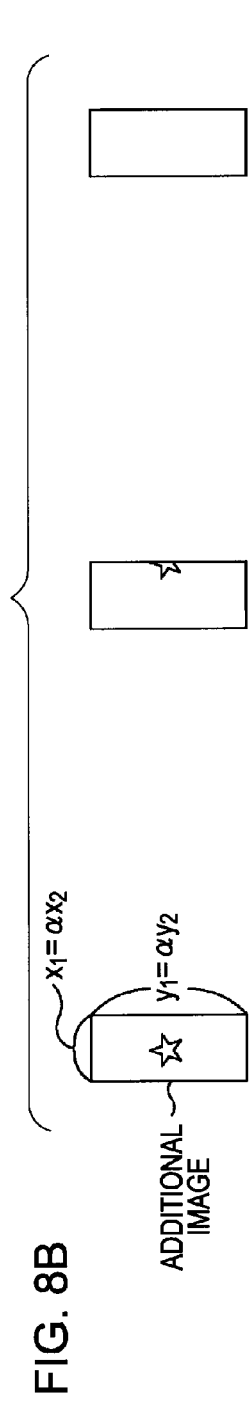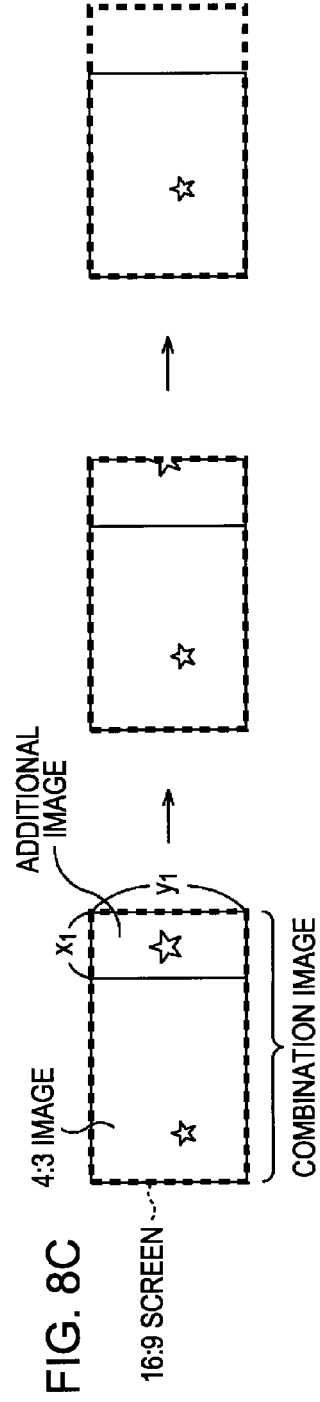

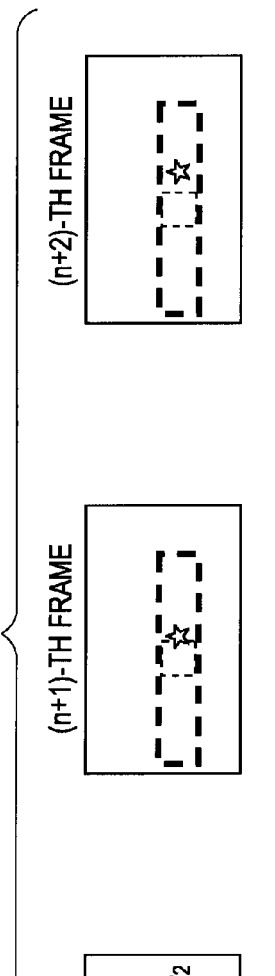
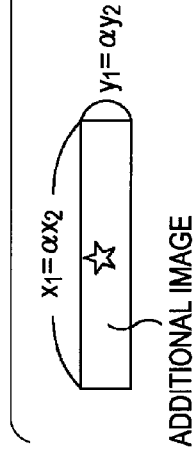
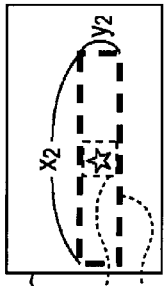
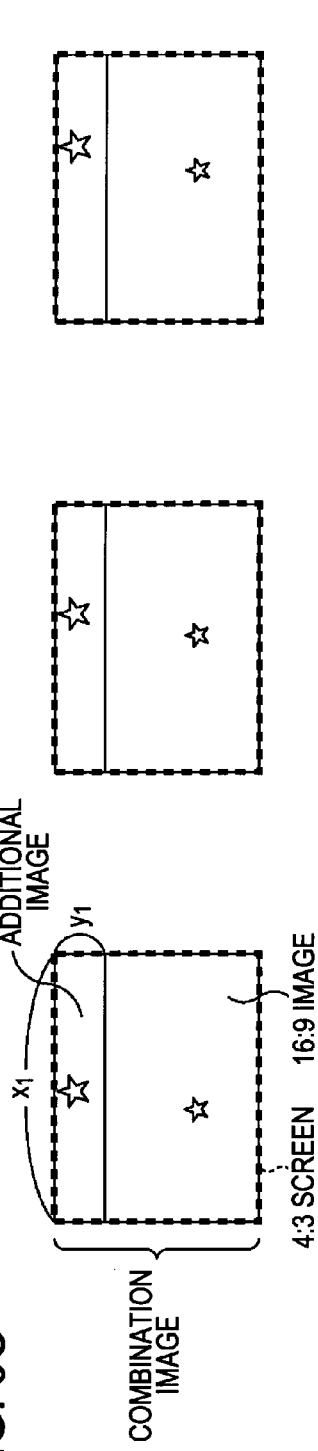

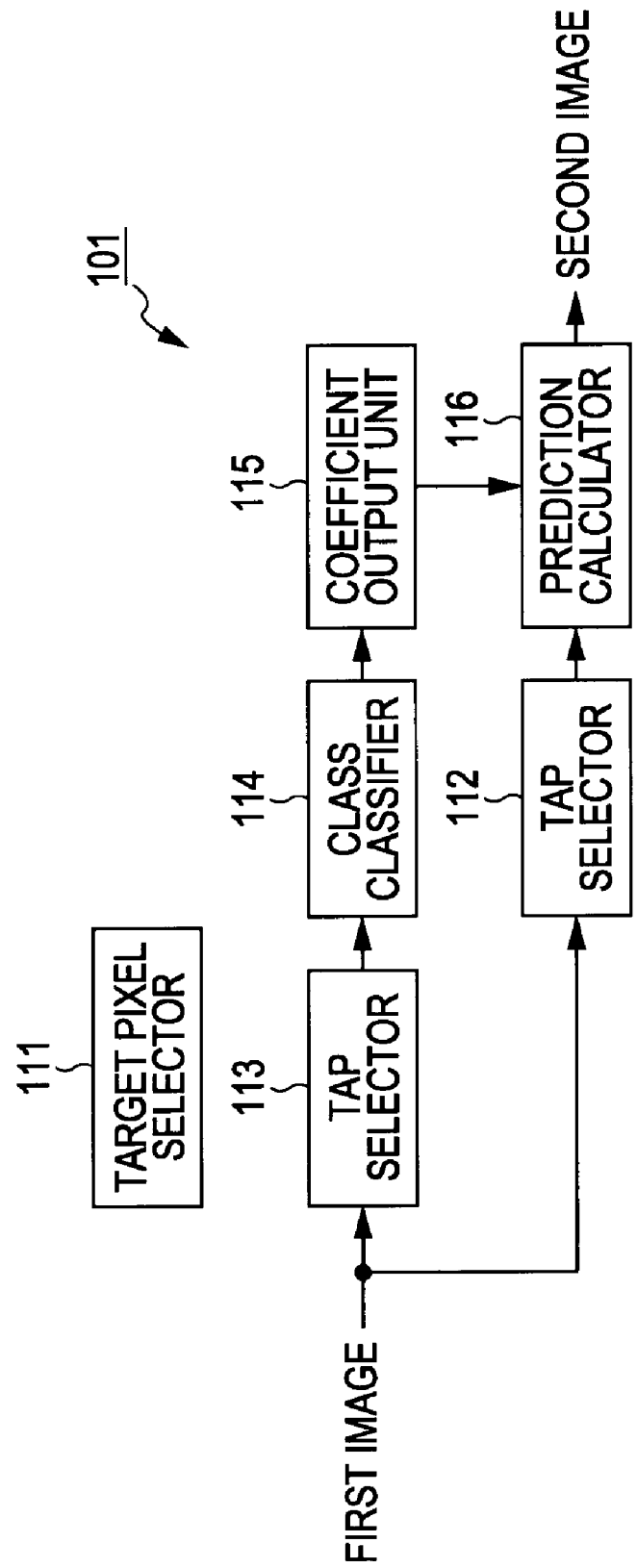

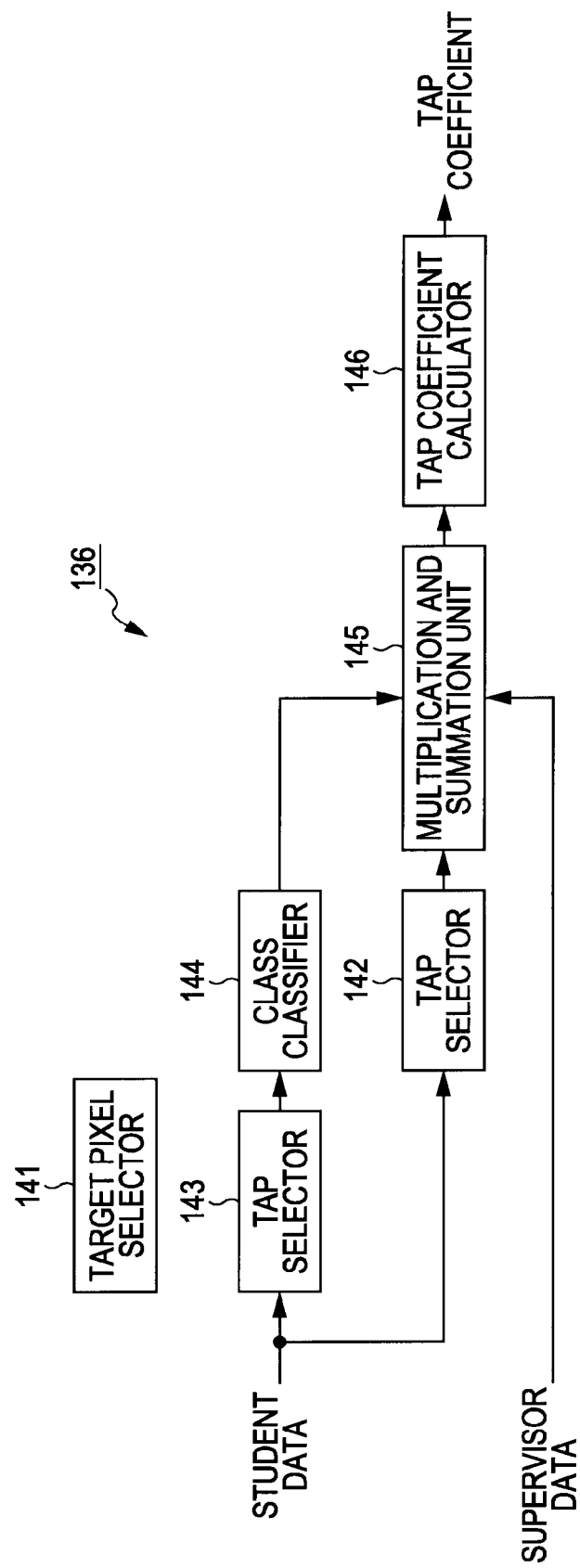

INFORMATION PROCESSING APPARATUS, INFORMATION PROCESSING METHOD, AND COMPUTER PROGRAM

CROSS REFERENCES TO RELATED APPLICATIONS

The present invention contains subject matter related to Japanese Patent Application JP 2006-278352 filed in the Japanese Patent Office on Oct. 12, 2006, the entire contents of which are incorporated herein by reference.

BACKGROUND OF THE INVENTION

1. Field of the Invention

The present invention relates to an image processing apparatus, an image processing method and a computer program and, in particular, to an image processing apparatus, an image processing method and a computer program for displaying a subject in an image on a display screen of a television receiver or the like with similarity of the subject maintained while effectively utilizing the display screen.

2. Description of the Related Art

There are a number of images different in aspect ratio, pixel count, and image format. More specifically, an image having an aspect ratio of 4:3 (hereinafter referred to as 4:3 image) and an image having an aspect ratio of 16:9 (hereinafter referred to as 16:9 image) are in widespread use.

A number of display devices such as TV receiver for displaying an image are different in aspect ratio, pixel count, and screen format of a display screen. More specifically, a display device with a display screen having an aspect ratio of 4:3 (hereinafter referred to as referred to as 4:3 screen) and a display device with a display screen having an aspect ratio of 16:9 (hereinafter referred to as 16:9 screen) are in widespread use.

When an image is displayed on a display screen having the same aspect ratio as that of the image, for example, when the 4:3 image is displayed on the 4:3 screen, or when the 16:9 image is displayed on the 16:9 screen, the image is displayed on the entire screen. Any subject appearing in the image is displayed on the display screen with similarity thereof maintained.

If the aspect ratio of the image is different from the aspect ratio of the display screen, the display screen cannot be fully utilized.

FIGS. 1A and 1B illustrate display examples in which an image is displayed on a display screen having an aspect ratio different from that of the image.

FIG. 1A illustrates the display example in which a 16:9 image is displayed on a 4:3 screen.

When the 16:9 image is displayed on the 4:3 screen, the 16:9 image is associated with black bands thereabove and therebelow on the 4:3 screen due to the difference between the aspect ratio of the entire area of the 16:9 image and the aspect ratio of the 4:3 screen. Such a display is referred to as a letterbox.

When the 16:9 image is displayed on the 4:3 screen, the black bands on the top and the bottom portions of the 4:3 screen become extra areas unused for displaying input image (having a value as information).

FIG. 1B illustrates the display example in which the 4:3 image is displayed on the 16:9 screen.

When the 4:3 image is displayed on the 16:9 screen, the 4:3 image is associated with side panels as black bands on the 16:9 screen due to the difference between the aspect ratio of the entire 4:3 image and the aspect ratio of the 16:9 screen.

When the 4:3 image is displayed on the 16:9 screen, the black bands on the left end and right end portions of the 16:9 screen remains unused.

When the image is displayed on the display screen different in aspect ratio from the image, the extra areas serving no purposes are caused, and the display screen is not fully utilized.

Japanese Patent No. 2759727 discloses one technique. In accordance with the disclosed technique, the 4:3 image is converted into an image having an aspect ratio of 16:9 by expanding the 4:3 image horizontally in order to display the 4:3 image on the 16:9 screen. The 4:3 image is thus displayed on the entire 16:9 screen.

Japanese Unexamined Patent Application Publication No. 9-163260 discloses another technique. In accordance with the disclosed technique, a sub screen is arranged to display a specified portion of a main screen in an expanded or contracted scale. Signals displayed on the main screen and the sub screen are different. In accordance with the disclosed technique, the portion of the main screen is displayed on the sub screen in a picture in picture (PinP) fashion in an expanded or subtracted scale. The portion of the main screen is thus hidden.

Japanese Unexamined Patent Application Publication No. 2006-33380 discloses another technique. In accordance with the disclosed technique, a location of interest in an image being captured by a monitor camera, is displayed on a main screen. The location of interest is displayed on the sub screen external to the main screen. In accordance with the disclosed technique, a substantial area of a display is not used, and thus the display area is not effectively used.

SUMMARY OF THE INVENTION

The extra area (unused area) in the effective screen on the display area of a TV receiver or the like is not preferable because the original definition of the TV receiver is not fully used.

In accordance with Japanese Patent No. 2759727, the aspect ratio of the standard 4:3 image is converted to obtain an input image having an aspect ratio of 16:9, and the image is thus displayed on the entire display screen. In the input image having an aspect ratio of 16:9, a subject photographed in the original standard 4:3 image is changed in aspect ratio. For example, the face of a person may appear wider.

It is not preferable that the subject photographed in the image is displayed in an aspect ratio different from the original aspect ratio, because original information of the subject is lost.

It is thus desirable to display a subject on a display screen in a manner that the entire display screen is effectively used with similarity of the subject maintained.

In accordance with one embodiment of the present invention, an image processing apparatus for displaying an input image on a display, includes an image converting unit for converting the input image into an equiaspect ratio image, the equiaspect ratio image having the same aspect ratio as the input image, having one of a horizontal size and a vertical size thereof equal to one of a horizontal size and a vertical size of a display screen of the display, and having an image size thereof, being equal to or smaller than the size of the display screen and resulting from magnifying the input image with the same magnification applied to the horizontal size and the vertical size of the input image, an additional image generating unit for generating an additional image from the input image when the equiaspect ratio image is displayed on the display with the aspect ratio thereof unchanged, the additional image having an image size within an extra area remaining unused in the displaying of the equiaspect ratio image, a combination image generating unit for generating a combination image into which the equiaspect ratio image obtained by converting each frame or each field of the input image and the additional image generated from the frame or the field of the input image are combined in a manner such that the equiaspect ratio image and the additional image are free from overlapping each other, and a display control unit for causing the display to display the combination image.

In accordance with one embodiment of the present invention, one of an image processing method and a computer program of displaying an input image on a display, includes steps of converting the input image into an equiaspect ratio image, the equiaspect ratio image having the same aspect ratio as the input image, having one of a horizontal size and a vertical size thereof equal to one of a horizontal size and a vertical size of a display screen of the display, and having an image size thereof, being equal to or smaller than the size of the display screen and resulting from magnifying the input image with the same magnification applied to the horizontal size and the vertical size of the input image, generating an additional image from the input image when the equiaspect ratio image is displayed on the display with the aspect ratio thereof unchanged, the additional image having an image size within an extra area remaining unused in the displaying of the equiaspect ratio image, generating a combination image into which the equiaspect ratio image obtained by converting each frame or each field of the input image and the additional image generated from the frame or the field of the input image are combined in a manner such that the equiaspect ratio image and the additional image are free from overlapping each other, and causing the display to display the combination image.

In accordance with embodiments of the present invention, the input image is converted into the equiaspect ratio image. The equiaspect ratio image has the same aspect ratio as the input image, has one of the horizontal size and the vertical size thereof equal to one of the horizontal size and the vertical size of the display screen of the display, and has the image size thereof, being equal to or smaller than the size of the display screen and resulting from magnifying the input image with the same magnification applied to the horizontal size and the vertical size of the input image. The additional image is generated from the input image when the equiaspect ratio image is displayed on the display with the aspect ratio thereof unchanged. The additional image has the image size within the extra area remaining unused in the displaying of the equiaspect ratio image. The combination image is combined from the equiaspect ratio image obtained by converting each frame or each field of the input image and the additional image generated from the frame or the field of the input image in a manner such that the equiaspect ratio image and the additional image are free from overlapping each other. The display displays the combination image.

The computer program may be supplied via a transmission medium or may be recorded on a recording medium to be supplied.

In accordance with embodiments of the present invention, a subject in the image may be displayed with the display screen effectively used in a manner free from distortion.

BRIEF DESCRIPTION OF THE DRAWINGS

FIGS. 1A and 1B illustrate display examples in which an image is displayed on a display screen different in aspect ratio from the image;

FIGS. 3A and 3B illustrate a image converter in an image processing apparatus of FIG. 2;

FIGS. 4A and 4B illustrate the image converter in the image processing apparatus of FIG. 2;

FIGS. 5A and 5B illustrate display examples in which an equiaspect ratio image is displayed on a display screen different in aspect ratio from the equiaspect ratio image;

FIGS. 6A-6D illustrate display examples in which a target area setter sets a target area;

FIGS. 7A-7D illustrate display examples in which the target area setter sets the target area;

FIGS. 8A-8C illustrate a process of an additional image generator;

FIGS. 9A-9C illustrate a process of the additional image generator;

FIG. 24 is a block diagram illustrating an image conversion apparatus for converting an image in accordance with class classification adaptive process;

FIG. 27 is a block diagram illustrating the learning unit in a learning apparatus;

DESCRIPTION OF THE PREFERRED EMBODIMENTS

Figure 2:
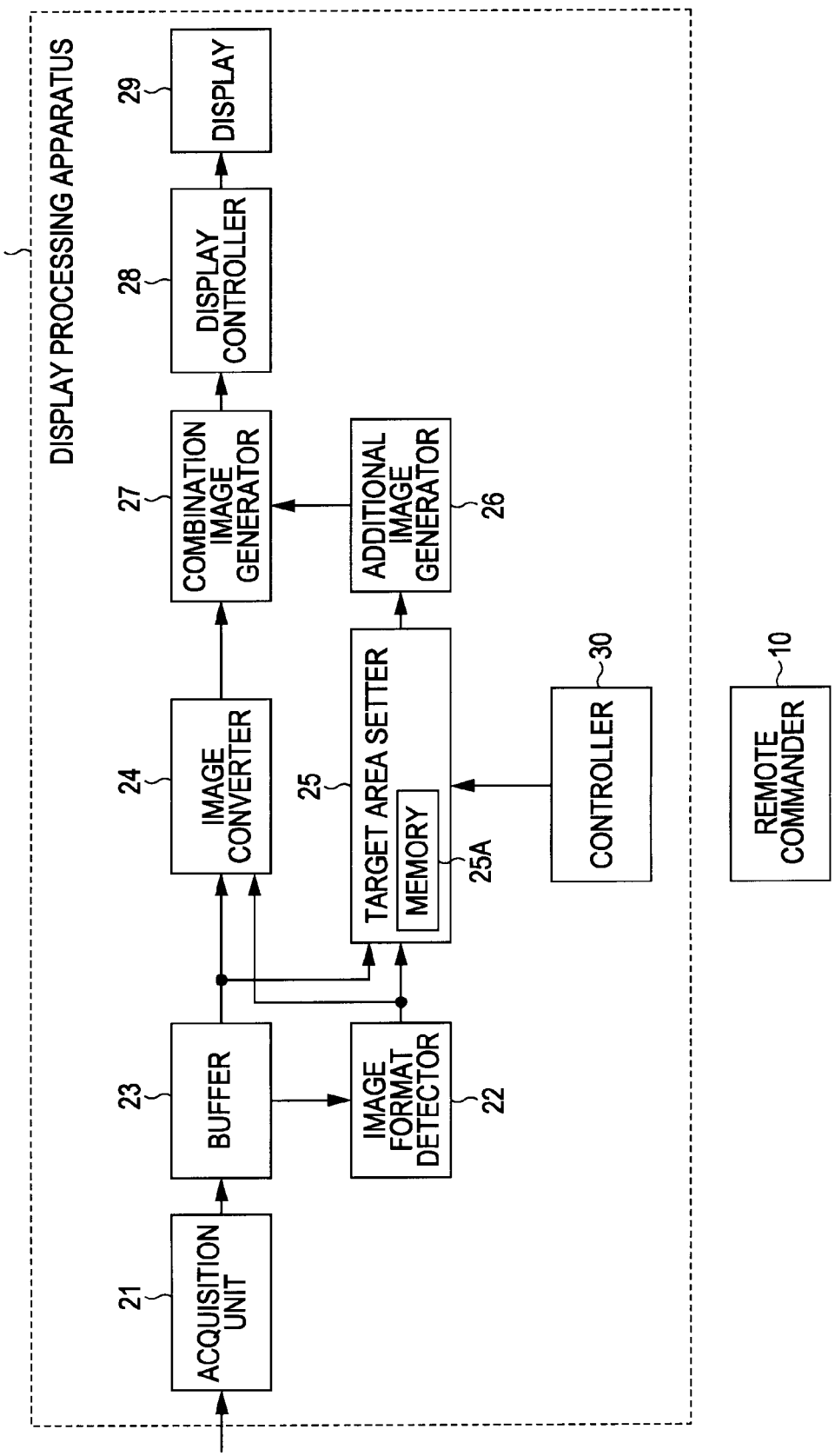
FIG. 2 is a block diagram illustrating a display system in accordance with one embodiment of the present invention.

Before describing an embodiment of the present invention, the correspondence between the features of the present invention and an embodiment disclosed in the specification or the drawings of the invention is discussed below. This statement is intended to assure that embodiments supporting the claimed invention are described in this specification or the drawings. Thus, even if an embodiment is described in the specification or the drawings, but not described as relating to a feature of the invention herein, that does not necessarily mean that the embodiment does not relate to that feature of the invention. Conversely, even if an embodiment is described herein as relating to a certain feature of the invention, that does not necessarily mean that the embodiment does not relate to other features of the invention.

In accordance with one embodiment of the present invention, an image processing apparatus (for example, display processing apparatus 20 of FIG. 2) for displaying an input image on a display (for example, display 29 of FIG. 2), includes an image converting unit (for example, image converter 24 of FIG. 2) for converting the input image into an equiaspect ratio image, the equiaspect ratio image having the same aspect ratio as the input image, having one of a horizontal size and a vertical size thereof equal to one of a horizontal size and a vertical size of a display screen of the display, and having an image size thereof, being equal to or smaller than the size of the display screen and resulting from magnifying the input image with the same magnification applied to the horizontal size and the vertical size of the input image, an additional image generating unit (for example, additional image generator 26 of FIG. 2) for generating an additional image from the input image when the equiaspect ratio image is displayed on the display with the aspect ratio thereof unchanged, the additional image having an image size within an extra area remaining unused in the displaying of the equiaspect ratio image, a combination image generating unit (for example, combination image generator 27 of FIG. 2) for generating a combination image into which the equiaspect ratio image obtained by converting each frame or each field of the input image and the additional image generated from the frame or the field of the input image are combined in a manner such that the equiaspect ratio image and the additional image are free from overlapping each other, and a display control unit (for example, display controller 28 of FIG. 2) for causing the display to display the combination image.

The image processing apparatus may further include a target area setting unit (for example, target area setter 25 of FIG. 2) for setting as a target area the part of the input image, the part of the input image being expanded or contracted to generate the additional image.

The image processing apparatus may further include a tracking unit (for example, tracking unit 25B of FIG. 16) for tracking a subject appearing in the part of the input image, wherein the target area setting unit sets as the target area an area containing the subject being tracked by the tracking unit.

Figure 12:
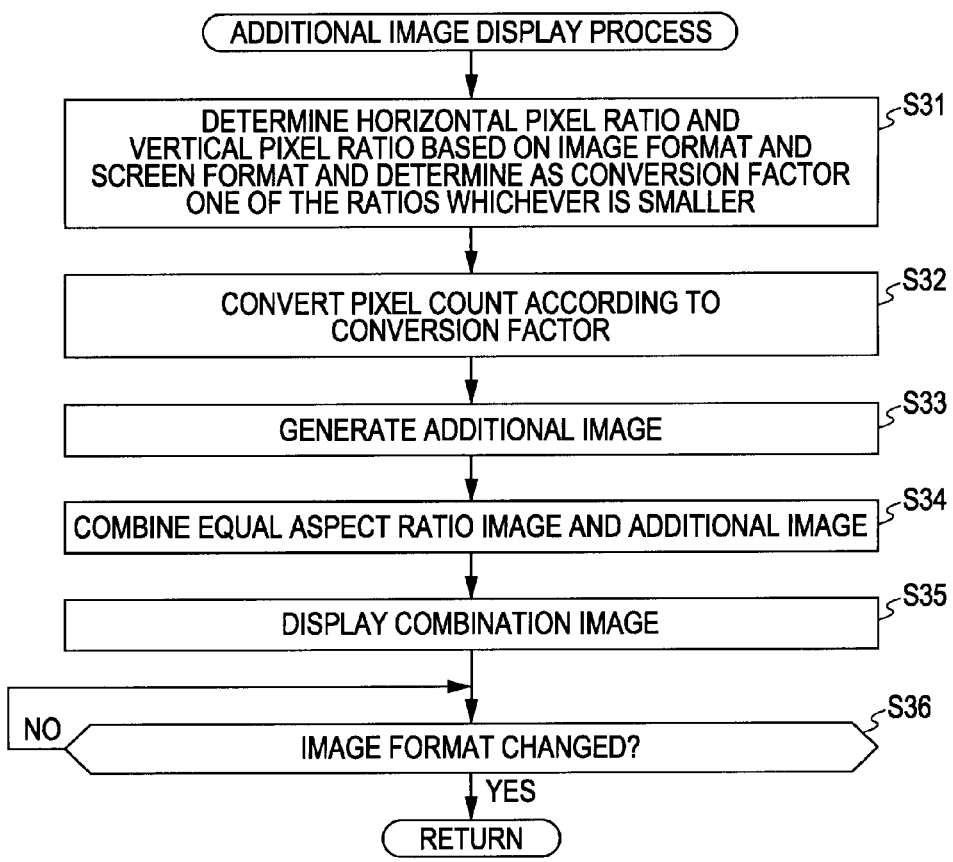
FIG. 12 is a flowchart illustrating an additional image display process.

In accordance with one embodiment of the present invention, one of an image processing method and a computer program of displaying an input image on a display (for example, display 29 of FIG. 2), includes steps of converting the input image into an equiaspect ratio image, the equiaspect ratio image having the same aspect ratio as the input image, having one of a horizontal size and a vertical size thereof equal to one of a horizontal size and a vertical size of a display screen of the display, and having an image size thereof, being equal to or smaller than the size of the display screen and resulting from magnifying the input image with the same magnification applied to the horizontal size and the vertical size of the input image (for example, in step S32 of FIG. 12), generating an additional image from the input image when the equiaspect ratio image is displayed on the display with the aspect ratio thereof unchanged, the additional image having an image size within an extra area remaining unused in the displaying of the equiaspect ratio image (for example, in step S33 of FIG. 12), generating a combination image into which the equiaspect ratio image obtained by converting each frame or each field of the input image and the additional image generated from the frame or the field of the input image are combined in a manner such that the equiaspect ratio image and the additional image are free from overlapping each other (for example, in step S34 of FIG. 12) and causing the display to display the combination image (for example, in step S35 of FIG. 12).

The embodiments of the present invention are described below with reference to the drawings.

For simplicity of explanation of this specification, each pixel has horizontal and vertical lengths equal to each other.

FIG. 2 illustrates a display system in accordance with one embodiment of the present invention. The system herein refers to a logical set of a plurality of apparatuses and it is not important whether or not the apparatuses are housed in the same casing.

The display system of FIG. 2 includes a remote commander 10 and a display processing apparatus 20.

A user operates the remote commander 10 to specify a subject in an image displayed on the display processing apparatus 20 or to switch on and off the display processing apparatus 20, for example. The remote commander 10 transmits an operation signal in the form of an electromagnetic wave such as infrared light responsive to an operation of the user to the display processing apparatus 20.

The display processing apparatus 20 is a TV receiver as an image processing apparatus, for example, and includes an acquisition unit 21, an image format detector 22, a buffer 23, an image converter 24, a target area setter 25, an additional image generator 26, a combination image generator 27, a display controller 28, a display 29 and a controller 30.

The acquisition unit 21 receives input data containing moving images, such as data broadcast from a terrestrial broadcasting system, and data reproduced from a recording medium such as a DVD. The acquisition unit 21 then supplies the received data to the buffer 23.

The image format detector 22 detects an image format such as an aspect ratio of an image contained in the data stored on the buffer 23. The image format detector 22 controls the image converter 24 and the target area setter 25 in accordance with the image format and a screen format of a display screen of the display 29.

The image format detector 22 pre-stores the screen format of the display screen of the display 29. The screen format include an aspect ratio of the display screen of the display 29 and a screen size of the display screen of the display 29 represented by the number of pixels (pixel count) in a horizontal direction and a vertical direction. The display 29 may be arranged to be external to the display processing apparatus 20. In such a case, the external display 29 supplies the screen format thereof to the image format detector 22.

The image contained in the data stored on the buffer 23 may have any screen format. For simplicity of explanation, the image is one of the two types described above, namely, the 4:3 image, and the 16:9 image.

Furthermore, the screen format detected by the image format detector 22 contains the aspect ratio and information providing the image size of the input image represented in the horizontal pixel count and the vertical pixel count.

When the information regarding the image format is contained in the broadcast data, the image format detector 22 detects the image format from the broadcast data.

The buffer 23 temporarily stores the data supplied from the acquisition unit 21, containing the input image. The input image contained in the data stored on the buffer 23 is read by frame and then supplied to each of the image converter 24 and the target area setter 25. In other words, the image converter 24 and the target area setter 25 are supplied with the same frame of input image.

Alternatively, the buffer 23 may supply the image converter 24 and the target area setter 25 with the input image by field.

The image converter 24 under the control of the image format detector 22 performs size conversion, expanding or contacting the input image from the buffer 23. An equiaspect ratio image obtained through the size conversion is then supplied to the combination image generator 27.

More specifically, the image converter 24 performs the size conversion process, converting the input image from the buffer 23 into an equiaspect ratio image, the equiaspect ratio image having the same aspect ratio as the input image, having one of a horizontal size and a vertical size thereof equal to one of a horizontal size and a vertical size of a display screen of the display, and having an image size thereof, being equal to or smaller than the size of the display screen and resulting from magnifying the input image with the same magnification applied to the horizontal size and the vertical size of the input image. The resulting equiaspect ratio image is supplied to the combination image generator 27.

The target area setter 25 under the control of the image format detector 22 and the controller 30 sets part of the input image from the buffer 23 as a target area to be expanded or contracted in size conversion for the additional image generator 26 to generate an additional image. The target area setter 25 then supplies the target area to the additional image generator 26.

The target area setter 25 includes a memory 25A. As necessary, the memory 25A stores data needed by the target area setter 25 in operation.

The equiaspect ratio image from the image converter 24 may be displayed on the display 29 with the aspect ratio thereof unchanged. On the display screen of the display 29, the additional image generator 26 generates from the target area supplied from the target area setter 25 the additional image having the same image size as the extra area unused in the displaying of the equiaspect ratio image, and then supplies the additional image to the combination image generator 27.

More specifically, when the equiaspect ratio image is displayed on the display 29 with the aspect ratio thereof unchanged, the additional image generator 26 generates from the target area supplied from the target area setter 25 the additional image having the same image size as the extra area unused in the displaying of the equiaspect ratio image, and then supplies the additional image to the combination image generator 27.

The combination image generator 27 generates a combination image by combining an equiaspect ratio image obtained by size converting the input image read by frame (or field) from the buffer 23 and an additional image generated from the target area as part of the input image of that frame (or field). The equiaspect ratio image and the additional image are combined in a manner free from overlapping. The combination image is then supplied to the display controller 28.

More specifically, the combination image generator 27 combines the equiaspect ratio image supplied from the image converter 24 and the additional image generated from the target area set in the frame of the input image converted at the same aspect ratio and then supplied from the additional image generator 26 in an overlap free fashion and then supplies the resulting combination image to the display controller 28.

The display controller 28 controls the display 29, thereby causing the display 29 to display the combination image from the combination image generator 27 thereon.

The display 29 includes a cathode ray tube (CRT), a liquid-crystal display (LCD), or the like and under the control of the display controller 28 displays the combination image on the display screen thereof.

The controller 30 controls each element in the display processing apparatus 20. The controller 30 receives an operation signal transmitted from the remote commander 10 and controls the target area setter 25 and other elements in response to the operation signal.

A process of the image converter 24 of FIG. 2 is described below with reference to FIGS. 3A and 3B and FIGS. 4A and 4B.

As previously discussed, the image converter 24 performs the size conversion process, converting the input image from the buffer 23 into the equiaspect ratio image, the equiaspect ratio image having the same aspect ratio as the input image, having one of the horizontal size and the vertical size thereof equal to one of the horizontal size and the vertical size of the display screen of the display 29, and having an image size thereof, being equal to or smaller than the size of the display screen of the display 29 and resulting from magnifying the input image with the same magnification applied to the horizontal size and the vertical size of the input image.

In accordance with the image format and the screen format, the image format detector 22 determines whether the aspect ratio of the input image equals the aspect ratio of the display screen of the display 29.

If the aspect ratio of the input image equals the aspect ratio of the display screen of the display 29, the image format detector 22 controls the image converter 24 so that the input image is converted into the equiaspect ratio image having the same image size as the screen size of the display screen and having the same aspect ratio as the input image as shown in FIGS. 3A and 3B. If the aspect ratio of the input image fails to equal the aspect ratio of the display screen of the display 29, the image format detector 22 controls the image converter 24 so that the input image is converted into the equiaspect ratio image having the image size smaller than the screen size of the display screen and having the same aspect ratio as the input image as shown in FIGS. 4A and 4B.

More specifically, if the aspect ratio of the input image equals the aspect ratio of the display, the image format detector 22 determines a magnification (hereinafter referred to as conversion factor) $H_1/H_2$ to make a horizontal pixel count $H_2$ of the input image equal to a horizontal pixel count $H_1$ of the display screen as shown in FIGS. 3A and 3B. Let $H_1$ represent the horizontal pixel count as one of a horizontal size and a vertical size of the display screen and $H_2$ represent the vertical pixel count as one of a horizontal size and a vertical size of the input image. The image format detector 22 thus controls the image converter 24 to multiply the horizontal pixel count and the vertical pixel count of the input image by the conversion factor $H_1/H_2$.

The image converter 24 under the control of the image format detector 22 multiplies the horizontal pixel count and the vertical pixel count of the input image from the buffer 23 by the conversion factor $H_1/H_2$. In this way, the input image is converted into the equiaspect ratio image. The equiaspect ratio image has one of the horizontal pixel count and the vertical pixel count equal to one of the horizontal pixel count and the vertical pixel count of the display screen, and has the image size equal to the screen size of the display screen and resulting from magnifying each of the horizontal pixel count and the vertical pixel count of the input image by the conversion factor $H_1/H_2$.

Since the aspect ratio of the input image equals the aspect ratio of the display screen, a ratio $V_1/V_2$ of the vertical pixel count $V_1$ of the display screen to the vertical pixel count $V_2$ of the input image equals the conversion factor $H_1/H_2$ (ratio $V_1/V_2$ of the vertical pixel count $V_1$ of the display screen to the vertical pixel count $V_2$ of the input image may also be referred to as a conversion factor).

By multiplying each of the horizontal pixel count and the vertical pixel count of the input image ($H_2 \times V_2$) by the conversion factor $H_1/H_2$ (=$V_1/V_2$), the equiaspect ratio image having the horizontal pixel count and the vertical pixel count ($H_1 \times V_1$) results. The equiaspect ratio image has one of the horizontal size and the vertical size thereof equal to one of the horizontal size and the vertical size of the display screen, and has the image size equal to the screen size of the display screen, and being obtained by multiplying each of the horizontal pixel count and the vertical pixel count of the input image by the same conversion factor $H_1/H_2$.

FIG. 3A illustrates the equiaspect ratio image in which the aspect ratio of the input image equals the aspect ratio of the display screen, namely, 16:9.

FIG. 3B illustrates the equiaspect ratio image in which each of the aspect ratio of the input image and the aspect ratio of the display screen is 4:3.

If the aspect ratio of the input image is equal to the aspect ratio of the display screen, the image converter 24 converts the input image in size. The image of the equiaspect ratio image, for example, the horizontal pixel count and the vertical pixel count match the screen size of the display screen. The equiaspect ratio image is thus displayed on the display 29 with the entire display screen effectively used.

Since the equiaspect ratio image is obtained by magnifying the horizontal size and the vertical size of the input image by the conversion factor $H_1/H_2$, the aspect ratio of the equiaspect ratio image equals the aspect ratio of the input image. More specifically, the equiaspect ratio image becomes a 4:3 image if the input image is a 4:3 image, and the equiaspect ratio image becomes a 16:9 image if the input image is a 16:9 image. As a result, any subject in the input image is shown with similarity maintained in a manner free from distortion.

If the aspect ratio of the input image as the target image is not equal to the aspect ratio of the display screen, the image format detector 22 determines a conversion factor K. The conversion factor K is a magnification that causes one of the horizontal pixel count and the vertical pixel count of the input image to equal the pixel count of the display screen in the corresponding direction based on the aspect ratio of the input image and the aspect ratio of the display screen as shown in FIGS. 4A and 4B. The image format detector 22 controls the image converter 24 to multiply each of the horizontal pixel count and the vertical pixel count of the input image by the conversion factor K.

More specifically, if the aspect ratio of the input image is not equal to the aspect ratio of the display screen, the image format detector 22 determines a horizontal to horizontal ratio $H_1/H_2$ of the horizontal pixel count $H_1$ of the display screen to the horizontal pixel count $H_2$ of the input image and a vertical to vertical ratio of $V_1/V_2$ of the vertical pixel count $V_1$ of the display screen to the vertical pixel count $V_2$ of the input image. The image format detector 22 determines as the conversion factor K one of the horizontal to horizontal ratio $H_1/H_2$ and the vertical to vertical ratio of $V_1/V_2$ whichever is smaller. The image format detector 22 controls the image converter 24 to multiply each of the horizontal pixel count and the vertical pixel count of the input image by the conversion factor K.

The aspect ratio of the display screen might be 16:9 (=$H_1$:$V_1$), and the aspect ratio of the input image might be 4:3 (=$H_2$:$V_2$) as shown in FIG. 4A. Let "a" represent a constant determined by the pixel count of each of the display screen and the input image, and the horizontal to horizontal ratio $H_1/H_2$ becomes 16/4×a, and the vertical to vertical ratio $V_1/V_2$ becomes 9/3×a. The vertical to vertical ratio $V_1/V_2$ is smaller than the horizontal to horizontal ratio $H_1/H_2$, and the vertical to vertical ratio $V_1/V_2$ becomes the conversion factor K.

The aspect ratio of the display screen might be 4:3 (=$H_1$:$V_1$), and the aspect ratio of the input image might be 16:9 (=$H_2$:$V_2$) as shown in FIG. 4B. Let "b" represent a constant determined by the pixel count of each of the display screen and the input image, and the horizontal to horizontal ratio $H_1/H_2$ becomes 4/16×b, and the vertical to vertical ratio $V_1/V_2$ becomes 3/9×b. The horizontal to horizontal ratio $H_1/H_2$ is smaller than the vertical to vertical ratio $V_1/V_2$, and the horizontal to horizontal ratio $H_1/H_2$ becomes the conversion factor K.

The image converter 24 under the control of the image format detector 22 multiplies each of the horizontal pixel count and the vertical pixel count of the input image from the reader unit 23 by the conversion factor K. In this way, the input image is converted into the equiaspect ratio image. The equiaspect ratio image has one of the horizontal pixel count and the vertical pixel count of the equiaspect ratio image equal to one of the horizontal pixel count and the vertical pixel count of the display screen in the corresponding direction, and has the size equal to or smaller than the screen format of the display screen and being obtained by magnifying each of the horizontal size and the vertical size of the input image by the same conversion factor K.

If the aspect ratio of the display screen is 16:9 (=$H_1$:$V_1$) and the aspect ratio of the input image is 4:3 (=$H_2$:$V_2$) as shown in FIG. 4A, the vertical to vertical ratio $V_1/V_2$ becomes the conversion factor K.

Each of the horizontal pixel count and the vertical pixel count of the input image of $H_2 \times V_2$ is multiplied by the conversion factor K=$V_1/V_2$. As a result as shown in FIG. 4A, the vertical pixel count becomes $V_1$, namely, the vertical pixel count of the display screen, and the horizontal pixel count becomes $H_1'$ smaller than the horizontal pixel count $H_1$ of the display screen. In other words, the resulting equiaspect ratio image has the vertical size equal to the vertical size $V_1$ of the display screen, and has the image size equal to or smaller than the screen size of the display screen, and being obtained by multiplying each of the horizontal size and the vertical size of the input image by the conversion factor K=$V_1/V_2$.

If the aspect ratio of the display screen is 16:9 and the aspect ratio of the input image is 4:3, the resulting equiaspect ratio image has an aspect ratio of 4:3 equal to the aspect ratio of the input image, the vertical pixel count equal to the vertical pixel count $V_1$ of the display screen and the horizontal pixel count $H_1'$ smaller than the vertical pixel count $H_1$ of the display screen.

If the aspect ratio of the display screen is 4:3 (=$H_1$:$V_1$) and the aspect ratio of the input image is 16:9 (=$H_2$:$V_2$) as shown in FIG. 4B, the horizontal to horizontal ratio $H_1/H_2$ becomes the conversion factor K.

Each of the horizontal pixel count and the vertical pixel count of the input image of $H_2 \times V_2$ is multiplied by the conversion factor $K=H_1/H_2$. As a result as shown in FIG. 4B, the horizontal pixel count becomes $H_1$, namely, the horizontal pixel count of the display screen, and the vertical pixel count becomes $V_1'$ smaller than the horizontal pixel count $V_1$ of the display screen. In other words, the equiaspect ratio image has the horizontal size equal to the horizontal size $H_1$ of the display screen, and has the image size equal to or smaller than the screen size of the display screen, and being obtained by multiplying each of the horizontal size and the vertical size of the input image by the conversion factor $K=H_1/H_2$.

If the aspect ratio of the display screen is 4:3 and the aspect ratio of the input image is 19:6, the resulting equiaspect ratio image has an aspect ratio of 16:9 equal to the aspect ratio of the input image, the horizontal pixel count equal to the horizontal pixel count $H_1$ of the display screen and the vertical pixel count $V_1'$ smaller than the horizontal pixel count $H_1$ of the display screen.

Regardless of whether the aspect ratio of the input image equals to the aspect ratio of the display screen, the image converter 24 magnifies the input image by conversion factor K, thereby generating the equiaspect ratio image. The aspect ratio of the equiaspect ratio image equals the aspect ratio of the input image. If the input image is a 4:3 image, the equiaspect ratio image also becomes a 4:3 image, and if the input image is a 16:9 image, the equiaspect ratio image also becomes a 16:9 image. A subject appearing in the input image is free from distortion in similarity in the equiaspect ratio image.

If the aspect ratio of the input image is not equal to the aspect ratio of the display screen, the image converter 24 converts the size of the input image into the equiaspect ratio image. In the resulting equiaspect ratio image, one of the horizontal pixel count and the vertical pixel count thereof is equal to one of the horizontal pixel count and the vertical pixel count of the display screen in the one corresponding direction while the other of the horizontal pixel count and the vertical pixel count of the equiaspect ratio image is smaller than the other of the horizontal pixel count and the vertical pixel count of the display screen in the other corresponding direction. If the equiaspect ratio image is displayed on the display 29, an unused extra area results on the display screen of the display 29 (hatched areas in FIGS. 4A and 4B).

The image converter 24 performs the size conversion operation by converting the number of pixels. The pixel count conversion may be performed through an interpolation process or a decimation process. The pixel count conversion may also be performed through a class classification process as proposed by the inventors of this invention. The class classification process will be described in detail later.

The process of the target area setter 25 is described below with reference to FIGS. 5A, 5B, 6A-6D, and 7A-7D.

If the aspect ratio of the input image is not equal to the aspect ratio of the display screen as previously discussed with reference to FIGS. 4A and 4B, one of the horizontal pixel count and the vertical pixel count of the equiaspect ratio image output by the image converter 24 becomes equal to the pixel count of the display screen in the corresponding direction but the other of the horizontal pixel count and the vertical pixel count become smaller than the pixel count of the display screen in the other direction. If the equiaspect ratio image is directly displayed on the display 29, an extra area is caused on the display screen of the display 29.

More specifically, if the aspect ratio of the display screen is 4:3 and the aspect ratio of the input image is 16:9, the resulting equiaspect ratio image has an aspect ratio of 16:9 equal to the aspect ratio of the input image, the horizontal pixel count $H_1$ equal to the horizontal pixel count of the display screen, and the vertical pixel count smaller than the vertical pixel count $V_1$ of the display screen. If the equiaspect ratio image having an aspect ratio of 16:9 is displayed on the display screen having an aspect ratio of 4:9, a top or bottom portion of the equiaspect ratio image becomes an extra area which remains blank on the display screen as shown in FIG. 5A.

If the equiaspect ratio image as the 16:9 image is displayed in the center between the top and bottom portions of the 4:3 screen as shown in FIG. 5A, extra areas are caused on the top and bottom portions of the 4:3 screen. The extra area is caused on only the top portion of the 4:3 screen if the bottom side of the equiaspect ratio image as the 16:9 image is aligned with the bottom side of the 4:3 screen. The extra area is caused on only the bottom portion of the 4:3 image if the top side of the equiaspect ratio image is aligned with the top side of the 4:3 screen.

Extra areas are also caused if the aspect ratio of the display screen is 16:9 and the aspect ratio of the input image is 4:3.

More specifically, if the aspect ratio of the display screen is 16:9 and the aspect ratio of the input image is 4:3, the resulting equiaspect ratio image has an aspect ratio of 4:3 equal to the aspect ratio of the input image, the vertical pixel count $V_1$ equal to the vertical pixel count of the display screen, and the horizontal pixel count smaller than the horizontal pixel count $H_1$ of the display screen. If the equiaspect ratio image having an aspect ratio of 4:9 is displayed on the display screen having an aspect ratio of 16:9, left and right portions of the screen become extra areas which remains blank on the display screen as shown in FIG. 5B.

If the equiaspect ratio image as the 4:3 image is displayed in the center between the left and right portions of the 16:9 screen as shown in FIG. 5B, extra areas are caused on the left and right portions of the 16:9 screen. The extra area is caused on only the left portion of the 16:9 screen if the right side of the equiaspect ratio image as the 4:3 image is aligned with the right side of the 16:9 screen. The extra area is caused on only the right portion of the 4:3 image if the left side of the equiaspect ratio image is aligned with the left side of the 16:9 screen.

The presence of the extra area is not preferable from the standpoint of effective use of the display screen. The display processing apparatus 20 (FIG. 2) displays an additional image different from the equiaspect ratio image in the extra area to use efficiently the display screen.

The position of the extra area for displaying the additional image is not limited to any particular position. For simplicity of explanation, the extra area available to display the additional image is the top portion or the right portion of the display screen.

If the display screen is a 4:3 screen and the input image is a 16:9 image, the equiaspect ratio image is displayed on the 4:3 screen with the bottom side of the 16:9 equiaspect ratio image aligned with the bottom side of the 4:3 screen. The additional image is thus displayed on the extra area caused on only the top portion of the 4:3 screen.

If the display screen is a 16:9 screen and the input image is a 4:3 image, the equiaspect ratio image is displayed on the 16:9 screen with the left side of the 4:3 equiaspect ratio image aligned with the left side of the 16:9 screen. The additional image is thus displayed on the extra area that is caused on only the right side of the 16:9 screen.

One frame of the input image is now set to be a target frame. If the aspect ratio of the input image equals the aspect ratio of the display screen as previously discussed with reference to FIGS. 3A and 3B, the equiaspect ratio image obtained by size converting the target frame of input image is displayed on the entire display screen. The entire display screen thus contributes to displaying the target frame of input image, namely, the equiaspect ratio image.

If the aspect ratio of the input image is different from the aspect ratio of the display screen, the extra area is caused when the equiaspect ratio image obtained by size converting the target frame of input image is displayed on the entire display screen. The display screen is not fully utilized in the displaying of the target frame of input image by the extra area.

The utilization of the display screen is preferably balanced regardless of whether the aspect ratio of the input image is equal to or different from the aspect ratio of the display screen or the aspect ratio of the input image. Even if the aspect ratio of the input image is different from the aspect ratio of the display screen, the entire display screen preferably contributes to the displaying of the target frame of input image.

If the aspect ratio of the input image is different from the aspect ratio of the display screen, the display processing apparatus 20 displays the additional image in the extra area that is caused by displaying on the display screen the equiaspect ratio image resulting from size converting the target frame of input signal. The additional image is generated by expanding part of the target frame of input signal, for example.

Even if the aspect ratio of the input image is different from the aspect ratio of the display screen, the entire display screen is fully utilized to display the target frame of input image in the same manner as when the aspect ratio of the input image equals the aspect ratio of the display screen.

An image that is obtained by expanding in size conversion part of the target frame of input image is displayed on the extra area as the additional image. In this case, it is necessary to set a target area as the part of the input image to be size converted. The setting of the target area is performed by the target area setter 25.

The setting of the target area performed by the target area setter 25 is described below with reference to FIGS. 6A-6D.

FIG. 6A illustrates a 4:3 image as an input image. FIG. 6A illustrates, from the left, three frames of 4:3 image, namely, an n-th frame, an (n+1)-th frame and an (n+2)-th frame.

As shown in FIG. 6A, a subject represented by a star symbol moves rightward in the input image across the n-th frame, the (n+1)-th frame and the (n+2)-th frame.

FIG. 6B illustrates an n-th frame through an (n+2)-th frame of input image where a subject outline is set.

As shown in FIG. 6B, a rectangular subject outline is set up at the position of the subject in the n-th frame in a manner such that the outline surrounds the subject.

For example, the user may specify (the subject surrounded by) the subject outline by operating the remote commander 10. When the remote commander 10 is operated by the user to specify the subject outline, an operation signal responsive to the user operation is transmitted from the remote commander 10 and then received by the controller 30. The controller 30 supplies the operation signal received from the remote commander 10 to the target area setter 25. The target area setter 25 sets the subject outline in response to the operation signal supplied from the controller 30.

More specifically, the operation signal transmitted from the remote commander 10 in response to the user operation on the remote commander 10 contains a subject outline parameter that identifies a position and size of the subject outline, such as top-left corner and bottom-right corner coordinates of the subject outline. The target area setter 25 sets the subject outline based on the subject outline parameter.

As shown in FIGS. 6C and 6D, the target area setter 25 sets up as a target area a rectangular area as part of (each frame of) of the input image in accordance with the subject outline.

FIG. 6C illustrates the target area set by the target area setter 25. FIG. 6D illustrates an extra area (unused area). The extra area is caused on the right side portion of a 16:9 screen when the equiaspect ratio image resulting from size converting the 4:3 input image of FIG. 6A is displayed on the 16:9 screen.

The extra area might be a rectangular area, and an additional image might be displayed on the entire extra area. The additional image is obtained by size converting the target area as part of the input image containing a subject with similarity maintained. The additional image has an image size resulting from magnifying the target area with the same magnification applied to both the horizontal size and the vertical size and equals the extra area in the horizontal and vertical sizes.

Let $\alpha$ represent a magnification parameter applied when the vertical size and the horizontal size of the target area are magnified by the same magnification. Let $x_2$ and $y_2$ represent the horizontal size and the vertical size of the target area as shown in FIG. 6C and $x_1$ and $y_1$ represent the horizontal size and the vertical size of the extra area caused on the right side portion of the 16:9 screen as shown in FIG. 6D, respectively, and the horizontal size $x_2$ and the vertical size $y_2$ of the target area need to satisfy equations $x_1=\alpha x_2$ and $y_1=\alpha y_2$, respectively.

The target area setter 25 under the control of the image format detector 22 and the controller 30 sets as the target area an area of the input image from the buffer 23 satisfying equations $x_1=\alpha x_2$ and $y_1=\alpha y_2$.

In accordance with the image format and the screen format, the image format detector 22 determines whether the aspect ratio of the input image equals the aspect ratio of the display screen of the display 29. If the aspect ratio of the input image is 4:3 and the aspect ratio of the display screen of the display 29 is 16:9, the image format detector 22 determines a horizontal pixel count $x_1$ and a vertical pixel count $y_1$ as the size of the extra area caused on the right side portion of the 16:9 screen when the 4:3 equiaspect ratio image is displayed on the 16:9 screen. The horizontal pixel count $x_1$ and the vertical pixel count $y_1$ are then supplied to the target area setter 25.

When the user operates the remote commander 10 to specify the magnification parameter $\alpha$, the remote commander 10 transmits to the controller 30 the operation signal containing the magnification parameter $\alpha$. Upon receiving the operation signal transmitted from the remote commander 10, the controller 30 supplies the operation signal to the target area setter 25. The target area setter 25 causes the memory 25A to store the operation signal.

The target area setter 25 determines a horizontal pixel count $x_2$ and a vertical pixel count $y_2$ as the size of the target area satisfying the equations $x_1=\alpha x_2$ and $y_1=\alpha y_2$, based on the horizontal pixel count $x_1$ and the vertical pixel count $y_1$ of the extra area from the image format detector 22 and the magnification parameter $\alpha$ stored on the memory 25A.

As shown in FIG. 6C, the target area setter 25 sets in the input image a target area having a rectangular shape centered on the gravity of center of the area surrounded by the subject outline. The rectangular outline has the horizontal pixel count $x_2$ and the vertical pixel count $y_2$. For convenience of explanation, an outline surrounding the target area is referred to as a target area outline.

Once the subject outline in the n-th frame as shown in FIG. 6B, the subject outline remains fixed unless the user modifies the subject outline using the remote commander 10.

As shown in FIG. 6A, a star-shaped subject moves rightward in the n-th frame through the (n+2)-th frame of input image. In the (n+1)-th frame and the (n+2)-th frame as shown in FIG. 6C, the star-shaped subject within the subject outline set in the n-th frame leaves out of the target area surrounded by the target area outline set based on the subject outline set in the n-th frame. More specifically, the moving subject gets out of the stationary target area.

When the aspect ratio of the input image is 16:9 and the aspect ratio of the display screen is 4:3, the target area setter 25 also sets a target area as in the case when the aspect ratio of the input image is 4:3 and the aspect ratio of the display screen is 16:9 as described with reference to FIGS. 6A-6D.

FIGS. 7A-7D illustrate the setting of the target area with the aspect ratio of the input image being 16:9 and the aspect ratio of the display screen being 4:3.

FIG. 7A illustrates an input image as a 16:9 image, namely, three frames of an n-th frame, an (n+1)-th frame and an (n+2)-th frame of 16:9 input image.

As shown in FIG. 7A similar to FIG. 6A, a star-shaped subject is moving rightward from the n-th frame to the (n+1)-th frame to the (n+2)-th frame.

FIG. 7B illustrates an n-th frame through an (n+1)-th frame of input image in which a subject outline is set up.

As shown in FIG. 7B similar to FIG. 6B, a rectangular subject outline is set up at a position of the star-shaped subject so that the outline surrounds the subject.

As previously discussed with reference to FIGS. 6A-6D, the target area setter 25 sets the subject outline in response to the user operation on the remote commander 10.

As shown in FIGS. 7C and 7D, the target area setter 25 sets as the target area a rectangular area as part of (each frame of) the input image in accordance with the subject outline subsequent to the setting of the subject outline.

FIG. 7C illustrates (a target outline surrounding) the target area set by the target area setter 25. FIG. 7D illustrates an extra area. The extra area is caused on the top portion of a 4:3 screen when the equiaspect ratio image resulting from size converting the 16:9 input image of FIG. 7A is displayed on the 4:3 screen.

Similarly as shown in FIG. 6A-6D, the extra area is a rectangular area, and an additional image is displayed on the entire extra area. The additional image is obtained by size converting the target area as part of the input image containing a subject with similarity maintained. The additional image has an image size resulting from magnifying the target area with the same magnification applied to both the horizontal size and the vertical size and equals the extra area in the horizontal and vertical sizes.

Let $\alpha$ represent a magnification parameter applied when the vertical size and the horizontal size of the target area are magnified by the same magnification. Let $x_2$ and $y_2$ represent the horizontal size and the vertical size of the target area as shown in FIG. 7C and $x_1$ and $y_1$ represent the horizontal size and the vertical size of the extra area caused on the top portion of the 4:3 screen as shown in FIG. 7D, and the horizontal size $x_2$ and the vertical size $y_2$ of the target area need to satisfy equations $x_1 = \alpha x_2$ and $y_1 = \alpha y_2$, respectively.

The target area setter 25 under the control of the image format detector 22 and the controller 30 sets as the target area an area of the input image from the buffer 23 satisfying equations $x_1 = \alpha x_2$ and $y_1 = \alpha y_2$.

In accordance with the image format and the screen format, the image format detector 22 determines whether the aspect ratio of the input image equals the aspect ratio of the display screen of the display 29. If the aspect ratio of the input image is 16:9 and the aspect ratio of the display screen of the display 29 is 4:3, the image format detector 22 determines a horizontal pixel count $x_1$ and a vertical pixel count $y_1$ as the size of the extra area caused on the top portion of the 4:3 screen when the 16:9 equiaspect ratio image is displayed on the 4:3 screen as shown in FIG. 7D. The horizontal pixel count $x_1$ and the vertical pixel count $y_1$ are then supplied to the target area setter 25.

The memory 25A in the target area setter 25 stores the magnification parameter $\alpha$ in response to the operation of the remote commander 10 as previously discussed with reference to FIG. 6A-6D.

The target area setter 25 determines a horizontal pixel count $x_2$ and a vertical pixel count $y_2$ as the size of the target area satisfying the equations $x_1 = \alpha x_2$ and $y_1 = \alpha y_2$, based on the horizontal pixel count $x_1$ and the vertical pixel count $y_1$ of the extra area from the image format detector 22 and the magnification parameter $\alpha$ stored on the memory 25A.

As shown in FIG. 7C, the target area setter 25 sets in the input image a target area having a rectangular shape centered on the gravity of center of the area surrounded by the subject outline. The rectangular outline has the horizontal pixel count $x_2$ and the vertical pixel count $y_2$. An area of the information surrounded by the target area outline is thus set as the target area.

The process of the additional image generator 26 of FIG. 2 is described below with reference to FIGS. 8A-8C and FIGS. 9A-9C.

FIGS. 8A-8C illustrate the target area outline set based on the subject outline when the aspect ratio of the input image is 4:3 and the aspect ratio of the display screen is 16:9.

FIG. 8A is similar to FIG. 6C.

The aspect ratio of the input image is 4:3 and the aspect ratio of the display screen is 16:9. As previously discussed with reference to FIGS. 6A-6D, let $x_2$ and $y_2$ represent the horizontal size and the vertical size of the target area and $x_1$ and $y_1$ represent the horizontal size and the vertical size of the extra area caused on the right side portion of the 16:9 screen. The target area setter 25 sets the target area having the horizontal size $x_2$ and the vertical size $y_2$ satisfying equations $x_1 = \alpha x_2$ and $y_1 = \alpha y_2$, respectively, with the magnification parameter $\alpha$.

The target area setter 25 supplies the target area and the magnification parameter $\alpha$ to the additional image generator 26. As shown in FIG. 8B, the additional image generator 26 generates as the additional image an image having the horizontal pixel count $\alpha x_2$ and the vertical pixel count $\alpha y_2$. More specifically, the additional image is generated by multiplying the horizontal pixel count $x_2$ and the vertical pixel count $y_2$ of the target area supplied from the target area setter 25 by the magnification parameter $\alpha$.

Since the horizontal pixel count of the additional image is $\alpha x_2$ and the vertical pixel count of the additional image is $\alpha y_2$, the horizontal pixel count $\alpha x_2$ and the vertical pixel count $\alpha y_2$ are respectively equal to the horizontal pixel count $x_1$ and the vertical pixel count $y_1$ of the extra area.

If the aspect ratio of the input image is 4:3 and the aspect ratio of the display screen is 16:9, the 4:3 equiaspect ratio image resulting from size converting the input image and the additional image generated from the target area are arranged as a combination image on the left portion and the right portion of the 16:9 screen in a manner such that the equiaspect ratio image and the additional image do not overlap each other. As shown in FIG. 8C, the entire 16:9 screen is effectively utilized with no unused area caused.

Since the 4:3 equiaspect ratio image and the additional image, forming the combination image, are generated from the same frame of input image, the entire display screen is used to display the same frame of input image in a manner similar to the case in which the aspect ratio of the input image equals the aspect ratio of the display screen.

FIGS. 9A-9C illustrate the target area outline set based on the subject outline when the aspect ratio of the input image is 16:9 and the aspect ratio of the display screen is 4:3.

FIG. 9A is similar to FIG. 7C.

The aspect ratio of the input image is 16:9 and the aspect ratio of the display screen is 4:3. As previously discussed with reference to FIGS. 7A-7D, let $x_2$ and $y_2$ represent the horizontal size and the vertical size of the target area and $x_1$ and $y_1$ represent the horizontal size and the vertical size of the extra area caused on the top portion of the 4:3 screen, respectively. The target area setter 25 sets the target area having the horizontal size $x_2$ and the vertical size $y_2$ satisfying equations $x_1=\alpha x_2$ and $y_1=\alpha y_2$, respectively, with the magnification parameter $\alpha$.

The target area setter 25 supplies the target area and the magnification parameter $\alpha$ to the additional image generator 26. As shown in FIG. 9B, the additional image generator 26 generates as the additional image an image having the horizontal pixel count $\alpha x_2$ and the vertical pixel count $\alpha y_2$. More specifically, the additional image is generated by multiplying the horizontal pixel count $x_2$ and the vertical pixel count $y_2$ of the target area supplied from the target area setter 25 by the magnification parameter $\alpha$.

Since the horizontal pixel count of the additional image is $\alpha x_2$ and the vertical pixel count of the additional image is $\alpha y_2$, the horizontal pixel count $\alpha x_2$ and the vertical pixel count $\alpha y_2$ are respectively equal to the horizontal pixel count $x_1$ and the vertical pixel count $y_1$ of the extra area.

If the aspect ratio of the input image is 16:9 and the aspect ratio of the display screen is 4:3, the 16:9 equiaspect ratio image resulting from size converting the input image and the additional image generated from the target area are arranged as a combination image on the bottom portion and the top portion of the 4:3 screen in a manner such that the equiaspect ratio image and the additional image do not overlap each other. As shown in FIG. 9C, the entire 4:3 screen is effectively utilized with no unused area caused.

Since the 16:9 equiaspect ratio image and the additional image, forming the combination image, are generated from the same frame of input image, the entire display screen is used to display the same frame of input image in a manner similar to the case in which the aspect ratio of the input image equals the aspect ratio of the display screen.

A display process of the display processing apparatus 20 of FIG. 2 is described below with reference to a flowchart of FIG. 10.

The acquisition unit 21 receives data containing an input image, such as data broadcast through a terrestrial digital broadcasting system, for example, and successively supplies the received data to the buffer 23.

In step S11, the image format detector 22 detects the image format of the input image contained in the data stored on the buffer 23. Processing proceeds to step S12.

In step S12, the image format detector 22 determines whether the aspect ratio of the input image equals the aspect ratio of the display screen based on the image format of the input image and the screen format of the display screen of the display 29.

If it is determined in step S12 that the aspect ratio of the input image equals the aspect ratio of the display screen, processing proceeds to step S13 to perform a standard display process to be discussed later. Processing returns then from step S13 to step S12.

If it is determined in step S12 that the aspect ratio of the input image is not equal to the aspect ratio of the display screen, processing proceeds to step S14 to perform an additional image display process to be discussed later. Processing returns from step S14 to step S12.

Figure 10:
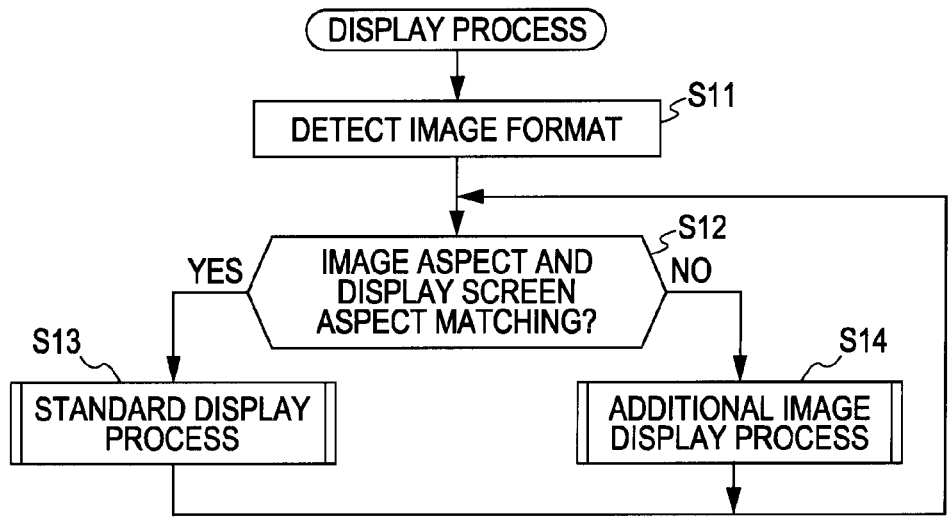
FIG. 10 is a flowchart illustrating of a process of the additional image generator.

The standard display process performed in step S13 of FIG. 10 is described below with reference to a flowchart of FIG. 11.

In step S21, the image format detector 22 determines the horizontal to horizontal ratio $H_1/H_2$ of the horizontal pixel count $H_1$ of the display screen to the horizontal pixel count $H_2$ of the input image and the vertical to vertical ratio $V_1/V_2$ of the vertical pixel count $V_1$ of the display screen to the vertical pixel count $V_2$ of the input image based on the image format and the screen format of the display screen of the display 29. The image format detector 22 determines as the conversion factor K one of the horizontal to horizontal ratio $H_1/H_2$ and the vertical to vertical ratio $V_1/V_2$ whichever is smaller (if the two ratios are equal to each other, either one will do). The image format detector 22 supplies information representing the conversion factor K to the image converter 24. Processing proceeds to step S22.

Figure 11:
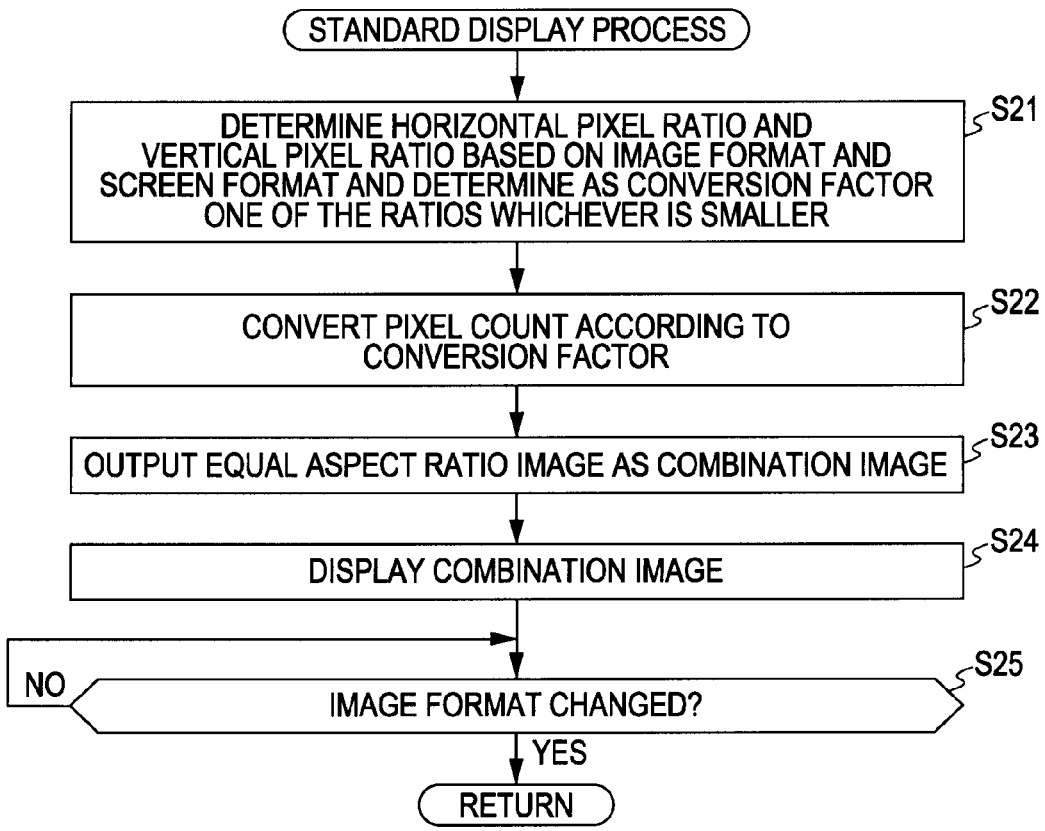
FIG. 11 is a flowchart illustrating a standard display process.

When the standard display process of FIG. 11 is performed, the aspect ratio of the input image equals the aspect ratio of the display screen, and the horizontal to horizontal ratio $H_1/H_2$ equals the vertical to the vertical ratio $V_1/V_2$. In this case, the conversion factor K may be the horizontal to horizontal ratio $H_1/H_2$ or the vertical to vertical ratio $V_1/V_2$.

In step S22, the image converter 24 starts reading the input image from the buffer 23. Furthermore in step S22, the image converter 24 starts size conversion, converting the input image stored on the buffer 23 into an equiaspect ratio image that is obtained by multiplying the horizontal pixel count and the vertical pixel count by the conversion factor K in accordance with information representing the conversion factor K supplied from the image format detector 22 in step S21. The image converter 24 supplies the resulting equiaspect ratio image to the combination image generator 27. Processing proceeds to step S23.

In step S23, the combination image generator 27 starts directly supplying the display controller 28 with the equiaspect ratio image supplied from the image converter 24 as the combination image.

When the standard display process is performed, the aspect ratio of the input image equals the aspect ratio of the display screen. The equiaspect ratio image having the same aspect ratio as the input image is effectively displayed on the entire display screen of the display 29 as previously discussed with reference to FIGS. 3A and 3B. For this reason, the combination image generator 27 supplies directly the equiaspect ratio image supplied from the image converter 24 to the display controller 28 as the combination image.

In step S24, the display controller 28 starts a display control process, causing the display 29 to display the equiaspect ratio image supplied from the combination image generator 27. Processing proceeds to step S25.

In step S25, the image format detector 22 determines whether the input image stored on the buffer 23 has changed in image format.

The image format detector 22 constantly monitors the image format of the input image stored on the buffer 23. In step S25, the image format detector 22 determines whether the input image stored on the buffer 23 has changed in image format.

If it is determined in step S25 that the input image stored on the buffer 23 has not changed in image format, processing returns to step S25.

If it is determined in step S25 that the input image stored on the buffer 23 has changed in image format, processing returns to step S12 of FIG. 10. Step S12 and subsequent steps are repeated using the new image format.

The additional image display process performed in step S14 of FIG. 10 is described below with reference to a flowchart of FIG. 12.

In step S31, the image format detector 22 determines the horizontal to horizontal ratio $H_1/H_2$ of the horizontal pixel count $H_1$ of the display screen to the horizontal pixel count $H_2$ of the input image and the vertical to vertical ratio $V_1/V_2$ of the vertical pixel count $V_1$ of the display screen to the vertical pixel count $V_2$ of the input image based on the image format and the screen format of the display screen of the display 29. The image format detector 22 determines as the conversion factor K one of the horizontal to horizontal ratio $H_1/H_2$ and the vertical to vertical ratio $V_1/V_2$ whichever is smaller. The image format detector 22 supplies information representing the conversion factor K to the image converter 24. Processing proceeds to step S32.

In step S32, the image converter 24 starts reading the input image from the buffer 23. Further in step S32, the image converter 24 starts size conversion, converting the input image stored on the buffer 23 into an equiaspect ratio image that is obtained by multiplying the horizontal pixel count and the vertical pixel count by the conversion factor K in accordance with information representing the conversion factor K supplied from the image format detector 22 in step S31. The image converter 24 supplies the resulting equiaspect ratio image to the combination image generator 27. Processing proceeds to step S33.

In step S33, the additional image generator 26 starts an additional image generation process. In the additional image generation process, the additional image is generated from the same frame of input image from which the image converter 24 generates the equiaspect ratio image.

With the additional image generation process starting, the additional image generator 26 supplies the combination image generator 27 with the additional image that has been generated from the same frame of the equiaspect ratio image supplied from the image converter 24 to the combination image generator 27.

In step S34, the combination image generator 27 combines the equiaspect ratio image supplied from the image converter 24 and the additional image that has been generated from the same frame of input image of the equiaspect ratio image and that has been supplied from the additional image generator 26. The equiaspect ratio image and the additional image are combined in a manner such that the two images do not overlap each other. The combination image is then supplied to the display controller 28. Processing proceeds to step S35.

In step S35, the display controller 28 starts a display control process to display on the display 29 the equiaspect ratio image supplied from the combination image generator 27. Processing proceeds to step S36.

In step S36, the image format detector 22 determines whether the input image stored on the buffer 23 has changed in image format.

The image format detector 22 constantly monitors the image format of the input image stored on the buffer 23. In step S36, the image format detector 22 determines whether the input image stored on the buffer 23 has changed in image format.

If it is determined in step S36 that the input image stored on the buffer 23 has not changed in image format, processing returns to step S36.

If it is determined in step S36 that the input image stored on the buffer 23 has changed in image format, the additional image generation process started in step S33 is completed. Processing returns to step S12 of FIG. 10. Step S12 and subsequent steps are repeated using the new image format.

Figure 13:
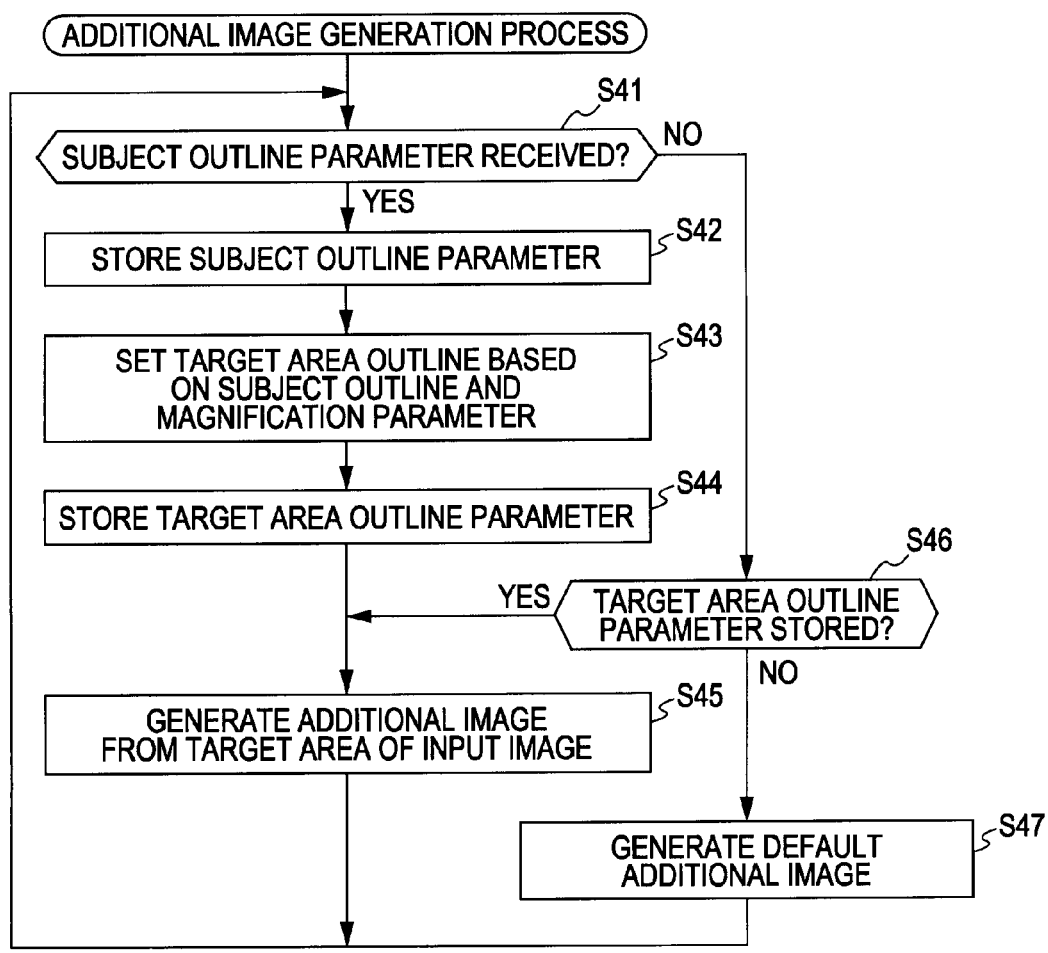
FIG. 13 is a flowchart illustrating an additional image generation process.

The additional image generation process performed in step S33 of FIG. 12 is described below with reference to a flowchart of FIG. 13.

In step S41, the controller 30 determines whether the subject outline parameter identifying the subject outline has been transmitted from the remote commander 10.

If it is determined in step S41 that the subject outline parameter identifying the subject outline has been transmitted from the remote commander 10 (i.e., if the user has operated the remote commander 10 to specify the subject outline and the remote commander 10 has transmitted the operation signal containing the subject outline parameter identifying the subject outline), the controller 30 receives the operation signal. The controller 30 then supplies the subject outline parameter contained in the operation signal to the target area setter 25. Processing proceeds to step S42.

In step S42, the target area setter 25 receives the subject outline parameter from the controller 30 and causes the memory 25A to store the received subject outline parameter. Processing proceeds to step S43.

In step S43, the target area setter 25 sets the target area outline based on the subject outline parameter and the magnification parameter $\alpha$.

The image format detector 22 detects the image format of the input image stored on the buffer 23. If the aspect ratio of the input image contained the image format does not equal the aspect ratio of the display screen, the image format detector 22 determines the horizontal pixel count $x_1$ and the vertical pixel count $y_1$ of the size of the extra area that is caused when the equiaspect ratio image resulting from size converting the input image is displayed on the display screen as previously described with reference to FIGS. 6A-6D and FIGS. 7A-7D. The horizontal pixel count $x_1$ and the vertical pixel count $y_1$ are then supplied to the target area setter 25.

The user might operate the remote commander 10 and the memory 25A in the target area setter 25 might store the magnification parameter $\alpha$ as previously described with reference to FIGS. 6A-6D. The target area setter 25 determines the horizontal pixel count $x_2$ and the vertical pixel count $y_2$ of the target area outline surrounding the target area satisfying the equations $x_1 = \alpha x_2$ and $y_1 = \alpha y_2$, based on the magnification parameter $\alpha$ and the horizontal pixel count $x_1$ and the vertical pixel count $y_1$ of the extra area from the image format detector 22.

In the frame of input image read from the buffer 23 by the image converter 24, the target area setter 25 sets the target area outline surrounding the rectangular area having the horizontal pixel count $x_2$ and the vertical pixel count $y_2$. The rectangular area is centered on the center of gravity of the subject outline identified by the subject outline parameter stored on the memory 25A in step S42.

If the user has not operated the remote commander 10, no magnification parameter $\alpha$ is specified, and no magnification parameter α is stored on the memory 25A. In such a case, a default value is used for the magnification parameter α.

In step S44, the target area setter 25 causes the memory 25A to store the top left corner and the bottom right corner of the target area outline as the subject outline parameter identifying the target area outline set in step S43. Processing proceeds to step S45.

In step S45, the target area setter 25 extracts from the frame of input image read from the buffer 23 an area surrounded by the target area outline identified by the subject outline parameter stored on the memory 25A as the target area, and then supplies the extracted target area together with the magnification parameter α from the memory 25A to the additional image generator 26.

Further in step S45, the additional image generator 26 performs the size conversion operation, thereby multiplying the horizontal pixel count and the vertical pixel count of the target area supplied from the target area setter 25 by the magnification parameter α. The additional image generator 26 supplies to the combination image generator 27 the additional image obtained through the size conversion. Processing returns to step S41.

In step S34 of FIG. 12, the combination image is generated based on the additional image supplied from the additional image generator 26 to the combination image generator 27.

If it is determined in step S41 that the subject outline parameter identifying the subject outline has not been transmitted from the remote commander 10, processing proceeds to step S46. The target area setter 25 determines whether the memory 25A stores a target area outline parameter.

If it is determined in step S46 that the memory 25A stores the target area outline parameter, processing proceeds to step S45. As previously discussed, the target area setter 25 extracts, as the target area, the area surrounded by the target area outline identified by the target area outline parameter stored on the memory 25A from the frame of input image read from the target area setter 25 by the image converter 24. The target area setter 25 then supplies the additional image generator 26 with the target area together with the magnification parameter α from the memory 25A. The additional image generator 26 performs the size conversion operation, thereby multiplying the horizontal pixel count and the vertical pixel count of the target area supplied from the target area setter 25 by the magnification parameter α. The additional image generator 26 supplies the combination image generator 27 with the additional image obtained through the size conversion.

If it is determined in step S46 that the memory 25A stores no target area outline parameter (i.e., the remote commander 10 has not been operated by the user, and thus the memory 25A has no storage of the subject outline parameter required to set the target area outline), processing proceeds to step S47. The additional image generator 26 generates as the additional image an image of a message prompting the user to specify the subject outline and an image of a black band in the letter-box. The additional image is then supplied to the combination image generator 27. Processing returns to step S41.

Figure 14:
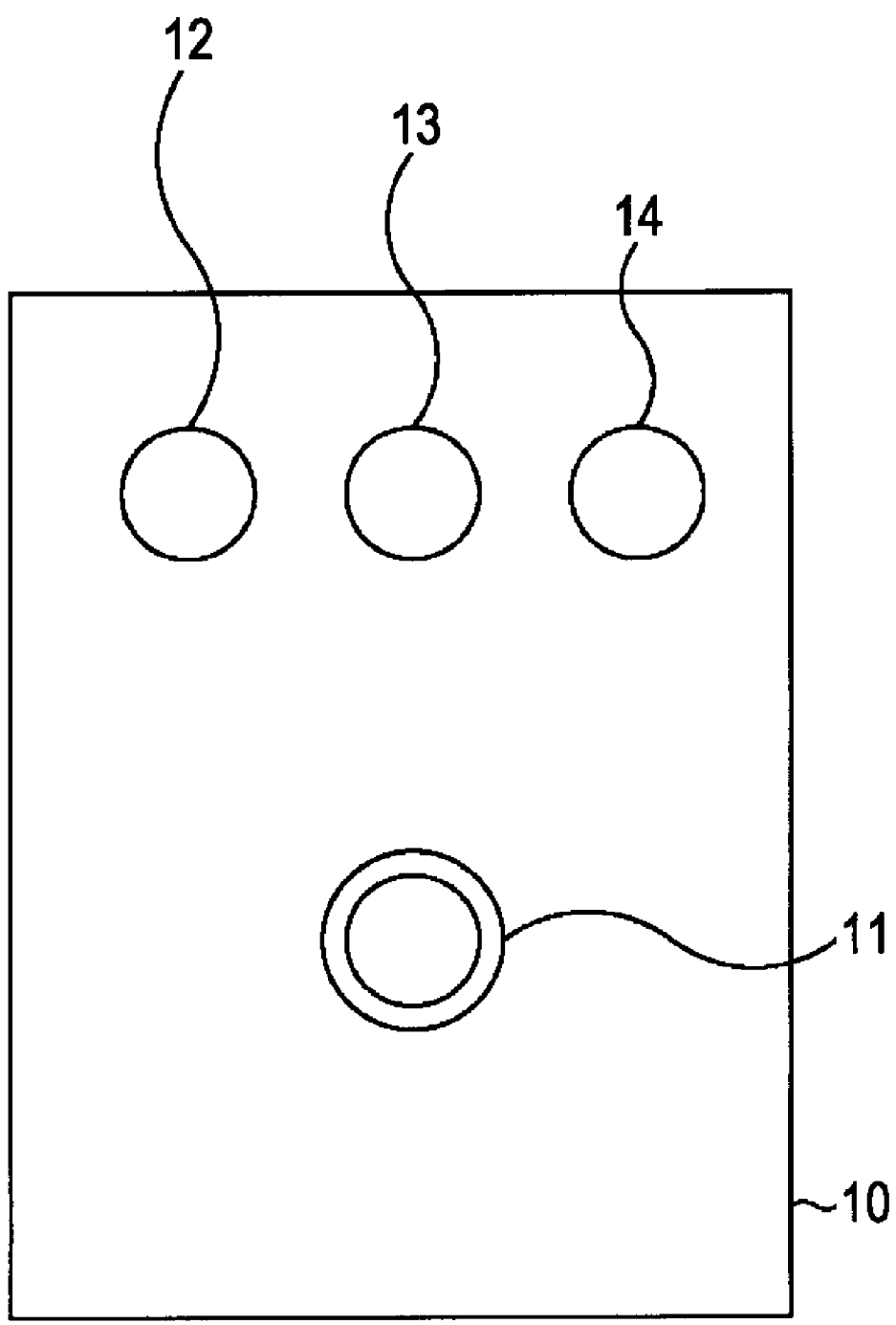
FIG. 14 illustrates a remote commander.

FIG. 14 diagrammatically illustrates the remote commander 10 of FIG. 2.

As shown in FIG. 14, the remote commander 10 includes a joystick 11 as a pointing device, a setting start button 12, a correction start button 13 and an entry button 14.

The joystick 11 receives a direction action specifying a direction of travel and a pressing action working internally into the remote commander 10. The joystick 11 is used to specify or correct the subject outline.

When the setting start button 12 is operated, a cursor indicating the subject outline appears on the display 29. If the user operates the joystick 11 in the direction action, the cursor on the display 29 moves in the direction specified by the direction action of the joystick 11.

When the joystick 11 is pressed, the position of the cursor is set at a first corner of the subject outline.

When the joystick 11 is operated in the direction action, the cursor is moved. When the joystick 11 is then pressed, that position of the cursor is set as a second corner of the subject outline. A rectangular shape having a diagonal line connecting the first corner to the second corner is set as a subject outline.

When the correction start button 13 is operated, a graphical user interface (GUI) displaying the already set subject outline is displayed on the display 29. The joystick 11 is operated in the direction action, and the position and the size of the subject outline displayed on the GUI on the display 29 are modified in accordance with the direction action of the joystick 11.

When the joystick 11 is then pressed, an outline displayed by the GUI on the display 29 is newly set as a subject outline.

The setting start button 12 is used to specify newly a subject outline. When the setting start button 12 is operated, a cursor specifying the subject outline is displayed on the display 29 as previously discussed.

The correction start button 13 is used to correct (modify) the already set subject outline. When the correction start button 13 is operated, the GUI representing the already set subject outline is displayed on the display 29.

The entry button 14 is used to enter the specification or correction of the subject outline. The operation of the entry button 14 erases the cursor displayed on the display 29 in response to the operation of the setting start button 12 and the GUI displaying the subject outline on the display 29 in response to the operation of the correction start button 13.

Figure 15:
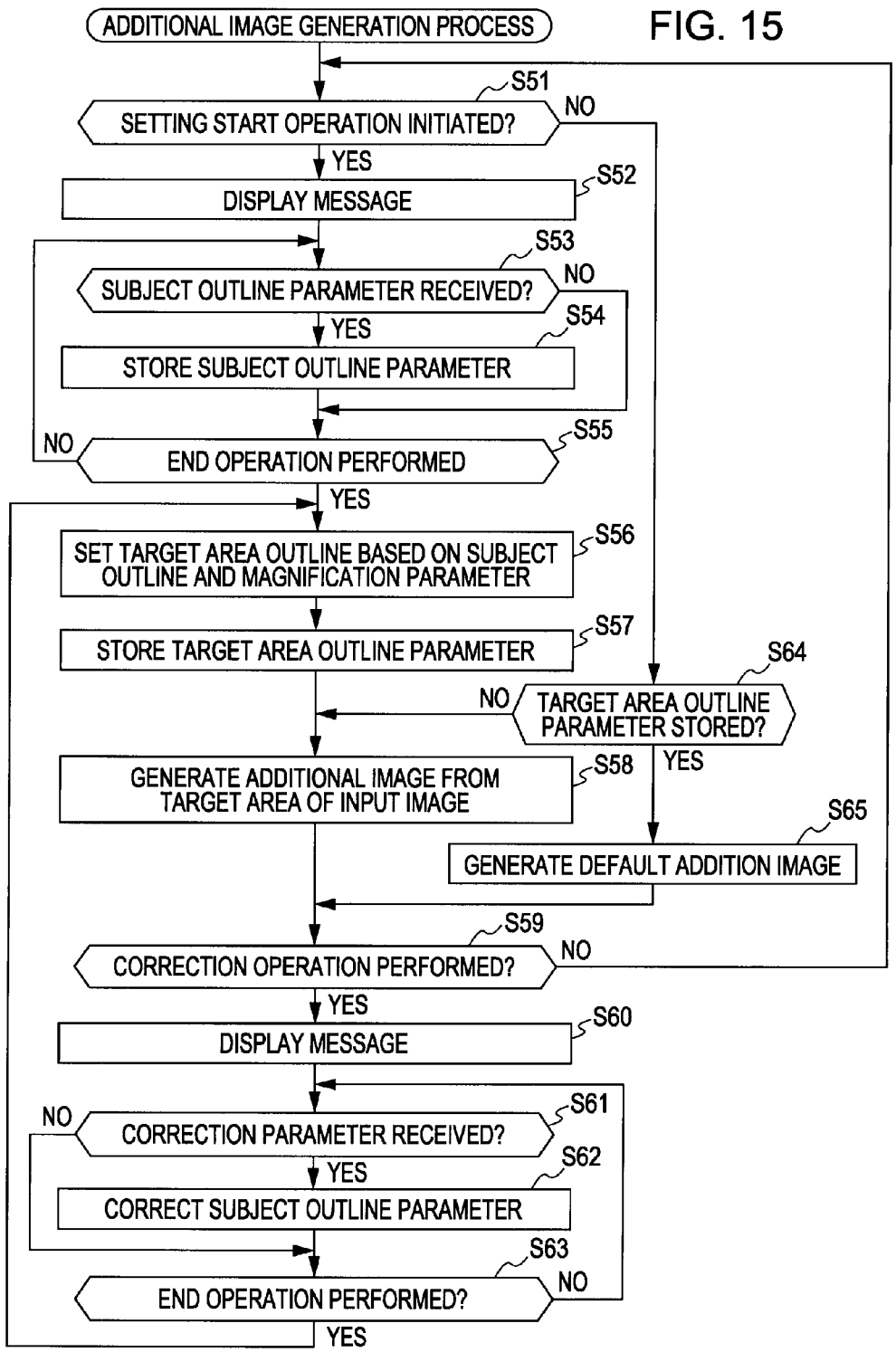
FIG. 15 is a flowchart illustrating an additional image generation process.

The additional image generation process performed in step S33 of FIG. 12 with the remote commander 10 of FIG. 14 is described below with reference to a flowchart of FIG. 15.

In step S51, the controller 30 determines whether the setting start button 12 on the remote commander 10 (FIG. 4) has been operated by the user.

If it is determined in step S51 that the setting start button 12 has been operated (i.e., the user operates the setting start button 12, the operation signal responsive to the user operation is transmitted from the remote commander 10, and the controller 30 receives the operation signal), processing proceeds to step S52. The display controller 28 causes the display 29 to display the cursor specifying the subject outline and a message prompting the user to specify the subject outline. Processing proceeds to step S53.

In step S53, the controller 30 determines whether the subject outline parameter identifying the subject outline has been transmitted from the remote commander 10.

If it is determined in step S53 that the subject outline parameter identifying the subject outline has not been transmitted from the remote commander 10, processing proceeds to step S55 with step S54 skipped.

If it is determined in step S53 that the subject outline parameter identifying the subject outline has been transmitted from the remote commander 10 (i.e., the user has operated the joystick 11 on the remote commander 10 (FIG. 14) and moved the cursor displayed in step S52 on the display 29 to specify the subject outline and the operation signal containing the subject outline parameter identifying the subject outline has been transmitted from the remote commander 10), the controller 30 receives the operation signal from the remote commander 10 and supplies the subject outline parameter contained in the operation signal to the target area setter 25. Processing proceeds to step S54.

In step S54, the target area setter 25 receives the subject outline parameter from the controller 30 and causes the memory 25A to store the received subject outline parameter. Processing proceeds to step S55.

If the subject outline parameter is already written on the target area setter 25, the subject outline parameter from the controller 30 overwrites the already written subject outline parameter on the memory 25A in step S54.

In step S55, the controller 30 determines whether the entry button 14 on the remote commander 10 (FIG. 14) has been operated by the user.

If it is determined in step S55 that the entry button 14 has not been operated by the user yet, processing returns to step S53. Steps S53 and S54 are repeated.

If it is determined in step S55 that the entry button 14 has been operated by the user (i.e., if the operation signal has been transmitted from the remote commander 10 in response to the user operation on the remote commander 10 and the controller 30 has received the operation signal), the display controller 28 erases the cursor and the message displayed in step S52 on the display 29. Processing proceeds to step S56.

In step S56, the target area setter 25 sets the target area outline based on the subject outline parameter and the magnification parameter $\alpha$.

The image format detector 22 detects the image format of the input image stored on the buffer 23. If the aspect ratio of the input image contained in the image format does not equal the aspect ratio of the display screen, the image format detector 22 determines the horizontal pixel count $x_1$ and the vertical pixel count $y_1$ of the size of the extra area that is caused when the equiaspect ratio image resulting from size converting the input image is displayed on the display screen as previously described with reference to FIGS. 6A-6D and FIGS. 7A-7D. The horizontal pixel count $x_1$ and the vertical pixel count $y_1$ are then supplied to the target area setter 25.

The memory 25A in the target area setter 25 might store the magnification parameter $\alpha$ as previously described with reference to FIGS. 6A-6D. The target area setter 25 determines the horizontal pixel count $x_2$ and the vertical pixel count $y_2$ of the target area outline surrounding the target area satisfying the equations $x_1=\alpha x_2$ and $y_1=\alpha y_2$, based on the magnification parameter $\alpha$ and the horizontal pixel count $x_1$ and the vertical pixel count $y_1$ of the extra area from the image format detector 22.

In the frame of input image read from the buffer 23 by the image converter 24, the target area setter 25 sets the target area outline surrounding the rectangular area having the horizontal pixel count $x_2$ and the vertical pixel count $y_2$. The rectangular area is centered on the center of gravity of the subject outline identified by the subject outline parameter stored in step S54 on the memory 25A.

In step S57, the target area setter 25 causes the memory 25A to store the subject outline parameter identifying the target area outline set in step S56. Processing proceeds to step S58.

In step S58, the target area setter 25 extracts from the frame of input image read from the buffer 23 an area surrounded by the target area outline identified by the subject outline parameter stored on the memory 25A as the target area, and then supplies the extracted target area together with the magnification parameter $\alpha$ from the memory 25A to the additional image generator 26.

Further in step S58, the additional image generator 26 performs the size conversion operation, thereby multiplying the horizontal pixel count and the vertical pixel count of the target area supplied from the target area setter 25 by the magnification parameter $\alpha$. The additional image generator 26 supplies to the combination image generator 27 the additional image obtained through the size conversion. Processing returns to step S59.

In step S34 of FIG. 12, the combination image is generated based on the additional image supplied from the additional image generator 26 to the combination image generator 27.

In step S59, the controller 30 determines whether the correction start button 13 on the remote commander 10 (FIG. 14) has been operated by the user.

If it is determined in step S59 that the correction start button 13 has not been operated, processing returns to step S51.

If it is determined in step S59 that the correction start button 13 has been operated by the user (i.e., the operation signal has been transmitted from the remote commander 10 in response to the user operation on the remote commander 10 and the controller 30 has received the operation signal), processing proceeds to step S60. The display controller 28 causes the display 29 to display the GUI showing the subject outline identified by the subject outline parameter stored on the memory 25A and the message prompting the user to correct the subject outline. Processing proceeds to step S61.

In step S61, the controller 30 determines whether a correction parameter correcting the subject outline has been transmitted from the remote commander 10.

If it is determined in step S61 that the correction parameter has not been transmitted from the remote commander 10, processing proceeds to step S63 with step S62 skipped.

If it is determined in step S61 that the correction parameter has been transmitted from the remote commander 10 (i.e., the user has operated the joystick 11 on the remote commander 10 (FIG. 14) to modify the position and size of the GUI showing the subject outline displayed in step S60 on the display 29 and the remote commander 10 has transmitted the operation signal containing the correction parameter representing the modification), the controller 30 receives the operation signal from the remote commander 10. The controller 30 then supplies the correction parameter contained in the operation signal to the target area setter 25. Processing proceeds to step S62.

In step S62, the target area setter 25 corrects (modifies) the subject outline parameter, received from the controller 30 and stored on the memory 25A, in accordance with the correction parameter supplied from the controller 30. Processing proceeds to step S63.

In step S63 similar to step S55, the controller 30 determines whether the entry button 14 on the remote commander 10 (FIG. 14) has been operated by the user.

If it is determined in step S63 that the entry button 14 has not been operated, processing returns to step S61 to repeat step S61 and subsequent steps.

If it is determined in step S63 that the entry button 14 has operated by the user, the display controller 28 erases the GUI showing the subject outline and the message displayed in step S60 on the display 29. Processing proceeds to step S56.

In step S56, the target area setter 25 sets the target area based on the subject outline parameter corrected in step S62 and the magnification parameter $\alpha$.

If it is determined in step S51 that the setting start button 12 has not been operated, processing proceeds to step S64. The target area setter 25 determines whether the memory 25A stores the target area outline parameter.

If it is determined in step S64 that the memory 25A stores the target area outline parameter, processing proceeds to step S58. As previously discussed, the target area setter 25 extracts, as the target area, the area surrounded by the target area outline identified by the target area outline parameter stored on the memory 25A from the frame of input image read from the target area setter 25 by the image converter 24. The target area setter 25 then supplies the additional image generator 26 with the target area together with the magnification parameter α from the memory 25A. The additional image generator 26 performs the size conversion operation, thereby multiplying the horizontal pixel count and the vertical pixel count of the target area supplied from the target area setter 25 by the magnification parameter α. The additional image generator 26 supplies the combination image generator 27 with the additional image obtained through the size conversion.

If it is determined in step S64 that the memory 25A stores no target area outline parameter (i.e., the remote commander 10 has not been operated by the user, and thus the memory 25A has no storage of the subject outline parameter required to set the target area outline), processing proceeds to step S65. The additional image generator 26 generates as the additional image an image of a message prompting the user to specify the subject outline and an image of a black band in a letterbox. The additional image is then supplied to the combination image generator 27. Processing proceeds to step S59.

Figure 16:
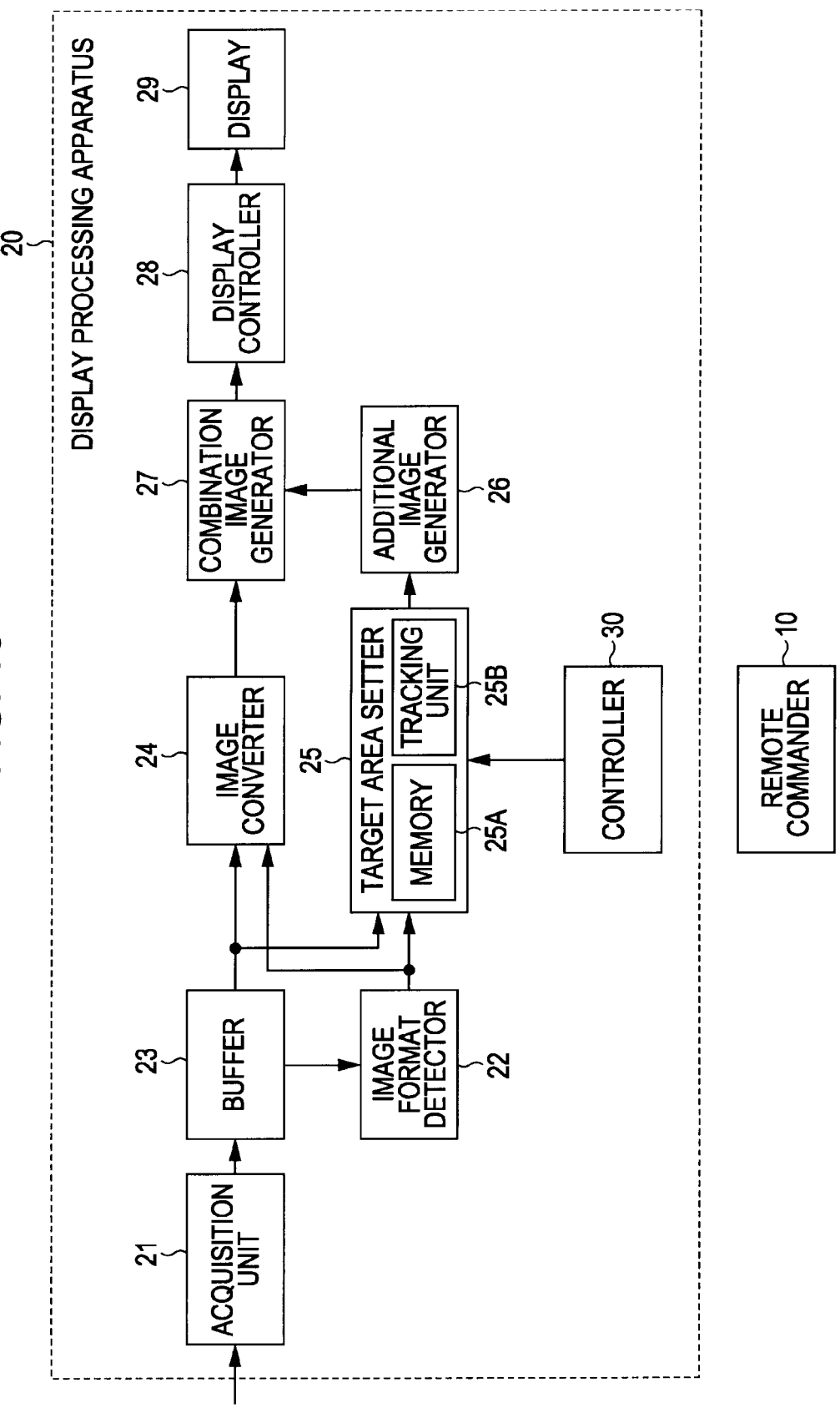
FIG. 16 is a block diagram illustrating a display system in accordance with one embodiment of the present invention.

FIG. 16 illustrates a display system in accordance with one embodiment of the present invention.

In FIG. 16, elements identical to those illustrated in FIG. 2 are designated with the same reference numerals and the discussion thereof is omitted as appropriate. More specifically, the display system of FIG. 16 is identical in structure to the display system of FIG. 2 except that the target area setter 25 includes a tracking unit 25B in addition to the memory 25A.

The tracking unit 25B tracks the subject appearing within the area of the input image surrounded by the subject outline specified on the remote commander 10 by the user. The tracking unit 25B outputs the subject outline parameter identifying the subject outline surrounding the subject in each frame of input image.

The target area setter 25 shown in FIG. 16 updates the subject outline parameter stored on the memory 25A thereof in accordance with the subject outline parameter output from the tracking unit 25B.

The target area setter 25 sets the target area outline in accordance with the target outline identified by the subject outline parameter stored on the memory 25A. In this case, the target area outline set in each frame of input image is an outline surrounding an area within which the subject is being tracked by the tracking unit 25B.

The additional image generated by the display system of FIG. 16 is described below with reference to FIGS. 17A-17D and FIGS. 18A-18D.

FIGS. 17A-17D illustrate an additional image generated when the input image is a 4:3 image and the display screen of the display 29 is a 16:9 screen. FIGS. 18A-18D illustrate an additional image generated when the input image is a 16:9 image and the display screen of the display 29 is a 4:3 image.

Figure 17:
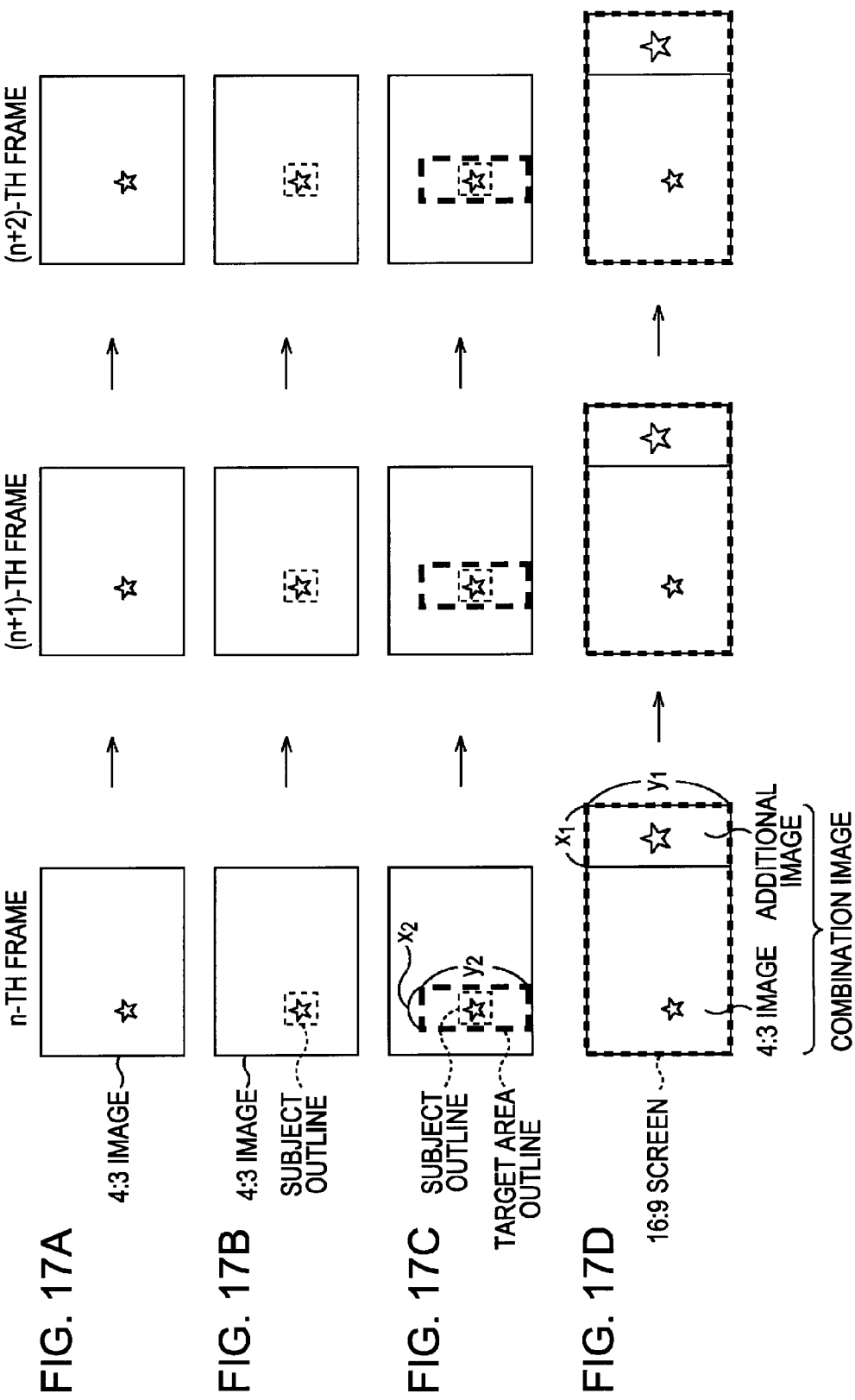
FIGS. 17A-17D illustrate a process of the display system.
Figure 18:
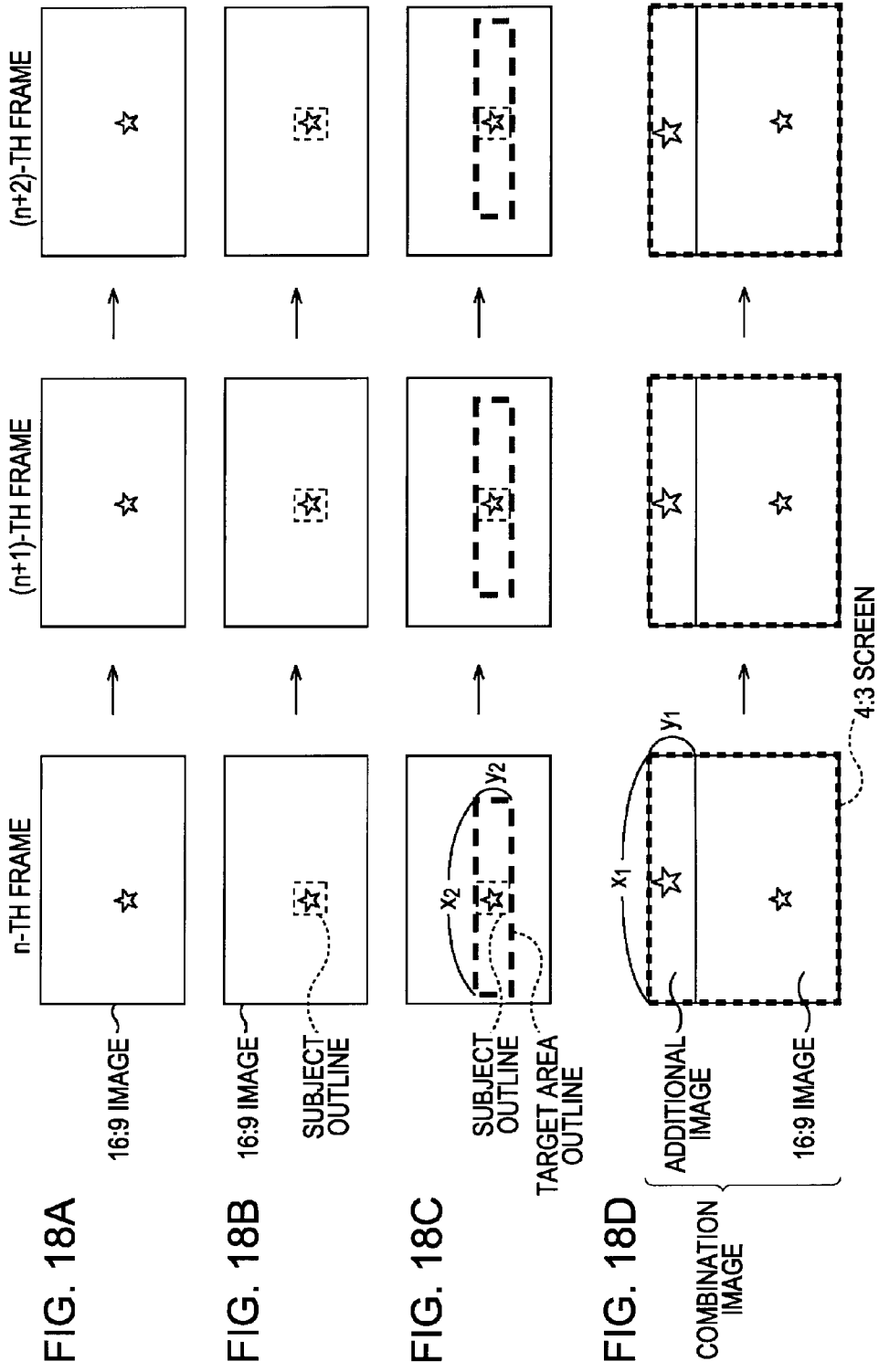
FIGS. 18A-18D illustrate a process of the display system.

FIGS. 17A and 18A respectively illustrate from the left, three frames of input image, namely, an n-th frame, an (n+1)-th frame and an (n+2)-th frame. In the same way as shown in FIGS. 6A and 7A, a subject represented by a star symbol moves rightward in the input image across the n-th frame, the (n+1)-th frame and the (n+2)-th frame.

FIGS. 17B and 18B illustrate an n-th frame through an (n+2)-th frame of input image where a subject outline is set.

As shown in FIGS. 17B and 18B, a rectangular subject outline is set up at the position of the subject in the n-th frame in a manner such that the outline surrounds the subject.

When the target outline is set up in response to the user operation on the remote commander 10, the tracking unit 25B in the display processing apparatus 20 of FIG. 16 tracks the subject within the area of input image surrounded by the subject outline. The tracking unit 25B then outputs the subject outline parameter identifying the subject outline surrounding the subject in each frame of input image.

As shown in FIGS. 17B and 18B, the subject outline identified by the subject outline parameter is moved to track the subject in an area surrounded by the subject outline set in response to the user operation on the remote commander 10.

As previously discussed with reference to FIGS. 6A-6D, the target area setter 25 sets the target area outline centered on the center of gravity of the subject outline. As shown in FIGS. 17C and 18C, as the subject outline, the target area outline is moved to track the subject.

The additional image generator 26 generates the additional image by size converting the target area surrounded by the target area outline out of the input image. The additional image tracks the moving subject in a combination image shown in FIGS. 17D and 18D.

The display processing apparatus 20 of FIG. 16 performs the display process in the same way as the display processing apparatus 20 of FIG. 2. However, the display processing apparatus 20 of FIG. 16 is different from the display processing apparatus 20 of FIG. 2 in the additional image generation process that starts in step S33 of FIG. 12.

Figure 19:
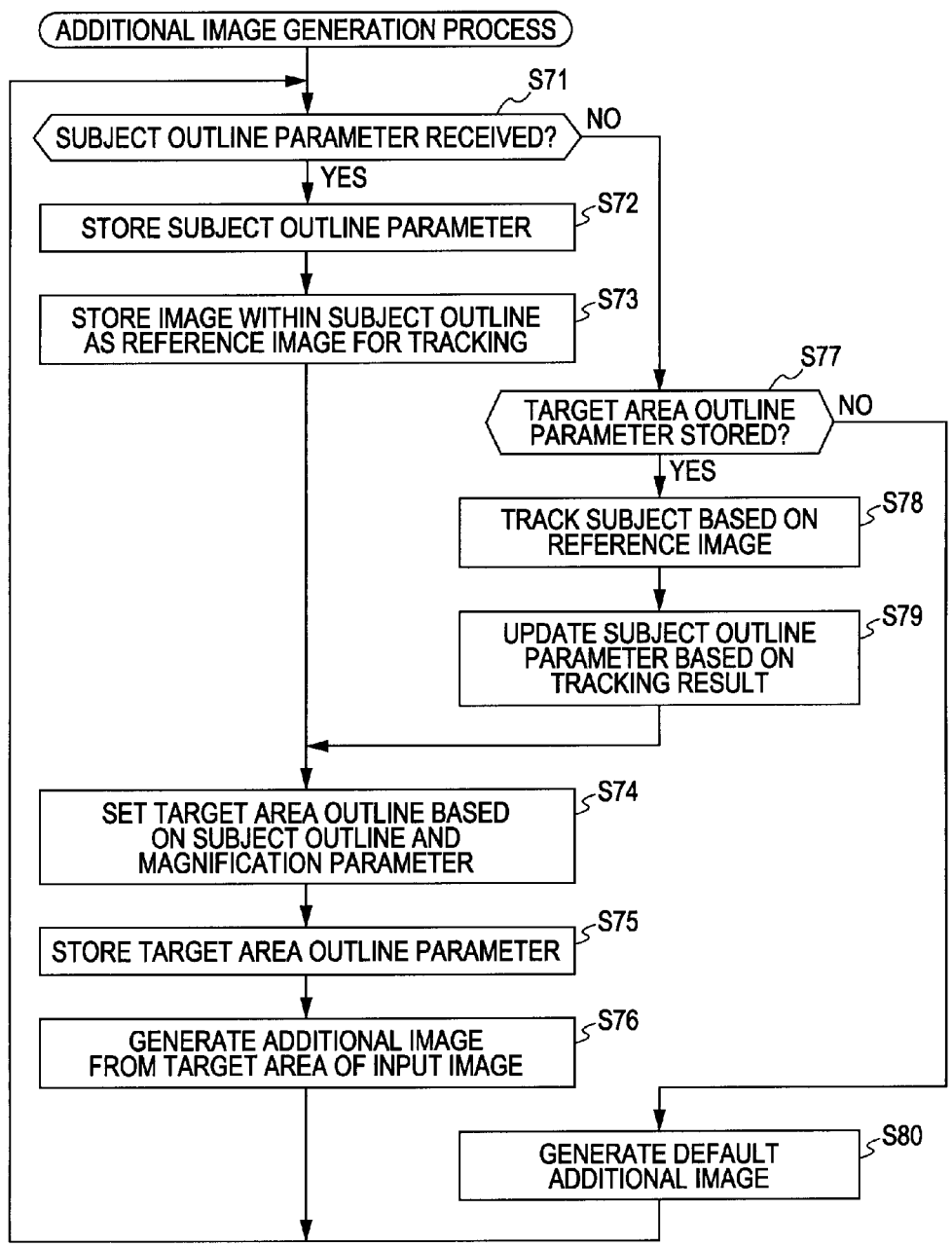
FIG. 19 is a flowchart illustrating of an additional image generation process.

The additional image generation process performed by the display processing apparatus 20 of FIG. 16 in step S33 of FIG. 12 is described below with reference to a flowchart of FIG. 19.

In step S71, the controller 30 determines whether the subject outline parameter identifying the subject outline has been transmitted from the remote commander 10.

If it is determined in step S71 that the subject outline parameter identifying the subject outline has been transmitted from the remote commander 10 (i.e., the operation signal containing the subject outline parameter identifying the subject outline has been transmitted from the remote commander 10 in response to the user operation on the remote commander 10 to specify the subject outline), the controller 30 receives the operation signal from the remote commander 10, and then supplies to the target area setter 25 the subject outline parameter contained in the operation signal. Processing proceeds to step S72.

In step S72, the target area setter 25 receives the subject outline parameter from the controller 30 and causes the memory 25A to store the received subject outline parameter. Processing proceeds to step S73.

In step S73, the target area setter 25 extracts from the input image the area identified by the subject outline parameter stored in step S72 on the memory 25A and causes the memory 25A the area as a reference image for use in tracking by the tracking unit 25B.

In step S74, the target area setter 25 sets the target area outline, based on the subject outline parameter and the magnification parameter α stored on the memory 25A, in the same way as previously discussed in connection with step S43 of FIG. 13. Processing proceeds to step S75.

In step S75, the target area setter 25 causes the memory 25A to store the target area outline parameter identifying the target area outline set in step S74. Processing proceeds to step S76.

In step S76, the target area setter 25 extracts a frame of input image read from the buffer 23 by the image converter 24 an area surrounded by the target area outline identified by the subject outline parameter stored on the memory 25A, and supplies to the additional image generator 26 the extracted area as the target area together with the magnification parameter α from the memory 25A.

In step S76, the additional image generator 26 performs size conversion by magnifying the target area supplied from the target area setter 25 by the magnification parameter α supplied from the target area setter 25 and then supplies the additional image obtained through size conversion to the combination image generator 27. Processing returns to step S71.

In step S34 of FIG. 12, the combination image is generated using the additional image supplied from the additional image generator 26 to the combination image generator 27.

If it is determined in step S71 that the subject outline parameter identifying the subject outline has not been transmitted from the remote commander 10, processing proceeds to step S77. The target area setter 25 determines whether the memory 25A stores the target area outline parameter.

If it is determined in step S77 that the target area outline parameter is stored on the memory 25A, processing proceeds to step S78. In accordance with the reference image stored on the memory 25A, the tracking unit 25B tracks the subject appearing in the reference image, namely, the area of input image surrounded by the subject outline identified by the subject outline parameter stored in step S72 on the memory 25A.

Available as a method of tracking the subject appearing in the reference image is a method of detecting an area similar most to the reference image in each frame of input image using block matching, etc. The method of tracking is disclosed in Japanese Unexamined Patent Application Publication No. 2005-165929.

In step S79, the target area setter 25 updates the subject outline parameter stored on the memory 25A with the subject outline parameter, output by the tracking unit 25B in the tracking operation thereof and identifying the subject outline surrounding the subject subsequent to movement. Processing proceeds to step S74.

In step S74, the target area setter 25 sets the target area outline based on the subject outline parameter and the magnification parameter α stored on the memory 25A. Along with the tracking operation of the tracking unit 25B, the subject outline parameter stored on the memory 25A is updated with the subject outline parameter identifying the subject outline surrounding the subject subsequent to movement. The target area outline set in step S74 is also an outline surrounding the subject subsequent to movement.

If it is determined in step S77 that the memory 25A does not store the target area outline parameter (i.e., the remote commander 10 has not been operated by the user and the memory 25A has no storage of the subject outline parameter required to set the target area outline), processing proceeds to step S80. The additional image generator 26 generates as the additional image the image showing a message prompting the user to specify the subject outline and a black band in the letterbox and supplies the additional image to the combination image generator 27. Processing proceeds to step S71.

Figure 20:
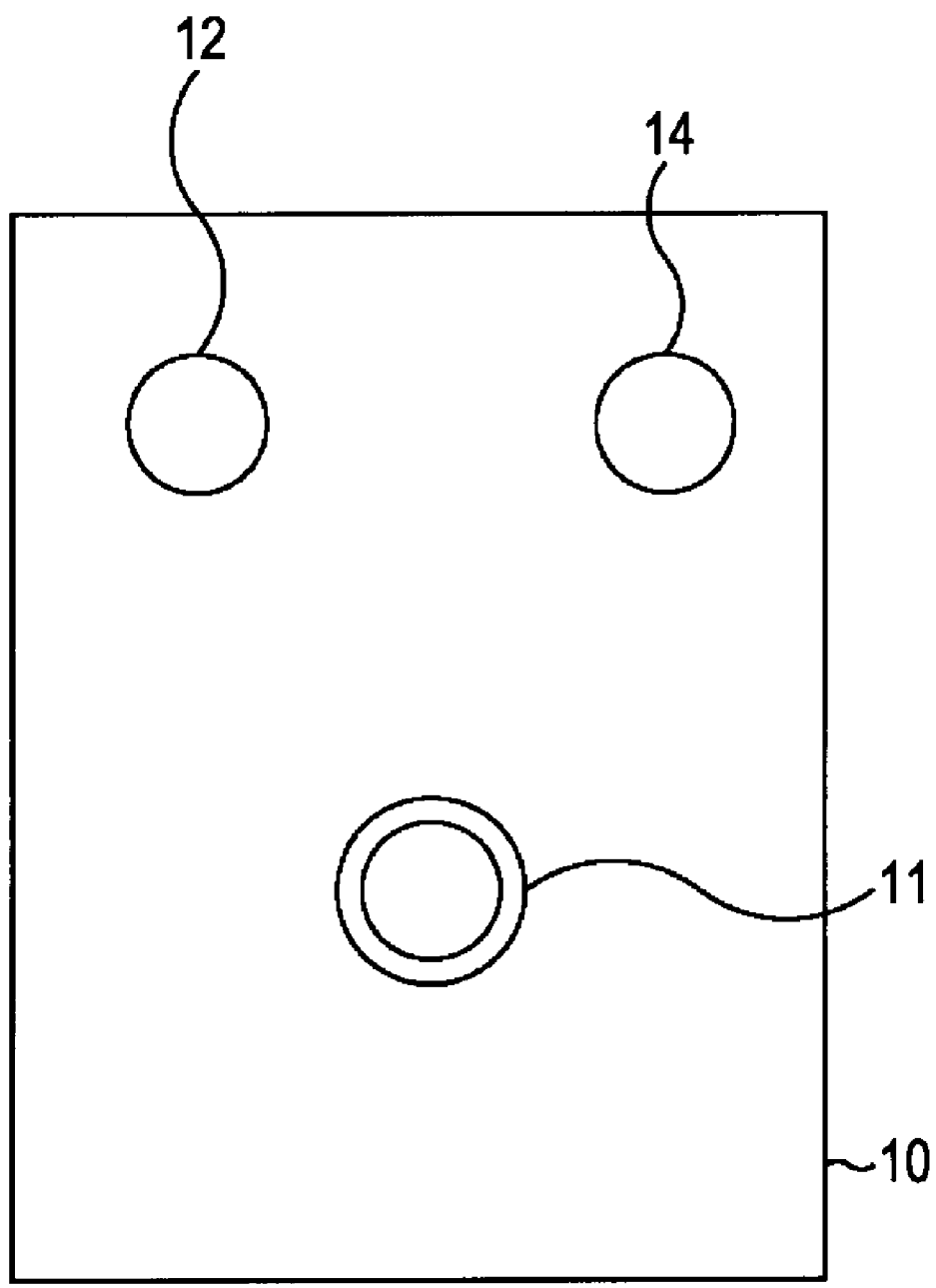
FIG. 20 illustrates a remote commander.

FIG. 20 illustrates another example of the remote commander 10.

In FIG. 20, elements identical to those illustrated in FIG. 14 are designated with the same reference numerals and the discussion thereof is omitted herein.

More specifically, the remote commander 10 of FIG. 20 is identical in structure to the remote commander 10 of FIG. 14 except that the correction start button 13 is not used.

Figure 21:
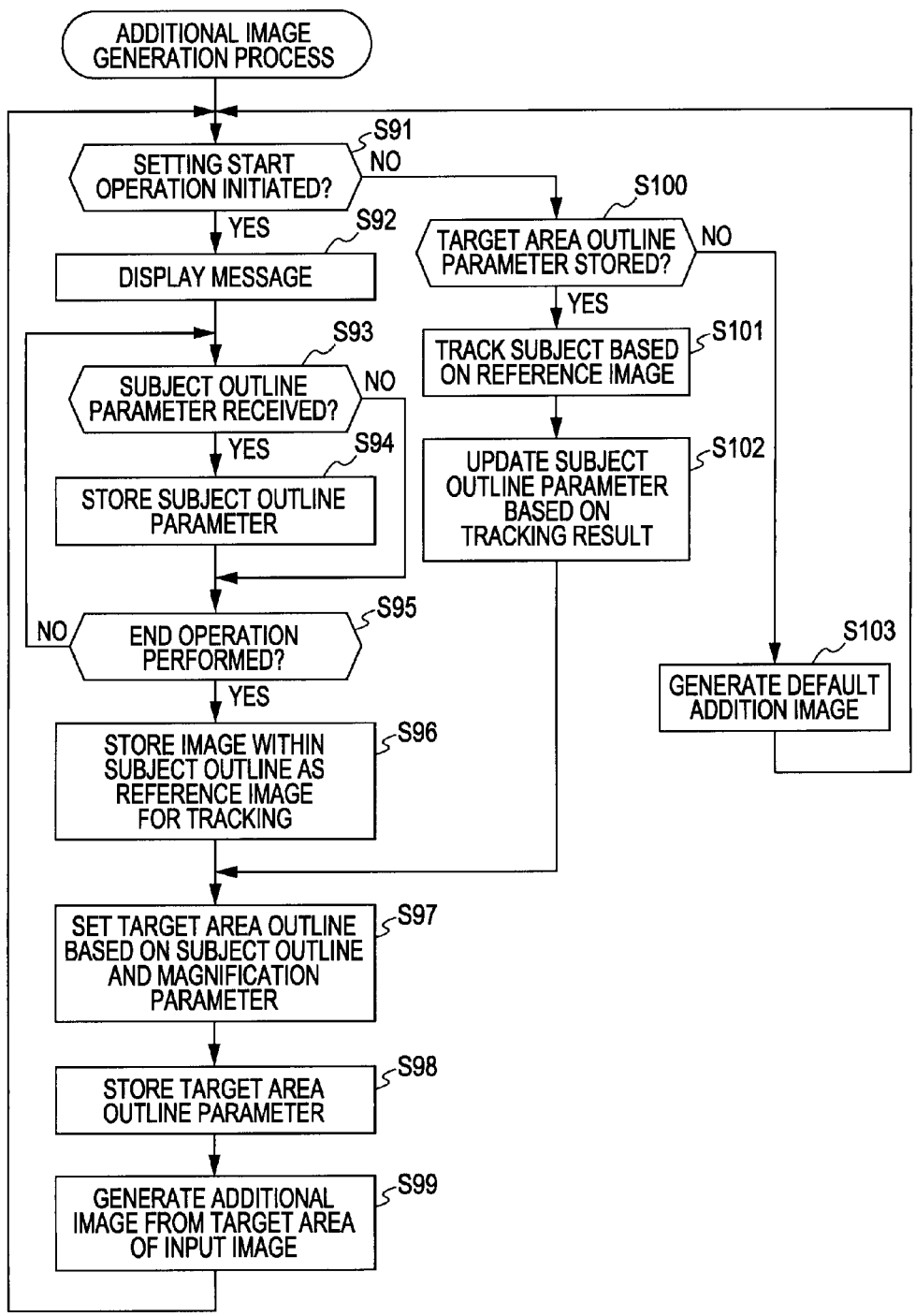
FIG. 21 is a flowchart illustrating a additional image generation process.

The additional image generation process performed in step S33 of FIG. 12 in response to the remote commander 10 of FIG. 20 is described below with reference to a flowchart of FIG. 21.

Steps S91 through S95 are respectively identical to steps S51 through S55 of FIG. 51.

If it is determined in step S95 that the entry button 14 in the remote commander 10 (FIG. 14) has been operated by the user (i.e., if the operation signal has been transmitted from the remote commander 10 in response to the user operation on the remote commander 10 and the controller 30 has received the operation signal), processing proceeds to step S96. The target area setter 25 extracts from the input image the area identified by the subject outline parameter stored in step S94 on the memory 25A and then stores on the memory 25A the extracted area as the reference image for use in tracking by the tracking unit 25B.

In step S97, the target area setter 25 sets the target area outline, based on the subject outline parameter and the magnification parameter α stored on the memory 25A, in the same way as described with reference to step S43 of FIG. 13. Processing proceeds to step S98.

In step S98, the target area setter 25 causes the memory 25A to store the subject outline parameter identifying the target area outline set in step S97. Processing proceeds to step S99.

In step S99, the target area setter 25 extracts from the frame of input image read from the buffer 23 an area surrounded by the target area outline identified by the subject outline parameter stored on the memory 25A as the target area, and then supplies the extracted target area together with the magnification parameter α from the memory 25A to the additional image generator 26. The target area setter 25 then supplies the additional image generator 26 with the target area together with the magnification parameter α from the memory 25A.

Further in step S99, the additional image generator 26 performs the size conversion operation, thereby multiplying the horizontal pixel count and the vertical pixel count of the target area supplied from the target area setter 25 by the magnification parameter α. The additional image generator 26 supplies to the combination image generator 27 the additional image obtained through the size conversion. Processing returns to step S91.

If it is determined in step S91 that the setting start button 12 has not been operated, processing proceeds to step S100. The target area setter 25 determines whether the memory 25A stores the subject outline parameter.

If it is determined in step S100 that the target area outline parameter is stored on the memory 25A, processing proceeds to step S101. In accordance with the reference image stored on the memory 25A, the tracking unit 25B tracks the subject appearing in the reference image, namely, the area of input image surrounded by the subject outline identified by the subject outline parameter stored in step S94 on the memory 25A.

In step S102, the target area setter 25 updates the subject outline parameter stored on the memory 25A with the subject outline parameter, output by the tracking unit 25B in the tracking operation thereof and identifying the subject outline surrounding the subject subsequent to movement. Processing proceeds to step S97.

In step S97, the target area setter 25 sets the target area outline based on the subject outline parameter and the magnification parameter α stored on the memory 25A. Along with the tracking operation of the tracking unit 25B, the subject outline parameter stored on the memory 25A is updated with the subject outline parameter identifying the subject outline surrounding the subject subsequent to movement. The target area outline set in step S97 is also an outline surrounding the subject subsequent to movement.

If it is determined in step S100 that the memory 25A does not store the target area outline parameter (i.e., the remote commander 10 has not been operated by the user and the memory 25A has no storage of the subject outline parameter required to set the target area outline), processing proceeds to step S103. The additional image generator 26 generates as the additional image the image showing a message prompting the user to specify the subject outline and a black band in the letterbox and supplies the additional image to the combination image generator 27. Processing returns to step S91.

In the above discussion, a single subject outline is set up in the display processing apparatus 20. Alternatively, a plurality of subject outlines may be set up.

Figure 22A:
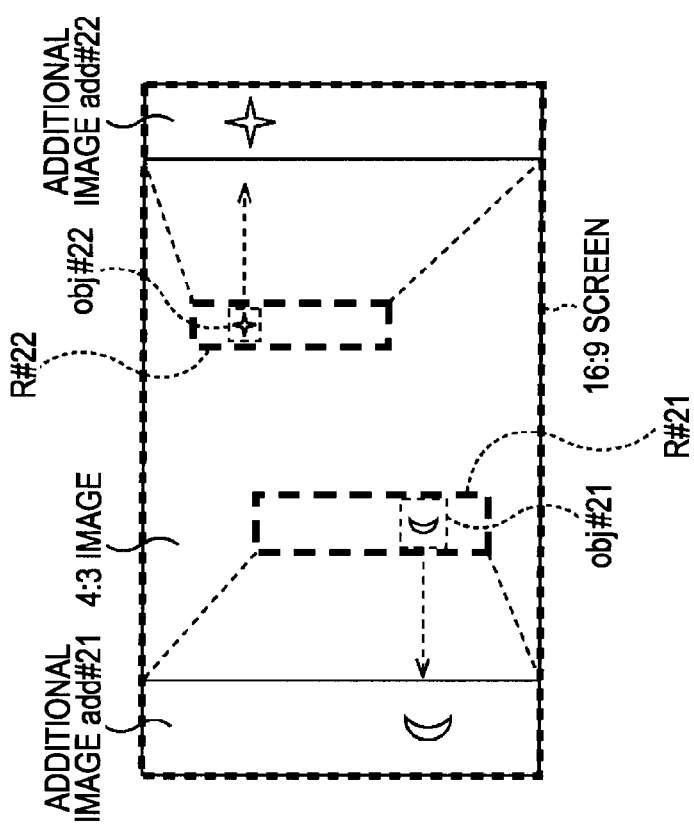
FIGS. 22A and 22B illustrate display examples of a combination image with two subject outlines set.
Figure 22B:
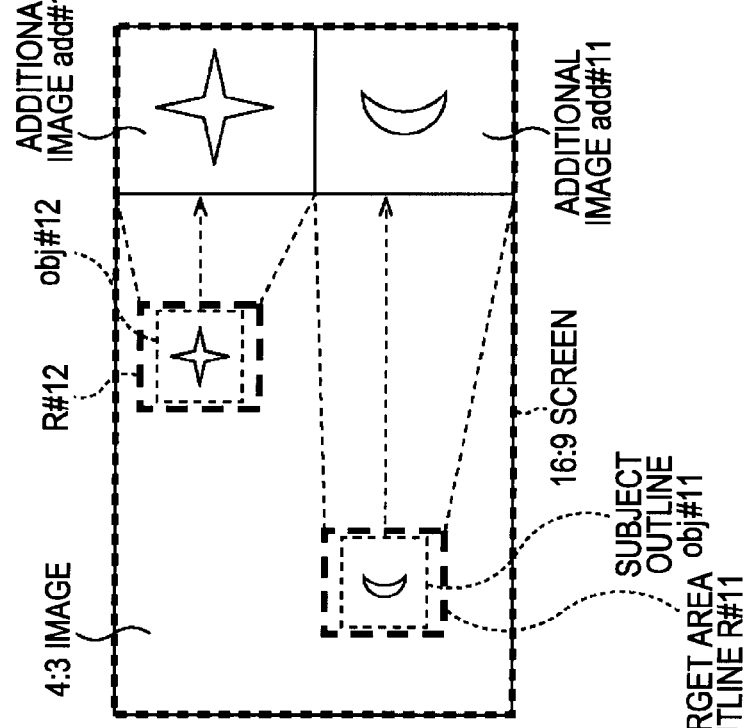

FIGS. 22A and 22B illustrate display examples in which two subject outlines are set up.

FIG. 22A illustrates a display example in which a 4:3 equiaspect ratio image resulting from size converting a 4:3 input image is displayed on a 16:9 screen.

As shown in FIG. 22A, an extra area is caused when the 4:3 equiaspect ratio image is displayed on the 16:9 screen with the left side of the image aligned with the left side of the screen. The extra area is partitioned into a top portion and a bottom portion to display two additional images add#11 and add#12.

More specifically, as shown in FIG. 22A, two subject outlines obj#11 and obj#12 are set up in the input image. Target area outlines R#11 and R#12 are set based on the subject outlines obj#11 and obj#12, respectively.

An image resulting from size converting the target area surrounded by the target area outline R#11 is displayed as the additional image add#11 on the bottom portion of the extra area on the right side during the displaying of the equiaspect ratio image. An image resulting from size converting the target area surrounded by the target area outline R#12 is displayed as the additional image add#12 on the top portion of the extra area on the right side during the displaying of the equiaspect ratio image.

As shown in FIG. 22A, the position relationship of the plurality of subject outlines is reflected in the display position thereof in the additional image. More specifically, the additional image add#11 corresponding to the subject outline obj#11 below the subject outline obj#12 is placed on the lower side and the additional image add#12 corresponding to the subject outline obj#12 above the subject outline obj#11 is placed on the upper side. The position relationship of the subjects in the additional images add#11 and add#12 in the input image matches the position relationship of the additional images add#11 and add#12. The user can thus quickly recognize the status of the subjects appearing in the input image by simply viewing the additional images add#11 and add#12.

As FIG. 22A, FIG. 22B illustrates the position relationship of a plurality of subject outlines reflected in the display position thereof in the corresponding additional images.

FIG. 22B illustrates a display example in which a 4:3 equiaspect ratio image resulting from size converting a 4:3 input image is displayed on a 16:9 screen.

As shown in FIG. 22B, left and right extra areas are caused when the 4:3 equiaspect ratio image is displayed on the 16:9 screen with the image positioned in the center therebetween. The extra areas are used to display two additional images add#21 and add#22.

More specifically, as shown in FIG. 22B, two subject outlines obj#21 and obj#22 are set up in the input image. Target area outlines R#21 and R#22 are set based on the subject outlines obj#21 and obj#22, respectively.

An image resulting from size converting the target area surrounded by the target area outline R#21 is displayed as the additional image add#21 on the left extra area during the displaying of the equiaspect ratio image. An image resulting from size converting the target area surrounded by the target area outline R#22 is displayed as the additional image add#22 on the right extra area during the displaying of the equiaspect ratio image.

As shown in FIG. 22B, the position relationship of the plurality of subject outlines is reflected in the display position thereof in the additional image. More specifically, the additional image add#21 corresponding to the subject outline obj#21 to the left of the subject outline obj#22 is placed on the left side and the additional image add#22 corresponding to the subject outline obj#22 to the right of the subject outline obj#21 is placed on the right side. Since the position relationship of the subjects in the additional images add#21 and add#22 in the input image matches the position relationship of the additional images add#21 and add#22. The user can thus quickly recognize the status of the subjects appearing in the input image by simply viewing the additional images add#21 and add#22.

When a 16:9 equiaspect ratio image resulting from size converting a 16:9 input image is displayed on a 4:3 screen, a plurality of subject outlines may also be set up as shown in FIGS. 22A and 22B. The additional images corresponding to the plurality of subject outlines are displayed in positions reflecting the position relationship of the plurality of subject outlines.

In the above example, the display processing apparatus 20 displays the rectangular additional image on the entire rectangular extra area. Alternatively, the additional image may be displayed on part of the extra area. Furthermore, each of the extra area and the additional image is not limited to a rectangular shape.

Figure 23A:
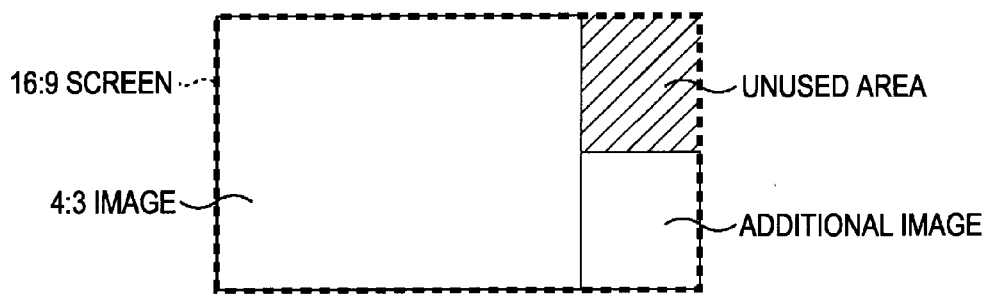
FIGS. 23A-23C illustrate display examples of additional images.
Figure 23B:
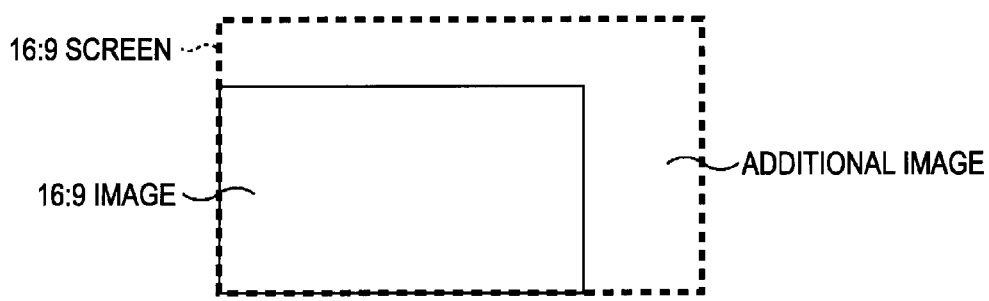
Figure 23C:
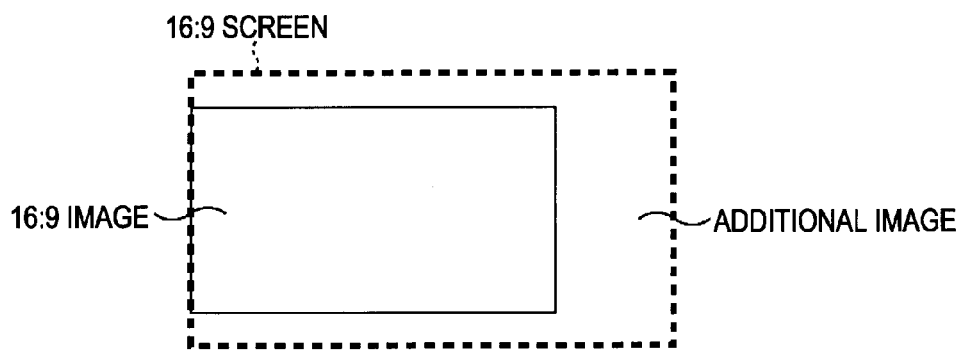

FIGS. 23A-23C illustrate display examples of additional images.

As shown in FIG. 23A, a 4:3 equiaspect ratio image is displayed on a 16:9 screen with the left side thereof aligned with the left side of the screen, and the additional image is displayed on part of an extra area rather than on the entire extra area.

An input image may also be displayed as shown in FIGS. 23B and 23C. In this case, the aspect ratio of the input image may or may not equal the aspect ratio of the display screen.

For example, when the aspect ratio of the input image and the aspect ratio of the display screen equal each other, each having 16:9, an 16:9 equiaspect ratio image smaller in size than a 16:9 screen is displayed so that a L-shaped top and right portion of the 16:9 screen is left as an extra area. An additional image may be displayed on whole or part of the extra area.

Furthermore, when the aspect ratio of the input image and the aspect ratio of the display screen equal each other, each having 16:9, a 16:9 equiaspect ratio image smaller in size than a 16:9 screen is displayed so that a horizontally aligned U-shaped top, right and bottom portion of the 16:9 screen is left as an extra area. An additional image may be displayed on whole or part of the extra area.

As described above, the display processing apparatus 20 converts the input image into the equiaspect ratio image. The equiaspect ratio image has the same aspect ratio as the input image, has one of the horizontal size and the vertical size thereof equal to one of the horizontal size and the vertical size of a display screen of the display 29, and has the image size thereof, being equal to or smaller than the size of the display screen and resulting from magnifying the input image with the same magnification applied to the horizontal size and the vertical size of the input image. The equiaspect ratio image is then displayed on the display 29 with the aspect ratio unchanged. The additional image having the image size within the extra area unused for displaying the equiaspect ratio image is generated from the input image. The display processing apparatus 20 further generates the combination image into which the equiaspect ratio image obtained by converting each frame or each field of the input image and the additional image generated from the frame or the field of the input image are combined in a manner such that the equiaspect ratio image and the additional image are free from overlapping each other. The combination image is displayed on the display 29.

Any subject in the input image is thus displayed with similarity thereof maintained, and the display screen displaying the image is effectively used.

Since the equiaspect ratio image of the input image and the additional image that results from expanding, as the target area, part of the equiaspect ratio image displayed on the display 29 are displayed together, the user feels like viewing part of the input image with a microscope. Microscopic viewing effect is thus enjoyed.

When the display processing apparatus 20 generates the additional image having the same image size as the extra area, the entire display screen of the display 29 is effectively used.

The display processing apparatus 20 may track a subject within the subject outline set in response to the user operation and set as a target area an area containing the subject. Without the user's intervention to operate the remote commander 10 and specify the subject outline, an image of the moving subject may be continuously monitored as an additional image.

The size conversion performed by the image converter 24 (FIGS. 2 and 13) is a pixel count conversion. The pixel count conversion may be performed by the interpolation process, the decimation process, or the class classification process. With reference to FIGS. 24 through 34, the class classification process is described below.

As an example of the class classification process, an image conversion process for converting first image data (image signal) into second image data (image signal) is described below.

The image conversion process for converting the first image data into the second image data can take one of a variety of signal processes depending on the definition of the first and second image data.

For example, if the first image data is image data of a low spatial resolution and the second image data is image data of a high spatial resolution, the image conversion process is a spatial resolution improvement process intended to improve spatial resolution.

If the first image data is image data of a low signal-to-noise (S/N) ratio and the second image data is image data of a high S/N ratio, the image conversion process is a noise reduction process intended to reduce noise.

If the first image data is image data having a predetermined pixel count (image size) and the second image data is image data having more or less pixel count, the image conversion process is a resize process intended to resize an image (for scale expansion or scale contraction).

If the first image data is image data having a low time resolution and the second image data is image data having a high time resolution, the image conversion process is a time resolution improvement process intended to improve time resolution.

If the first image data is image data obtained by decoding image data coded by block through moving picture experts group (MPEG), and the second image data is image data prior to coding, the image conversion process is a distortion removal process intended to remove a variety of distortions including block distortion caused in MPEG encoding and decoding.

In the spatial resolution improvement process, the first image data as the low spatial resolution image data is converted into the second image data as the high spatial resolution image data. In this case, the second image data may have the same pixel count as the first image data, or may have more pixel count than the first image data. If the second image data has a pixel count more than that of the first image data, the spatial resolution improvement process is not only to improve spatial resolution but also to resize an image size (pixel count).

In this way, the image conversion process can take one of the variety of signal processes depending on the definition of the first image data and the second image data.

In the class classification process as the image conversion process, a target pixel (value) in the second image data is classified into one of a plurality of classes according to a predetermined rule, a tap coefficient is determined from thus obtained class, and a pixel (value) in the first image data is selected for the target pixel. The target pixel (value) is thus calculated using the tap coefficient and the pixel (value) in the first image data.

FIG. 24 illustrates the structure of an image conversion apparatus 101 performing the image conversion process using the class classification process.

In the image conversion apparatus 101, as shown in FIG. 24, the first image data is supplied to each of a tap selector 112 and a tap selector 113.

A target pixel selector 111 successively sets each pixel forming the second image data as a target pixel, and then supplies information regarding the target pixel to a required block.

The tap selector 112 selects, as predictive taps, (values of) several pixels forming the first image data used to predict (the value of) the target image.

More specifically, the tap selector 112 selects, as predictive taps, a plurality of pixels in the first image data placed closest in time or space to the position of the target pixel in time and space.

The tap selector 113 selects, as class taps, several pixels forming the first image data used to classify the target pixels into each of the classes according to a predetermined rule. More specifically, the tap selector 113 selects the class tap in the same way as the tap selector 112 selects the predictive tap.

The predictive tap and the class tap may have the same tap structure (position relationship with respect to the target pixel), or may have different tap structures.

The predictive tap obtained by the tap selector 112 is supplied to a prediction calculator 116. The class tap obtained by the tap selector 113 is supplied to a class classifier 114.

The class classifier 114 classifies the target pixels according to the class tap supplied from the tap selector 113, and supplies a class code responsive to the obtained class to a coefficient output unit 115.

The class classification method may be the one disclosed in Adaptive Dynamic Range Coding (ADRC).

In accordance with the method used in ADRC, (the value of) the pixel is ADRC processed, and the class of the target pixel is determined based on the resulting ADRC code.

In K bit ADRC, a maximum value MAX and a minimum value MIN of the pixel value of the pixel forming the class tap are detected, and DR=MAX−MIN is used as localized dynamic range of a set. Based on the dynamic range DR, the pixel value of each pixel forming the class tap is re-quantized into K bits. More specifically, the minimum value MIN is subtracted from the pixel value of the pixel forming the class tap, and the resulting difference is then divided (re-quantized) by DR/$2^K$. The K bit pixel values of the pixels forming the class tap are arranged into a bit train in accordance with a predetermined order. The bit train is output as the ADRC code. For example, when the class tap is 1 bit ADRC processed, the pixel value of the pixel forming the class tap is divided by the mean value of the maximum value MAX and the minimum value MIN (with fractions rounded). The pixel value of each pixel becomes 1 bit (binarized). The bit train containing 1 bit pixel values arranged in a predetermined order is output as the ADRC code.

The class classifier 114 can output, as a clad code, a pattern of level distribution of the pixel values of the pixels forming the class tap. If the class tap is composed of the pixel values of the N pixels with the pixel value of each pixel assigned with K bits, the class code output from the class classifier 114 is $(2^N)^K$. The class code thus becomes an enormous value that is K-th power to the pixel value of the pixel.

The class classifier 114 preferably class classifies an amount of information of class tap rather than compressing the amount of information of the class tap through the ADRC process or vector quantization process.

The coefficient output unit 115 stores the tap coefficient of each class determined through a learning process to be discussed later. The coefficient output unit 115 further outputs the tap coefficient at an address corresponding to a class code supplied from the class classifier 114 (the tap coefficient of the class represented by the class code supplied from the class classifier 114), out of the stored tap coefficients. That tap coefficient is supplied to the prediction calculator 116.

The tap coefficient corresponds to a coefficient to be multiplied by input data in a tap of a digital filter.

The prediction calculator 116 acquires the predictive tap output from the tap selector 112 and the tap coefficient output from the coefficient output unit 115. Using the predictive tap and the tap coefficient, the prediction calculator 116 performs a prediction calculation to determine a predictive value of a true value of the target pixel. The prediction calculator 116 thus determines and outputs (the predictive value of) the pixel value of the target pixel, namely, the pixel value of the pixel forming the second image data.

Figure 25:
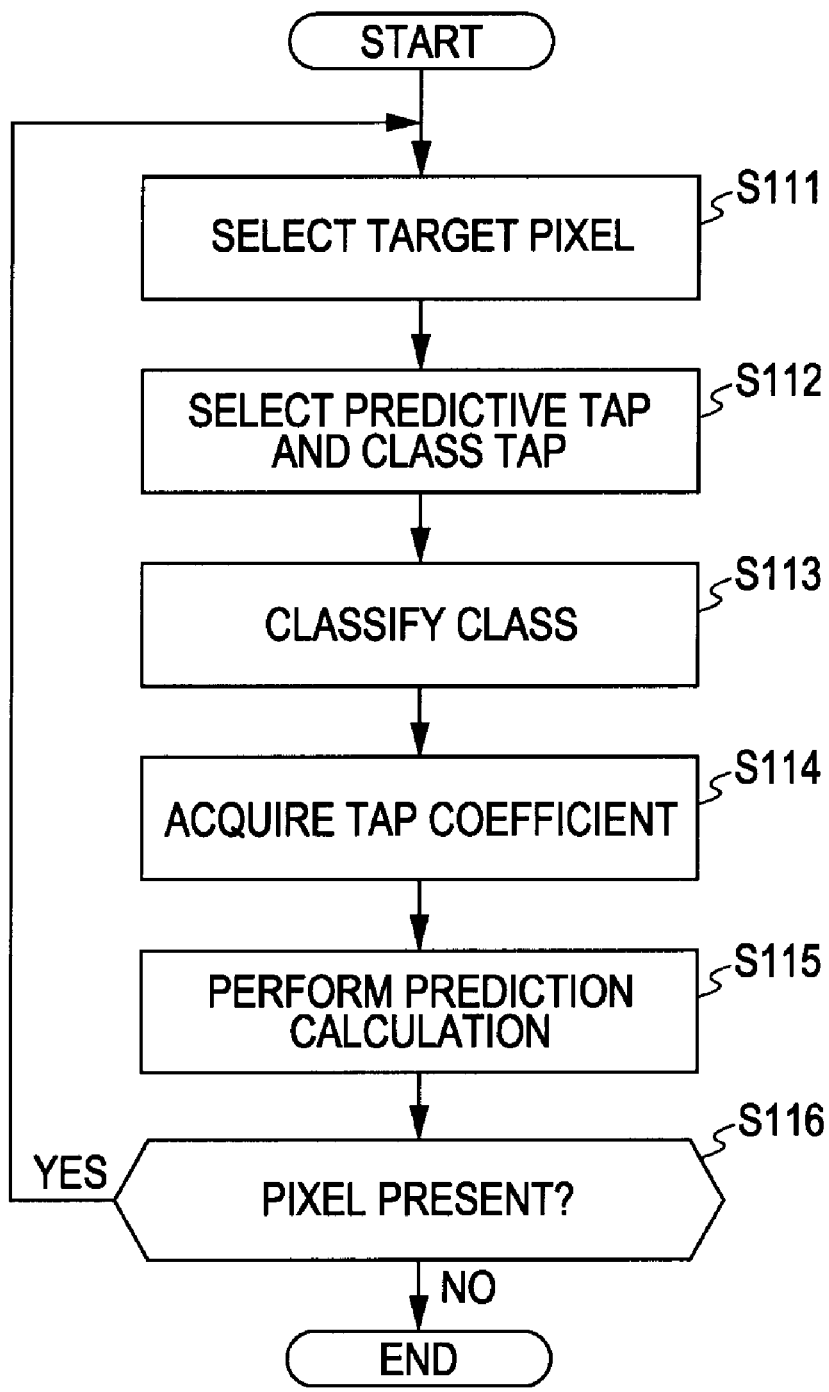
FIG. 25 is a flowchart illustrating an image conversion process performed by the image conversion apparatus.

The image conversion process of the image conversion apparatus 101 of FIG. 24 is described below with reference to FIG. 25.

In step S111, the target pixel selector 111 selects as a target pixel one of the pixels not yet selected as a target pixel and forming the second image data responsive to the first image data input to the image conversion apparatus 101. More specifically, the target pixel selector 111 selects, in a raster scan order, as a target pixel one of the pixels not yet selected as a target pixel and forming the second image data. Processing proceeds to step S112.

In step S112, the tap selector 112 and the tap selector 113 select, from the first image data, the predictive tap and the class tap of the target pixel, respectively. The predictive tap is supplied from the tap selector 112 to the prediction calculator 116. The class tap is supplied from the tap selector 113 to the class classifier 114.

The class classifier 114 receives the class tap of the target pixel from the tap selector 113. In step S113, the class classifier 114 class classifies the target pixel according to the class tap. The class classifier 114 outputs to the coefficient output unit 115 the class code representing the class of the target pixel obtained as a result of class classification. Processing proceeds to step S114.

In step S114, the coefficient output unit 115 acquires (reads) and output the tap coefficient stored at the address responsive to the class code supplied from the class classifier 114. Furthermore in step S114, the prediction calculator 116 acquires the tap coefficient output from the coefficient output unit 115. Processing proceeds to step S115.

In step S115, the prediction calculator 116 performs the predetermined prediction calculation using the predictive tap output from the tap selector 112 and the tap coefficient acquired from the coefficient output unit 115. The prediction calculator 116 determines and outputs the pixel value of the target pixel. Processing proceeds to step S116.

In step S116, the target pixel selector 111 determines whether the second image data has a pixel not yet selected as a target pixel. If it is determined in step S116 that the second image data contains a pixel not yet selected as a target pixel, processing returns to step S111. The same process as described above is repeated.

If it is determined in step S116 that the second image data does not contain a pixel not yet selected as a target pixel, processing thus ends.

The prediction calculation of the prediction calculator 116 and the tap coefficient learning process of the coefficient output unit 115 of FIG. 24 are described below.

The second image data is high definition image data and the first image data is low definition image data that is lowered in definition by low-pass filtering the high definition image data. The predictive tap is selected from the low definition image data. Using the predictive tap and the tap coefficient, the pixel value of the pixel of the high definition image data is determined through the predetermined prediction calculation process.

The predetermined prediction calculation process is now a linear prediction calculation. Pixel value y of a high definition pixel is determined by the following linear equation (1):

$$y = \sum_{n=1}^{N} w_n x_n \quad (1)$$

where $x_n$ is a pixel value of an n-th pixel of the low definition image data (hereinafter referred to as low definition pixel) forming the predictive tap relating to the high definition pixel y, and $w_n$ is an n-th tap coefficient to be multiplied by (the pixel value of) the n-th low definition pixel. In equation (1), the predictive tap is composed of N low definition pixels $x_1$, $x_2, \ldots, x_N$.

The pixel value y of the high definition pixel is may be determined using a higher order equation such as a quadratic equation rather than the linear equation.

Let $y_k$ represent a true value of the pixel value of a high definition pixel of k-th sample, and $y_k'$ represent a predictive value of the true value $y_k$ obtained from equation (1), and a predictive error $e_k$ of the predictive value $y_k'$ is expressed by equation (2):

$$e_k = y_k - y_k' \quad (2)$$

The predictive value $y_k'$ is calculated using equation (1). When equation (2) is reorganized in accordance with the predictive value $y_k'$ in accordance with equation (1), the following equation (3) is obtained:

$$e_k = y_k - \left( \sum_{n=1}^{N} w_n x_{n,k} \right) \quad (3)$$

where $x_{n,k}$ represents an n-th low definition image forming the predictive tap of the high definition pixel of the k-th sample.

A tap coefficient $w_n$ causing the predictive error $e_k$ in equation (3) (or equation (2)) to be zero is optimum for predicting the high definition pixel. It is generally difficult to determine such tap coefficients $w_n$ for all high definition pixels.

The least squares method may be used to determine optimum tap coefficient $w_n$. The optimum tap coefficient $w_n$ may be determined by minimizing the sum E of squared error expressed by the following equation (4):

$$E = \sum_{k=1}^{K} e_k^2 \qquad (4)$$

where K represents the number of samples of a set of the high definition pixel $y_k$ and low definition pixels $x_{1k}, x_{2k}, \ldots, x_{Nk}$ forming the predictive tap of the high definition pixel $y_k$ (namely, the number of learning samples).

As expressed in equation (5), the minimum value of the total sum E of the squared errors of equation (4) is determined by partial differentiating the total sum E by the tap coefficient $w_n$ and by making the result equal to zero.

$$\frac{\partial E}{\partial w_n} = e_1 \frac{\partial e_1}{\partial w_n} + e_2 \frac{\partial e_2}{\partial w_n} + \cdots + e_k \frac{\partial e_k}{\partial w_n} = 0 \quad (n = 1, 2, \cdots, N) \qquad (5)$$

If equation (3) is partial differentiated by the tap coefficient $w_n$ the following equation (6) results:

$$\frac{\partial e_k}{\partial w_1} = -x_{1,k}, \frac{\partial e_k}{\partial w_2} = -x_{2,k}, \cdots, \frac{\partial e_k}{\partial w_N} = -x_{N,k}, \qquad (6)$$

$$(k = 1, 2, \cdots, K)$$

The following equation (7) is obtained from equations (5) and (6):

$$\sum_{k=1}^{K} e_k x_{1,k} = 0, \sum_{k=1}^{K} e_k x_{2,k} = 0, \cdots \sum_{k=1}^{K} e_k x_{N,k} = 0 \qquad (7)$$

By substituting equation (3) for $e_k$ in equation (7), equation (7) is expressed by a normal equation (8):

$$\begin{bmatrix} \left(\sum_{k=1}^{K} x_{1,k}, x_{1,k}\right) & \left(\sum_{k=1}^{K} x_{1,k}, x_{2,k}\right) & \cdots & \left(\sum_{k=1}^{K} x_{1,k}, x_{N,k}\right) \\ \left(\sum_{k=1}^{K} x_{2,k}, x_{1,k}\right) & \left(\sum_{k=1}^{K} x_{2,k}, x_{2,k}\right) & \cdots & \left(\sum_{k=1}^{K} x_{2,k}, x_{N,k}\right) \\ \vdots & \vdots & \ddots & \vdots \\ \left(\sum_{k=1}^{K} x_{N,k}, x_{1,k}\right) & \left(\sum_{k=1}^{K} x_{N,k}, x_{2,k}\right) & \cdots & \left(\sum_{k=1}^{K} x_{N,k}, x_{N,k}\right) \end{bmatrix} \begin{bmatrix} w_1 \\ w_2 \\ \vdots \\ w_N \end{bmatrix} = \qquad (8)$$

-continued $$\begin{bmatrix} \left(\sum_{k=1}^{K} x_{1,k}, y_k\right) \\ \left(\sum_{k=1}^{K} x_{2,k}, y_k\right) \\ \vdots \\ \left(\sum_{k=1}^{K} x_{N,k}, y_k\right) \end{bmatrix}$$

The normal equation (8) is solved for the tap coefficient $w_n$ using sweep method (Gauss-Jordan elimination).

By writing and solving the normal equation (8) for each class, the optimum tap coefficient $w_n$ (minimizing the total sum E of the squared errors) is determined on a per class basis.

Figure 26:
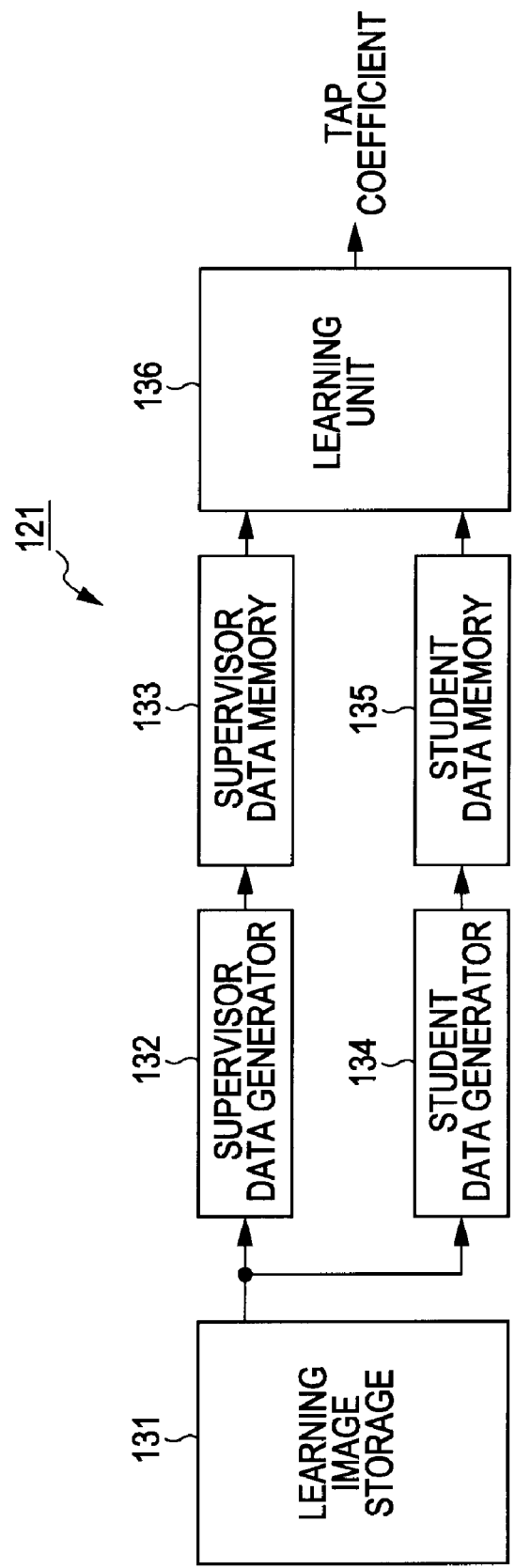
FIG. 26 is a block diagram illustrating a learning apparatus learning a tap coefficient.

FIG. 26 illustrates a learning apparatus 121 that determines the tap coefficient $w_n$ by writing and solving the normal equation (8).

As shown in FIG. 26, a learning image storage 131 in the learning apparatus 121 stores learning image data for use in learning the tap coefficient $w_n$. The learning image data may be high definition image data having a high definition.

A supervisor data generator 132 reads the learning image data from the learning image storage 131. The supervisor data generator 132 generates a supervisor (true value) in the learning of the tap coefficient from the learning image data, namely, supervisor data becoming a pixel at a map destination in the prediction calculation expressed by equation (1). The supervisor data generator 132 then supplies the supervisor data to a supervisor data memory 133. The supervisor data generator 132 herein supplies as the supervisor data the high definition image data, namely, the learning image data to the supervisor data memory 133.

The supervisor data memory 133 stores as the supervisor data the high definition image data supplied from the supervisor data generator 132. The supervisor data corresponds to the second image data.

A student data generator 134 reads the learning image data from the learning image storage 131. The student data generator 134 generates from the learning image data a student in the learning of the tap coefficient, namely, student data becoming a pixel value to be converted through mapping in the prediction calculation expressed by equation (1). The student data generator 134 filters the high definition image data as the learning image data, thereby lowering definition level. The student data generator 134 thus generates low definition image data and then supplies as the student data the low definition image data to the student data memory 135.

The student data memory 135 stores the student data supplied from the student data generator 134. The student data corresponds to the first image data.

A learning unit 136 successively selects as a target pixel a pixel forming the high definition image data stored as the student data on the supervisor data memory 133. The learning unit 136 selects as a predictive tap a low definition pixel from among low definition pixels forming the low definition image data as the student data stored on the student data memory 135, the selected low definition pixel having the same tap structure as the one selected by the tap selector 112 of FIG. 24. Using each pixel forming the student data and the predictive tap selected at the time the pixel being selected as the target pixel, the learning unit 136 writes and solves equation (8) for each class. The learning unit 136 thus determines the tap coefficient for each class.

FIG. 27 illustrates the structure of the learning unit 136 of FIG. 26.

A target pixel selector 141 selects as a target pixel each pixel forming the supervisor data stored on the supervisor data memory 133 and supplies information indicating the target pixel to each element.

The tap selector 142 selects the same pixel as the one selected by the tap selector 112 of FIG. 24, from the low definition pixels forming the low definition image data stored as the student data on the student data memory 135. In this way, the tap selector 142 acquires the predictive tap having the same tap structure as that of the one acquired by the tap selector 112 and supplies the predictive tap to a multiplication and summation unit 145.

In response to the target pixel, a tap selector 143 selects the same pixel as the one selected by the tap selector 113 of FIG. 24, from the low definition pixels forming the low definition image data stored as the student data on the student data memory 135. The tap selector 143 thus acquires the class tap having the same tap structure as that of the tap acquired by the tap selector 113. The class tap is then supplied to a class classifier 144.

Based on the class tap output from the tap selector 143, the class classifier 144 performs the same class classification as that of the class classifier 114 of FIG. 24. The class classifier 144 then supplies to the multiplication and summation unit 145 the class code responsive to the class thus obtained.

The multiplication and summation unit 145 reads the supervisor data as the target pixel from the supervisor data memory 133 and performs a multiplication and summation process on the target pixel and the student data forming the predictive tap for the target pixel supplied from the tap selector 142 on a per class code supplied from the class classifier 144.

More specifically, the multiplication and summation unit 145 receives the supervisor data $y_k$ from the supervisor data memory 133, the predictive tap $x_{n,k}$ output from the tap selector 142 and the class code output from the class classifier 144.

For each class code supplied from the class classifier 144, the multiplication and summation unit 145 performs the multiplication ($x_{n,k}x_{n',k}$) of the student data and summation ($\Sigma$) in the matrix on the left side of equation (8) using the predictive tap (student data) $x_{n,k}$.

For each class corresponding to the class code supplied from the class classifier 144, the multiplication and summation unit 145 performs multiplication ($x_{n,k}y_k$) and summation ($\Sigma$) in the vector on the right side of equation (8) on the student data $x_{n,k}$ and the supervisor data $y_k$, using the predictive tap (student data) $x_{n,k}$ and the supervisor data $y_k$.

The multiplication and summation unit 145 stores, on an internal memory thereof (not shown), components ($\Sigma x_{n,k} x_{n',k}$) of the matrix on the left side and components ($\Sigma x_{n,k} y_k$) of the vector on the right side of equation (8) determined for the supervisor data as the previous target pixel. The multiplication and summation unit 145 then sums components $x_{n,k+1} x_{n',k+1}$ or $x_{n,k+1} y_{k+1}$, calculated using the supervisor data $y_{k+1}$ as a new target pixel and the student data $x_{n,k+1}$, to the components ($\Sigma x_{n,k} x_{n',k}$) of the matrix and the components ($\Sigma x_{n,k} y_k$) of the vector (summation of equation (8)).

The multiplication and summation unit 145 performs the multiplication and summation process with all the supervisor data stored on the supervisor data memory 133 (FIG. 26) as the target pixels. The multiplication and summation unit 145 thus writes the normal equation (8) for each class and then supplies the normal equation (8) to a tap coefficient calculator 146.

The tap coefficient calculator 146 solves the normal equation (8) for each class supplied from the multiplication and summation unit 145, thereby determining and outputting the optimum tap coefficient $w_n$ for each class.

The coefficient output unit 115 in the image conversion apparatus 101 of FIG. 24 stores the tap coefficient $w_n$ thus determined for each class.

The tap coefficient permits a variety of image conversion processes to be performed depending on the image data as the student data corresponding to the first image data and the image data as the supervisor data corresponding to the second image data.

Figure 28A:
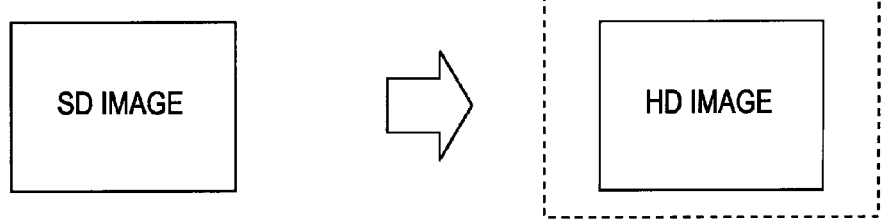
FIGS. 28A-28D illustrate image conversion processes.

As described above, the high definition image data is the supervisor data corresponding to the second image data and the low definition image data that is obtained by lowering the high definition image data in spatial resolution is the student data corresponding to the first image data. The tap coefficient is learned on the first image data and the second image data. As shown in FIG. 28A, the tap coefficient permits the image conversion process as the spatial resolution improvement process in which the first image data as the low definition image data (standard definition (SD) image data) is converted into the high definition image data (high definition (HD) image data) having a higher spatial resolution.

In this case, the second image data (student data) may or may not have the same pixel count as the second image data (supervisor data).

Figure 28B:
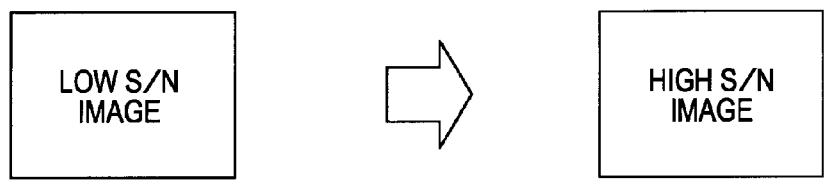

For example, the high definition image data may be supervisor data and the student data may be image data that is obtained by superimposing noise on the high definition image data as the supervisor data. The tap coefficient is learned on the first image data and the second image data. As shown in FIG. 28B, the tap coefficient permits the image conversion process as a noise removal process in which the first image data as image data having a low S/N ratio is converted into the second image data having a high S/N ratio with noise contained in the first image data removed.

Figure 28C:
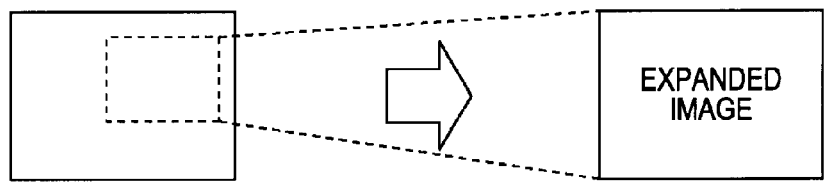

For example, the tap coefficient is learned with given image data being the supervisor data and the student data being image data that results from decimating the pixels of the supervisor data. As shown in FIG. 28C, the tap coefficient permits as the image conversion process a expansion process (resize process) in which the first image data as part of image data is expanded into the second image data.

The tap coefficient for performing the expansion process is learned on the high definition image data as the supervisor data and as the student data the low definition image data that is lowered in spatial resolution by decimating the pixels in the high definition image data.

Figure 28D:
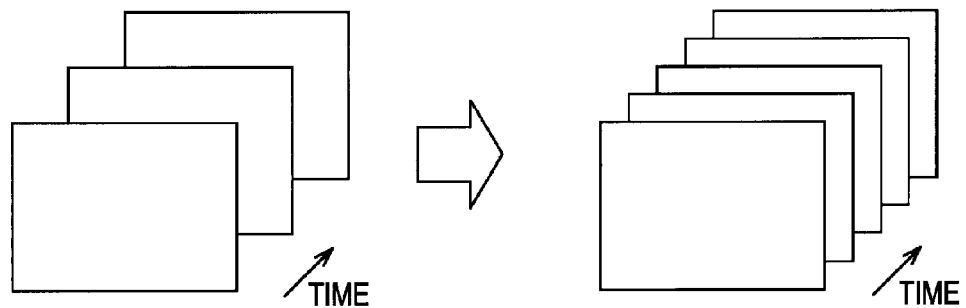

For example, the tap coefficient is learned on image data having a high frame rate as the supervisor data and, as the student data, image data that results from decimating the frames of the image data having the high frame rate. As shown in FIG. 28D, the tap coefficient permits as the image conversion process a time resolution improvement process in which the first image data having a predetermined frame rate is converted into the second image data having a high frame rate.

Figure 29:
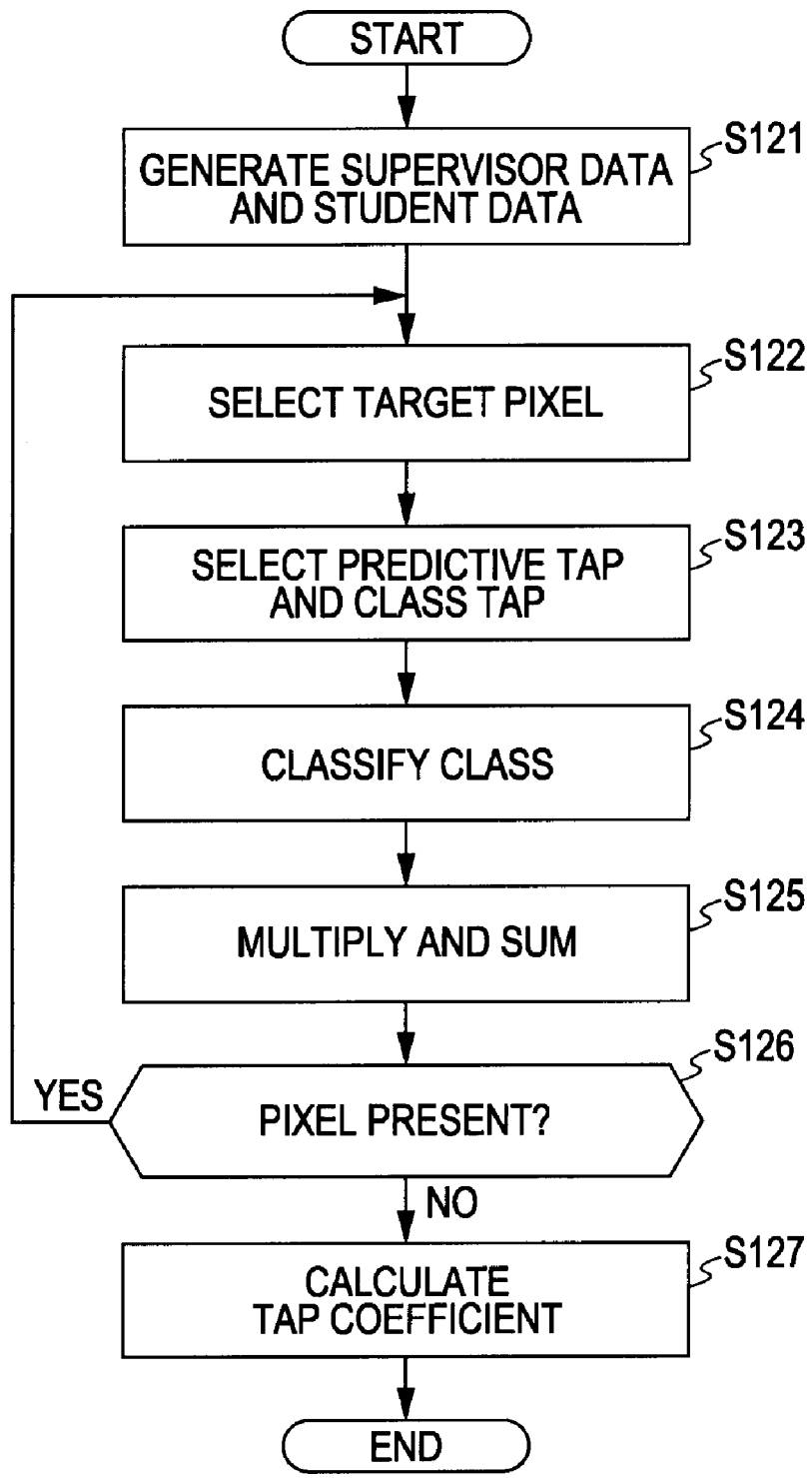
FIG. 29 is a flowchart illustrating a learning process of the learning apparatus.

The learning process of the learning apparatus 121 of FIG. 26 is described below with reference to a flowchart of FIG. 29.

In step S121, the supervisor data generator 132 and the student data generator 134 generate the supervisor data and the student data respectively, based on the learning image data stored on the learning image storage 131. The supervisor data and the student data are respectively supplied to the supervisor data memory 133 and the student data memory 135.

The supervisor data generated by the supervisor data generator 132 and the student data generated by the student data generator 134 are different depending on the type of the image conversion process in which the tap coefficient is learned.

In step S122, the target pixel selector 141 in the learning unit 136 (FIG. 27) selects as a target pixel a pixel of the supervisor data not yet selected as a target pixel and stored on the supervisor data memory 133. Processing proceeds to step S123. The tap selector 142 selects, for the target pixel, a pixel of the student data for a predictive tap from the student data stored on the student data memory 135, and then supplies the selected pixel to the multiplication and summation unit 145. The tap selector 143 selects, for the target pixel, the student data, as a class tap, from the student data stored on the student data memory 135, and then supplies the student data to the class classifier 144.

In step S124, the class classifier 144 class classifies the target pixel according to the class tap for the target pixel and outputs the class code responsive to the obtained class to the multiplication and summation unit 145. Processing proceeds to step S125.

In step S125, the multiplication and summation unit 145 reads the target pixel from the supervisor data memory 133, and performs the multiplication and summation process on the target pixel and the student data forming the predictive tap selected for the target pixel supplied from the tap selector 142 in accordance with equation (8) for each class code supplied from the class classifier 144. Processing proceeds to step S126.

In step S126, the target pixel selector 141 determines whether the supervisor data memory 133 still stores the supervisor data not yet selected as a target pixel. If it is determined in step S126 that the supervisor data memory 133 still stores the supervisor data not yet selected as a target pixel, processing returns to step S122. The same process described above is repeated.

If it is determined in step S126 that that the supervisor data memory 133 does not store the supervisor data not yet selected as a target pixel, the multiplication and summation unit 145 supplies to the tap coefficient calculator 146 the matrix on the left side and the vector on the right side of equation (8) obtained for each class through steps S122 through S126. Processing proceeds to step S127.

In step S127, the tap coefficient calculator 146 solves the normal equation composed of the matrix on the left side and the vector on the right side of the normal equation (8) for each class supplied from the multiplication and summation unit 145. The tap coefficient calculator 146 thus determines the tap coefficient $w_n$ for each class. Processing thus ends.

A class having insufficient number of normal equations for determining the tap coefficient can be caused due to insufficient number of pieces of learning image data. In such a class, the tap coefficient calculator 146 may output a default tap coefficient.

Figure 30:
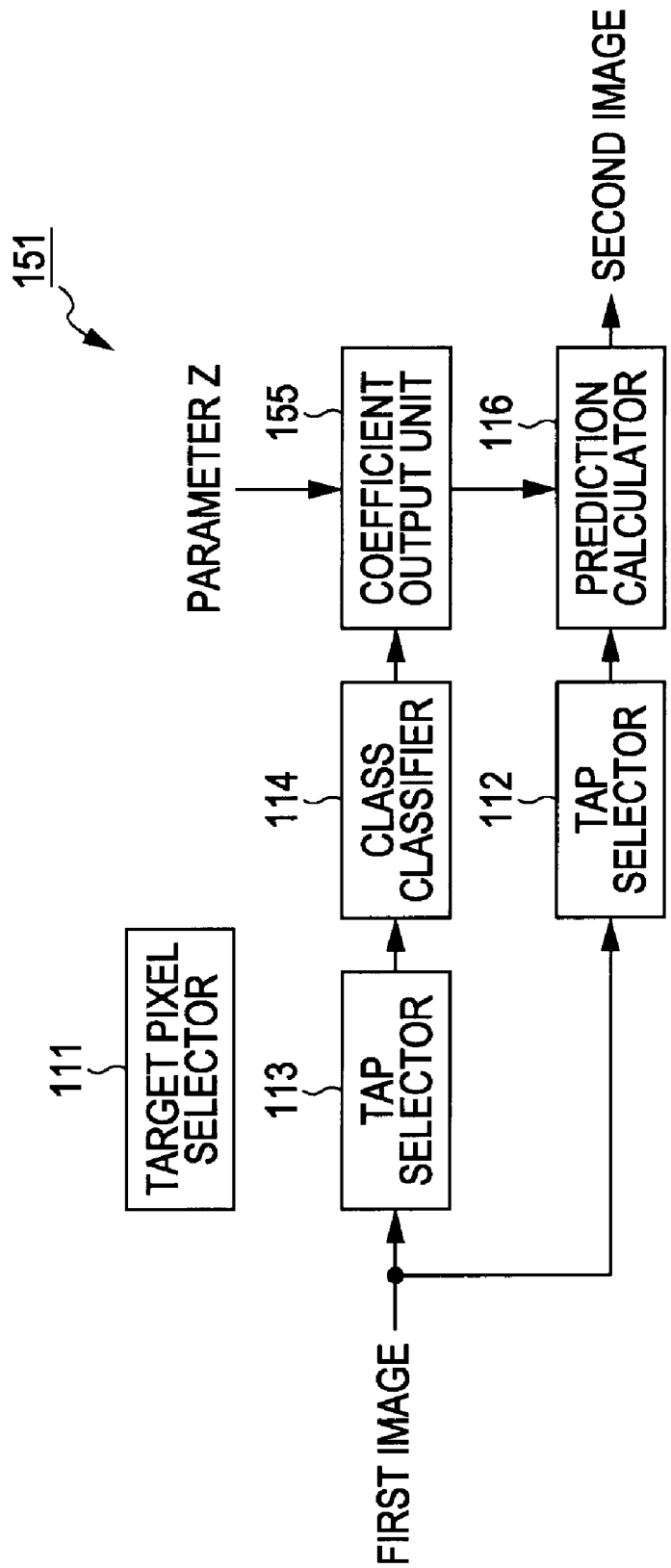
FIG. 30 is a block diagram illustrating an image converting apparatus converting an image in accordance with class classification adaptive process.

FIG. 30 illustrates the structure of another information converting apparatus 151 performing the image conversion process through class classification adaptive process.

As shown in FIG. 30, elements identical to those illustrated in FIG. 24 are designated with the same reference numerals, and the discussion thereof is omitted as appropriate. The information converting apparatus 151 includes a coefficient output unit 155 instead of the coefficient output unit 115. The rest of the information converting apparatus 151 remains unchanged from the image conversion apparatus 101 of FIG. 24.

The coefficient output unit 155 receives the class (code) from the class classifier 114 and a parameter z input from the outside in response to a user operation or other operation. As will be described later, the coefficient output unit 155 generates the tap coefficient for each class responsive to the parameter z. The coefficient output unit 155 outputs to the prediction calculator 116 tap coefficients of the class from the class classifier 114, from among the tap coefficients of the classes.

Figure 31:
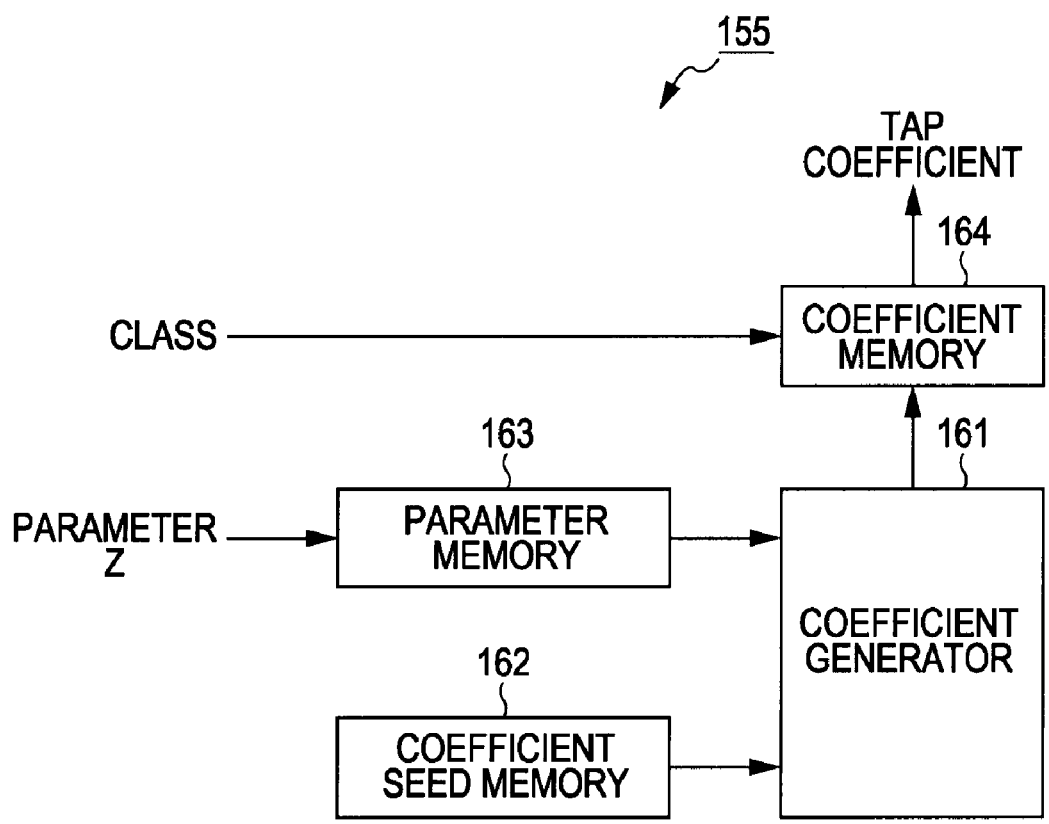
FIG. 31 is a block diagram illustrating a coefficient output unit in the image converting apparatus.

FIG. 31 illustrates the structure of the coefficient output unit 155 of FIG. 30.

A coefficient generator 161 generates the tap coefficient for each class based on coefficient seed data stored on a coefficient seed memory 162 and the parameter z stored on a parameter memory 163 and stores the tap coefficient for each class on a coefficient memory 164 in a overwrite fashion.

The coefficient seed memory 162 stores the coefficient seed data for each class obtained through the learning of the coefficient seed data to be discussed later. The coefficient seed data serves as a seed for generating the tap coefficient.

The parameter memory 163 stores the parameter z input from the outside in response to the user operation or other operation in an overwrite fashion.

A coefficient memory 164 stores the tap coefficient for each class supplied from the coefficient generator 161 (tap coefficient for each class responsive to the parameter z). The coefficient memory 164 reads the tap coefficient of the class supplied from the class classifier 114 (FIG. 30) and then outputs the tap coefficient to the prediction calculator 116 (FIG. 30).

When the coefficient output unit 155 in the information converting apparatus 151 of FIG. 30 receives the parameter z from the outside, the information converting apparatus 151 of FIG. 30 stores the received parameter z on the parameter memory 163 in the coefficient output unit 155 (FIG. 31) in an overwrite fashion.

When the parameter z is stored on the parameter memory 163 (the content of the parameter memory 163 is updated), the coefficient generator 161 reads the coefficient seed data for each class from the coefficient seed memory 162 while also reading the parameter z from the parameter memory 163. The coefficient generator 161 determines the tap coefficient for each class based on the coefficient seed data and the parameter z. The coefficient generator 161 supplies the tap coefficient for each class to the coefficient memory 164 for storage in an overwrite fashion.

The information converting apparatus 151 stores the tap coefficient. The coefficient output unit 155 in the information converting apparatus 151 performs the same process as the one illustrated in the flowchart of FIG. 25 performed by the image conversion apparatus 101 of FIG. 24 except that the tap coefficient responsive to the parameter z is generated and output.

The prediction calculation of the prediction calculator 116 of FIG. 30, the tap coefficient generation of the coefficient generator 161 of FIG. 31 and the learning of the coefficient seed data stored on the coefficient seed memory 162 are described below.

In accordance with the embodiment illustrated in FIG. 24, the second image data is the high definition image data and the first image data is the low definition image data that results from lowering the high definition image data in spatial resolution. The predictive tap is selected from the low definition image data. Using the predictive tap and the tap coefficient, the pixel value of the high definition pixel of the high definition image data is determined (predicted) in accordance with the linear prediction calculation expressed in equation (1).

The pixel value y of the high definition pixel may also be determined using quadratic or higher order equation instead of the linear equation (1).

In accordance with the embodiment illustrated in FIG. 31, the tap coefficient $w_n$ is generated from the coefficient seed data stored on the coefficient seed memory 162 and the parameter z stored on the parameter memory 163. The coefficient generator 161 herein generates the tap coefficient $w_n$ in accordance with the following equation (9) using the coefficient seed data and the parameter z.

$$w_n = \sum_{m=1}^{M} \beta_{m,n} z^{m-1} \quad (9)$$

where $\beta_{m,n}$ represents m-th coefficient seed data used to determine the n-th tap coefficient $w_n$. In equation (9), the tap coefficient $w_n$ may be determined using M pieces of coefficient seed data $\beta_{1,n}, \beta_{2,n}, \ldots \beta_{M,n}$.

The equation for determining the tap coefficient $w_n$ from the coefficient seed data $\beta_{m,n}$ and the parameter z are not limited to equation (9).

A value $z^{m-1}$ determined by the parameter z in equation (9) is defined by introducing a new variable $t_m$ by the following equation (10):

$$t_m = z^{m-1} (m = 1, 2, \ldots, M) \quad (10)$$

The following equation (11) is obtained by combining equations (9) and (10):

$$w_n = \sum_{m=1}^{M} \beta_{m,n} t_m \quad (11)$$

In accordance with equation (11), the tap coefficient $w_n$ is determined from an linear equation of the coefficient seed data $\beta_{m,n}$ and the variable $t_m$.

Let $y_k$ represent the true value of the pixel value of the high definition pixel of the k-th sample and $y_k'$ represent the predictive value of the true value $y_k$ obtained from equation (1), and the predictive error $e_k$ is expressed by the following equation (12):

$$e_k = y_k - y_k' \quad (12)$$

The predictive value $y_k'$ in equation (12) is calculated in accordance with equation (1). If the predictive value $y_k'$ in equation (12) is expressed in accordance with equation (1), the following equation (13) results:

$$e_k = y_k - \left( \sum_{n=1}^{N} w_n x_{n,k} \right) \quad (13)$$

where $x_{n,k}$ represents an n-th low definition pixel forming the predictive tap for the high definition pixel of the k-th sample.

By substituting equation (11) for $w_n$ in equation (13), the following equation (14) results:

$$e_k = y_k - \left( \sum_{n=1}^{N} \left( \sum_{m=1}^{M} \beta_{m,n} t_m \right) x_{n,k} \right) \quad (14)$$

The coefficient seed data $\beta_{m,n}$ making the predictive error $e_k$ in equation (14) zero becomes optimum in the prediction of a high definition pixel. It is generally difficult to determine such coefficient seed data $\beta_{m,n}$ for all high definition pixels.

The least squares method may be used to determine optimum tap coefficient $w_n$. The optimum tap coefficient $w_n$ may be determined by minimizing the sum E of squared error expressed by the following equation (15):

$$E = \sum_{k=1}^{K} e_k^2 \quad (15)$$

where K represents the number of samples of set composed of the high definition pixel $y_k$ and low definition pixels $x_{1k}, x_{2k}, \ldots, x_{Nk}$ forming the predictive tap of the high definition pixel $y_k$ (namely, the number of learning samples).

As expressed in equation (15), the minimum value of the total sum E of the squared errors of equation (15) is determined by partial differentiating the total sum E by the tap coefficient $w_n$ and by making the result equal to zero as follows:

$$\frac{\partial E}{\partial \beta_{m,n}} = \sum_{k=1}^{K} 2 \cdot \frac{\partial e_k}{\partial \beta_{m,n}} \cdot e_k = 0 \quad (16)$$

If equation (13) is combined with equation (16), the following equation (17) results:

$$\sum_{k=1}^{K} t_m x_{n,k} e_k = \sum_{k=1}^{K} t_m x_{n,k} \left( y_k - \left( \sum_{n=1}^{N} \left( \sum_{m=1}^{M} \beta_{m,n} t_m \right) x_{n,k} \right) \right) = 0 \quad (17)$$

$X_{i,p,j,q}$ and $Y_{i,p}$ are defined by equations (18) and (19), respectively:

$$X_{i,p,j,q} = \sum_{k=1}^{K} x_{i,k} t_p x_{j,k} t_q \quad (18)$$

$(i = 1, 2, \cdots, N; j = 1, 2, \cdots, N; p = 1, 2, \cdots, M; q = 1, 2, \cdots, M)$ $$Y_{i,p} = \sum_{k=1}^{K} x_{i,k} t_p y_k \quad (19)$$

Equation (17) is expressed by the normal equation (20) using $X_{i,p,j,q}$ and $Y_{i,p}$:

$$\begin{bmatrix} X_{1,1,1,1} & X_{1,1,1,2} & \cdots & X_{1,1,1,M} & X_{1,1,2,1} & \cdots & X_{1,1,N,M} \\ X_{1,2,1,1} & X_{1,2,1,2} & \cdots & X_{1,2,1,M} & X_{1,2,2,1} & \cdots & X_{1,2,N,M} \\ \vdots & \vdots & \ddots & \vdots & \vdots & & \vdots \\ X_{1,M,1,1} & X_{1,M,1,2} & \cdots & X_{1,M,1,M} & X_{1,M,2,1} & \cdots & X_{1,M,N,M} \\ X_{2,1,1,1} & X_{2,1,1,2} & \cdots & X_{2,1,1,M} & X_{2,1,2,1} & \cdots & X_{2,1,N,M} \\ \vdots & \vdots & & \vdots & \vdots & \ddots & \vdots \\ X_{N,M,1,1} & X_{N,M,1,2} & \cdots & X_{N,M,1,M} & X_{N,M,2,1} & \cdots & X_{N,M,N,M} \end{bmatrix} \begin{bmatrix} \beta_{1,1} \\ \beta_{2,1} \\ \vdots \\ \beta_{M,1} \\ \beta_{1,2} \\ \vdots \\ \beta_{M,N} \end{bmatrix} = \quad (20)$$

$$\begin{bmatrix} Y_{1,1} \\ Y_{1,2} \\ \vdots \\ Y_{1,M} \\ Y_{2,1} \\ \vdots \\ Y_{N,M} \end{bmatrix}$$

The normal equation (20) may be solved for the coefficient seed data $\beta_{m,n}$ using sweep method (Gauss-Jordan elimination).

The information converting apparatus 151 of FIG. 30 uses as the supervisor data a large number of high definition pixels $y_1, y_2, \ldots, y_K$ serving as a supervisor and, as the student data, low definition pixels $x_{1k}, x_{2k}, \ldots, x_{Nk}$ forming the predictive tap for each high definition pixel $y_k$ serving as a student. The information converting apparatus 151 writes and solves the normal equation (20) for each class for the coefficient seed data $\beta_{m,n}$. The coefficient seed memory 162 in the coefficient output unit 155 (FIG. 31) stores the coefficient seed data $\beta_{m,n}$. In accordance with equation (9), the coefficient generator 161 generates the tap coefficient for each class based on the coefficient seed data $\beta_{m,n}$ and the parameter z stored on the parameter memory 163. The prediction calculator 116 calculates equation (1) using the tap coefficient $w_n$ and the low definition pixel $x_n$ forming the predictive tap for the target pixel as the high definition pixel (pixel of the first image data). The prediction calculator 116 thus determines (the predictive value close to) the pixel value as a high definition pixel.

Figure 32:
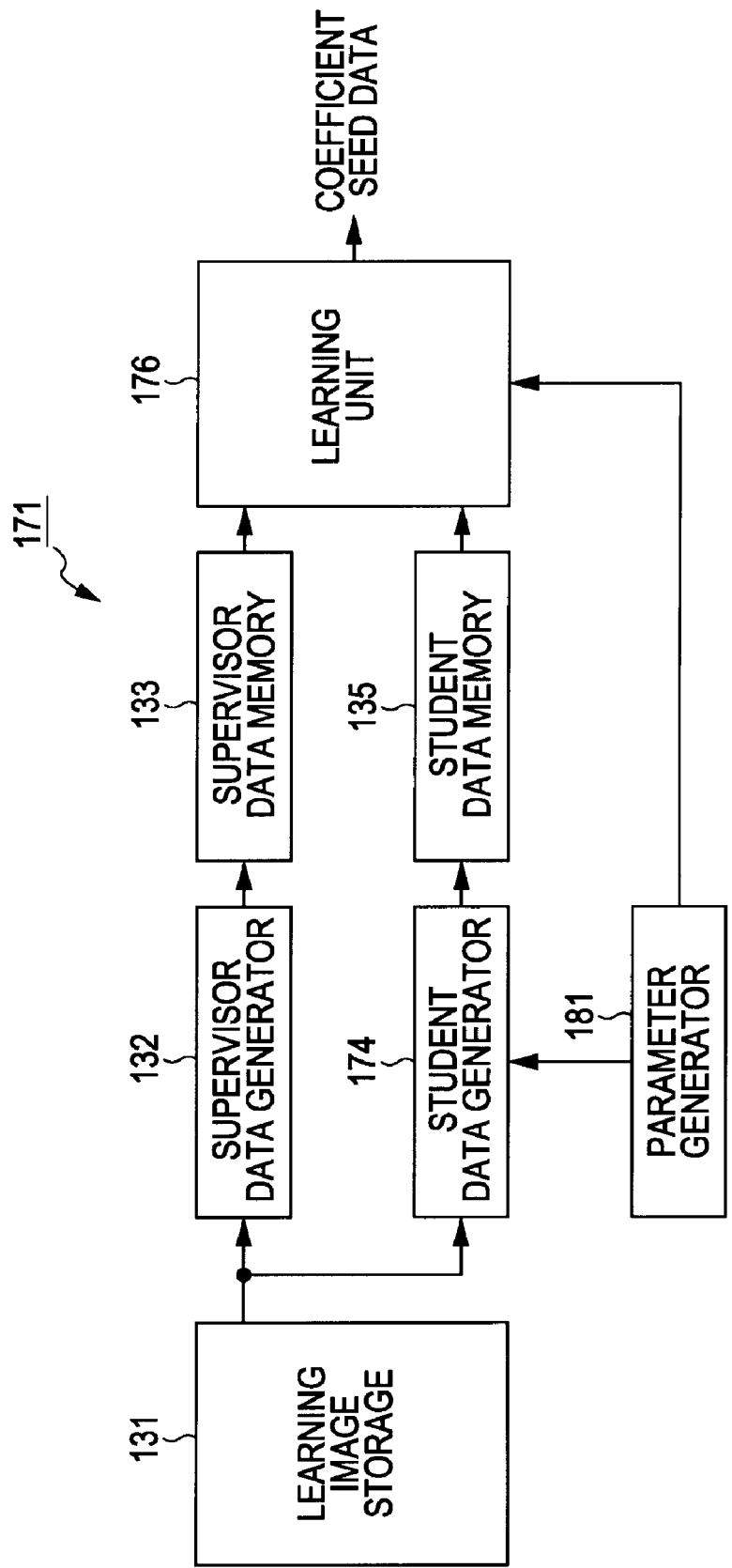
FIG. 32 is a block diagram illustrating a learning apparatus learning coefficient seed data.

FIG. 32 illustrates a learning apparatus 171 that performs a learning process for determining the coefficient seed data $\beta_{m,n}$ for each class by writing and solving the normal equation (20) for each class.

As shown in FIG. 32, elements identical to those in the learning apparatus 121 of FIG. 26 are designated with the same reference numerals, and the discussion thereof is omitted as appropriate. More specifically, the learning apparatus 171 includes a parameter generator 181 and a student data generator 174 (instead of the student data generator 134) and a learning unit 176 (instead of the learning unit 136).

As the student data generator 134 of FIG. 26, the student data generator 174 generates the supervisor data from the learning image data and supplies the supervisor data to the student data memory 135.

The student data generator 174 receives the learning image data. The student data generator 174 further receives, from the parameter generator 181, several values falling within a range the parameter z supplied from the parameter memory 163 of FIG. 31 can take. If the range the parameter z can take is real number, the student data generator 174 receives z=0, 1, 2, ..., Z from the parameter generator 181.

The student data generator 174 generates the low definition image data as the student data by filtering the high definition image data as the learning image data through a low-pass filter (LPF) having a cutoff frequency corresponding to the supplied parameter z.

The student data generator 174 generates the low definition image data as the student data of (Z+1) types different in spatial resolutions in response to the high definition image data as the learning image data.

The larger the value of the parameter z, the higher the cutoff frequency of the LPF becomes. Using such an LPF, the high definition image data is filtered to generate the low definition image data as the student data. Therefore, the larger the value of the parameter z, the higher the low definition image data becomes in spatial resolution.

In accordance with the present embodiment, the student data generator 174 generates the low definition image data that is obtained by lowering the high definition image data in spatial resolution both in a horizontal direction and a vertical direction by an amount corresponding to the parameter z.

The learning unit 176 determines the coefficient seed data for each class using the supervisor data stored on the supervisor data memory 133, the student data stored on the student data memory 135, and the parameter z supplied from the parameter generator 181.

The parameter generator 181 generates several values falling within the range of the parameter z, for example, z=0, 1, 2, ..., Z and then supplies the values to each of the student data generator 174 and the learning unit 176.

Figure 33:
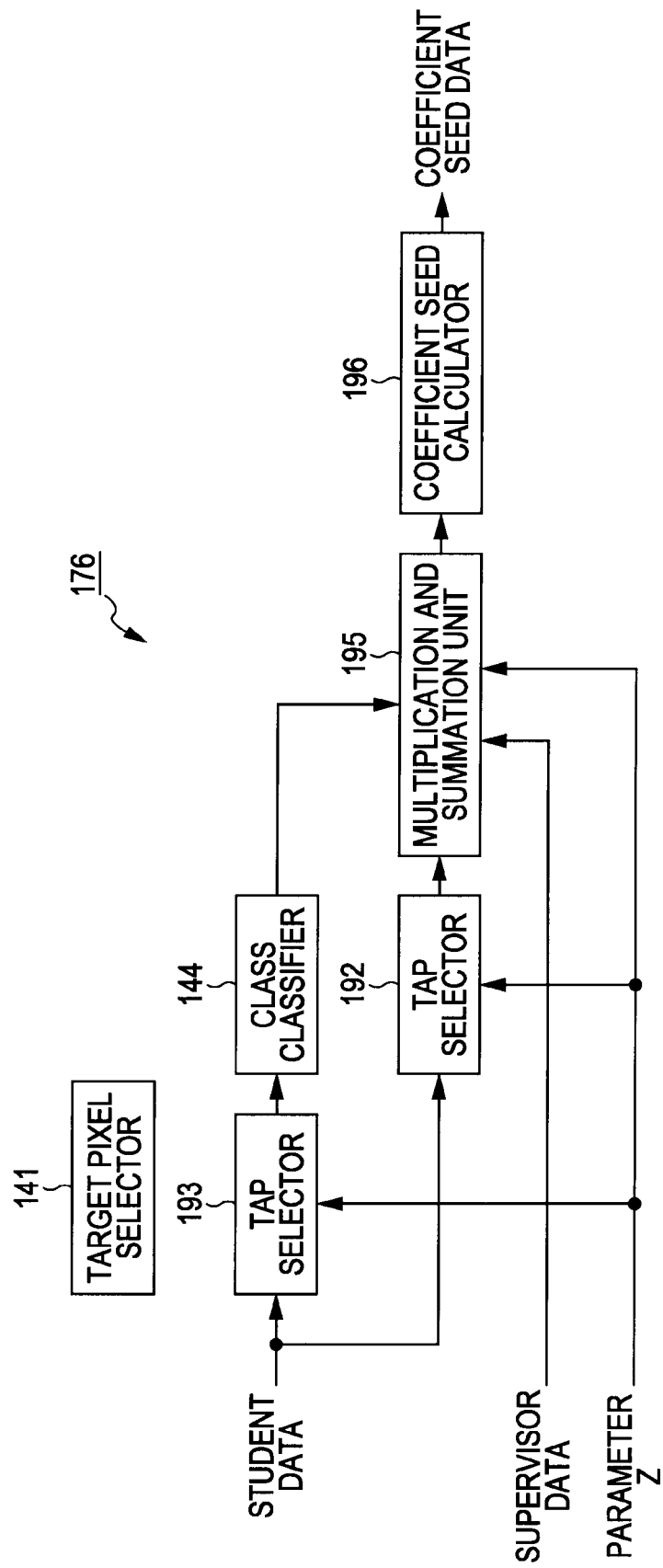
FIG. 33 is a block diagram illustrating a learning unit in the learning apparatus.

FIG. 33 illustrates the structure of the learning unit 176 of FIG. 32. As shown in FIG. 33, elements identical to those in the learning unit 136 of FIG. 27 are designated with the same reference numerals, and the discussion thereof is omitted as appropriate.

In connection with the target pixel, a tap selector 192 selects the predictive tap having the same tap structure as the one selected by the tap selector 112 of FIG. 30 from the low definition pixels forming the low definition image data as the student data stored on the student data memory 135, and supplies the selected predictive tap to the multiplication and summation unit 195.

In connection with the target pixel, a tap selector 193 selects the class tap having the same tap structure as the one selected by the tap selector 113 of FIG. 30 from the low definition pixels forming the low definition image data as the student data stored on the student data memory 135 and supplies the selected class tap to the class classifier 144.

As shown in FIG. 33, the parameter z generated by the parameter generator 181 of FIG. 32 is supplied to each of the tap selector 192 and the tap selector 193. The tap selector 192 and the tap selector 193 select the predictive tap and the class tap respectively from the student data generated in response to the parameter z supplied from the parameter generator 181 (the low definition image data as the student data generated using the LPF having the cutoff frequency corresponding to the parameter z).

The multiplication and summation unit 195 reads the target pixel from the supervisor data memory 133 of FIG. 32. The multiplication and summation unit 195 performs the multiplication and summation process on the read target pixel, the student data forming the predictive tap for the target pixel supplied from the tap selector 192, and the parameter z at the generation of the student data, for each class supplied from the class classifier 144.

The multiplication and summation unit 195 receives the supervisor data $y_k$ stored as the target pixel on the supervisor data memory 133, predictive tap $x_{i,k}$ ($x_{j,k}$) for the target pixel output from the tap selector 192, the class of the target pixel output from the class classifier 144, and the parameter z from the parameter generator 181 at the generation of the student data forming the predictive tap for the target pixel.

Using the predictive tap (student data) $x_{i,k}$ ($x_{j,k}$) and the parameter z for each class supplied from the class classifier 144, the multiplication and summation unit 195 performs multiplication ($x_{i,k}t_p x_{j,k}t_q$) and summation ($\Sigma$) in the matrix on the left side of equation (20) on the student data and the parameter z for determining component $X_{i,p,j,q}$ defined by equation (18). Here, $t_p$ in equation (18) is calculated from the parameter z in accordance with equation (10). The same is true of $t_q$ in equation (18).

Using the predictive tap (student data) $x_{i,k}$, the supervisor data $y_k$ and the parameter z for each class supplied from the class classifier 144, the multiplication and summation unit 195 performs multiplication ($x_{i,k} t_p y_k$) and summation ($\Sigma$) in the vector on the right side of equation (20) on the student data $x_{i,k}$, the supervisor data $y_k$ and the parameter z for determining component $Y_{i,p}$ defined by equation (19). Here, $t_p$ in equation (19) is calculated from the parameter z in accordance with equation (10).

The multiplication and summation unit 195 stores, on an internal memory (not shown), the component $X_{i,p,j,q}$ in the matrix on the left side and the component $Y_{i,p}$ in the vector on the right side of equation (20) determined for the supervisor data as the target pixel. To the component $X_{i,p,j,q}$ in the matrix and the component $Y_{i,p}$ in the vector, the multiplication and summation unit 195 sums the component $x_{i,k} t_p x_{j,k} t_q$ or $x_{i,k} t_p y_k$ calculated using the supervisor data $y_k$, the student data $x_{i,k}$ ($x_{j,k}$) and the parameter z relating to supervisor data as a new target pixel (summation performed in the component $X_{i,p,j,q}$ of equation (18) or component $Y_{i,p}$ of equation (19)).

The multiplication and summation unit 195 performs the multiplication and summation process on all the supervisor data stored as the target pixel on the supervisor data memory 133 for all the values of the parameter z including 0, 1, . . . , Z. The multiplication and summation unit 195 thus writes the normal equation (20) for each class and then supplies the normal equation (20) to the coefficient seed generator 196.

The coefficient seed calculator 196 determines the coefficient seed data $\beta_{m,n}$ for each class by solving the normal equation of each class supplied from the multiplication and summation unit 195.

Figure 34:
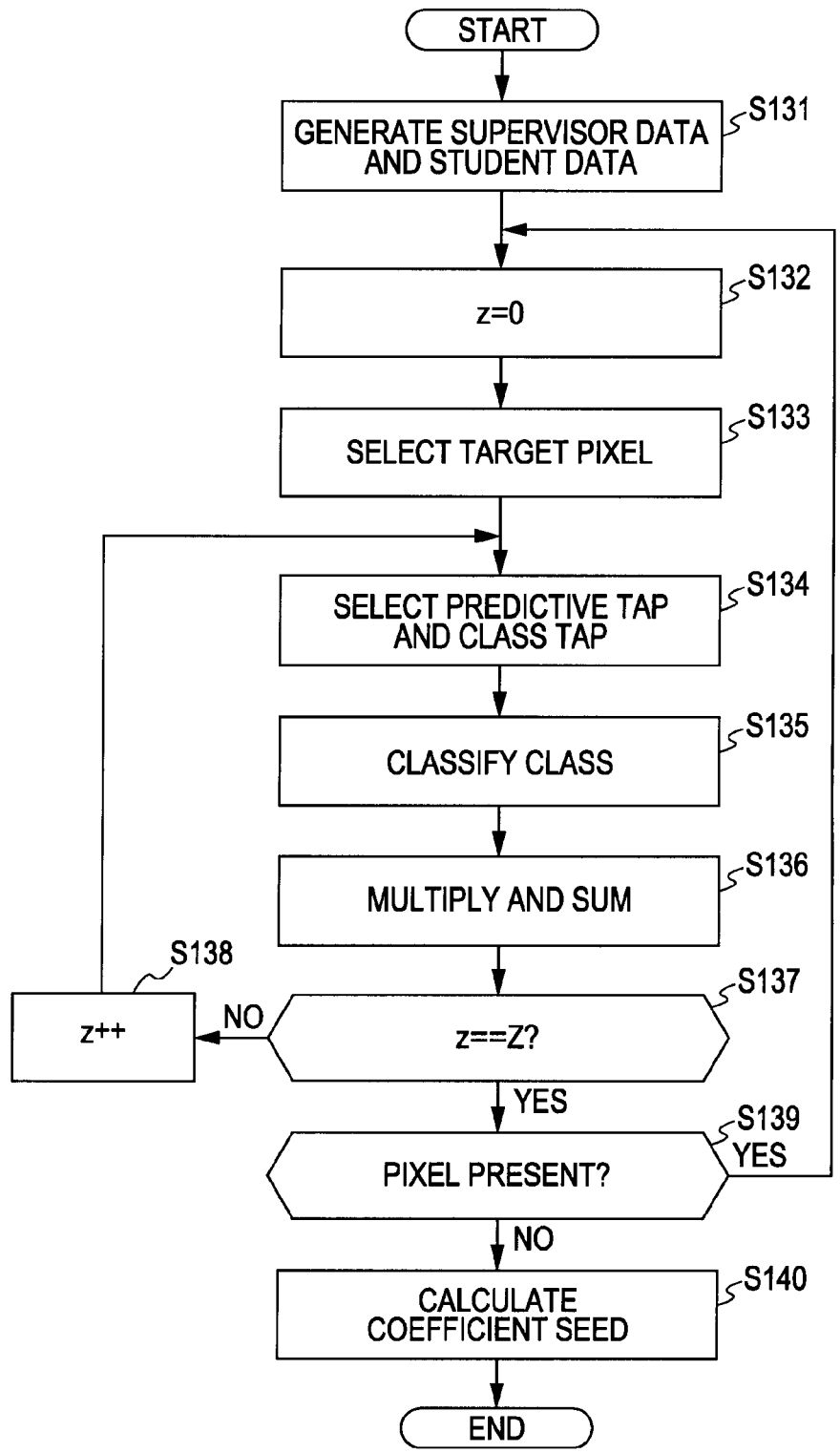
FIG. 34 is a flowchart illustrating a learning process of the learning apparatus.

The learning process of the learning apparatus 171 of FIG. 32 is described below with reference to a flowchart of FIG. 34.

In step S131, the supervisor data generator 132 and the student data generator 174 respectively generate the supervisor data and the student data from the learning image data stored on the learning image storage 131 and output respectively generated data. More specifically, the supervisor data generator 132 directly outputs the learning image data as the supervisor data. The student data generator 174 receives the parameter z having (Z+1) values generated by the parameter generator 181. The student data generator 174 filters the learning image data using the LPF having a cutoff frequency corresponding to the parameter z having (Z+1) values (0, 1, . . . , Z) from the parameter generator 181, thereby generating and outputting the student data of the (Z+1) frames regarding the supervisor data (learning image data) of each frame.

The supervisor data output by the supervisor data generator 132 is supplied to the supervisor data memory 133 for storage, and the student data output by the student data generator 174 is supplied to the student data memory 135 for storage.

In step S132, the parameter generator 181 sets the parameter z to an initial value such as zero, and then supplies the parameter z to each of the tap selector 192, the tap selector 193 and the multiplication and summation unit 195 in the learning unit 176 (FIG. 33). Processing proceeds to step S133. In step S133, the target pixel selector 141 sets, as a target pixel, one of the pixels not yet selected as a target pixel, in the supervisor data stored on the supervisor data memory 133. Processing proceeds to step S134.

In step S134, the tap selector 192 selects a predictive tap from the student data corresponding to the parameter z stored on the student data memory 135 and output from the parameter generator 181 (the student data being generated by filtering the learning image data corresponding to the supervisor data selected as the target pixel using the LPF having the cutoff frequency corresponding to the parameter z) and then supplies the selected predictive tap to the multiplication and summation unit 195. Also in step S134, the tap selector 193 selects the class tap from the student data corresponding to the parameter z, stored by the student data memory 135 and output by the parameter generator 181 with reference to the target pixel and supplies the selected class tap to the class classifier 144.

In step S135, the class classifier 144 class classifies the target pixel based on the class tap with reference to the target pixel and outputs the class of the resulting target pixel to the multiplication and summation unit 195. Processing proceeds to step S136.

In step S135, the multiplication and summation unit 195 reads the target pixel from the supervisor data memory 133. The multiplication and summation unit 195 calculates the component $x_{i,K} t_p x_{j,K} t_q$ in the matrix on the left side of equation (20) and the component $x_{i,K} t_p y_K$ of the vector on the right side of equation (20) using the target pixel, the predictive tap supplied from the tap selector 192 and the parameter z output from the parameter generator 181. Furthermore, the multiplication and summation unit 195 sums the component $x_{i,K} t_p x_{j,K} t_q$ of the matrix and the component $x_{i,K} t_p y_K$ of the vector, determined from the target pixel, the predictive tap and the parameter z, to components of the class of the target pixel from the class classifier 144, from among the already obtained components of the matrix and the already obtained components of the vector. Processing proceeds to step S137.

In step S137, the parameter generator 181 determines whether the parameter z output by the parameter generator 181 itself equals Z that is a maximum value the parameter z can take. If it is determined in step S137 that the parameter z output by the parameter generator 181 is not equal to (less than) a maximum value Z, processing proceeds to step S138. The parameter generator 181 adds 1 to the parameter z, sets the resulting sum as a new parameter z, and outputs the new parameter z to each of the tap selector 192, the tap selector 193 and the multiplication and summation unit 195 in the learning unit 176 (FIG. 33). Processing returns to step S134 to repeat step S134 and subsequent steps.

If it is determined in step S137 that the parameter z is the maximum value Z, processing proceeds to step S139. The target pixel selector 141 determines whether the supervisor data memory 133 stores the supervisor data not yet selected as a target pixel. If it is determined in step S139 that the supervisor data not yet selected as the target pixel is still stored on the supervisor data memory 133, processing returns to step S132 to repeat step S132 and subsequent steps.

If it is determined in step S139 that the supervisor data not yet selected as the target pixel is not stored on the supervisor data memory 133, the multiplication and summation unit 195 supplies to the coefficient seed calculator 196 the matrix on the left side and the vector on the right side of equation (20) obtained heretofore for each class and proceeds to step S140.

In step S140, the coefficient seed calculator 196 solves the normal equation for each class composed of the matrix on the left side and the vector on the right side of equation (20) supplied from the multiplication and summation unit 195, thereby generating and outputting the coefficient seed data $\beta_{m,n}$ for each class. Processing thus ends.

The number of normal equations required to determine the coefficient seed data may be insufficient in some classes due to insufficient number of pieces of learning image data. In such a class, the coefficient seed calculator 196 outputs default coefficient seed data.

The size conversion of the image converter 24 (FIGS. 2 and 16) is performed through the above-described class classification adaptive process.

The image converter 24 performs the size conversion operation by performing the class classification adaptive process. The learning apparatus 171 of FIG. 32 learns the coefficient seed data on supervisor data and student data. Given image data may serve as the supervisor data and image data that is obtained by decimating the supervisor data in pixel count in accordance with the parameter z may serve as student data. Alternatively, image data having a predetermined size may serve student data and image data that is obtained by decimating the student data in pixel count at a decimation ratio corresponding to the parameter z may serve supervisor data.

The image converter 24, including the information converting apparatus 151 of FIG. 30, stores the coefficient seed data determined through the learning process on the coefficient seed memory 162 (FIG. 31). The coefficient seed memory 162 forms the coefficient output unit 155 in the information converting apparatus 151 (FIG. 30) as the image converter 24.

The image format detector 26 (FIGS. 2 and 16) supplies the information converting apparatus 151 as the image converter 24 with a conversion coefficient, as the parameter z, for equalizing one of the horizontal pixel count and the vertical pixel count of the input image to one of the horizontal pixel count and the vertical pixel count of the display screen of the display 29. In this way, by performing the class classification adaptive process, the information converting apparatus 151 as the image converter 24 performs the size conversion operation to equalize one of the horizontal pixel count and the vertical pixel count of the input image to one of the horizontal pixel count and the vertical pixel count of the display screen of the display 29.

The above-referenced series of process steps may be performed using hardware or software. If the process steps are performed using software, a program of the software may be installed onto a general-purpose personal computer.

Figure 35:
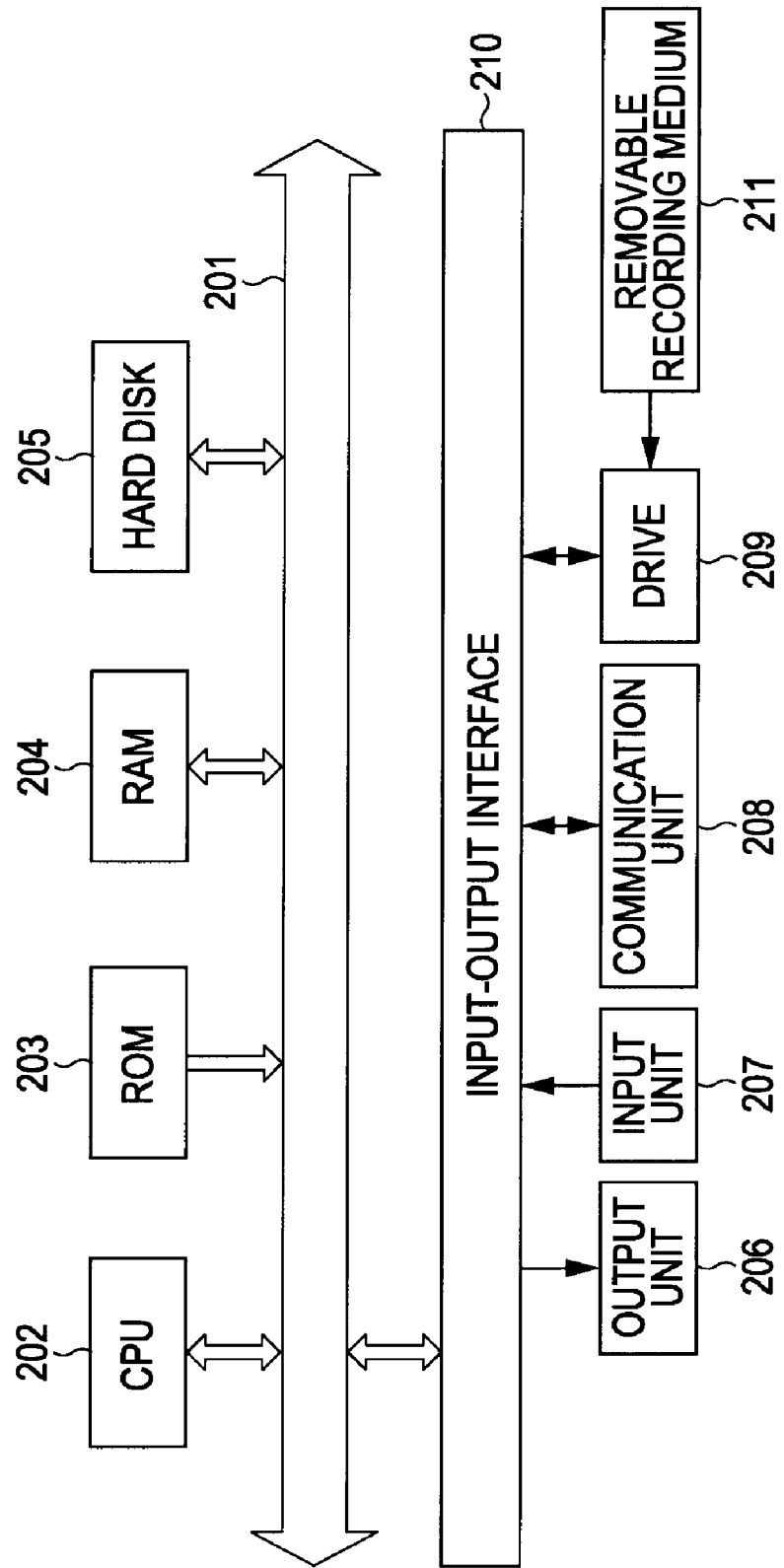
FIG. 35 is a block diagram illustrating a computer in accordance with one embodiment of the present invention.

FIG. 35 is a block diagram illustrating the personal computer executing the above series of process steps in accordance with one embodiment of the present invention.

The program may be pre-stored on one of a hard disk 205 and a read-only memory (ROM) 203 as a recording medium in the computer.

The program may also be stored temporarily or permanently on a removable recording medium 211 such as a flexible disk, a compact disk read only memory (CD-ROM), a magneto-optical (MO) disk, a digital versatile disk (DVD), a magnetic disk or a semiconductor memory. The removable recording medium 211 may be supplied as so-called package software.

The program may be installed from the above-mentioned removable recording medium 211. Alternatively, the program may be transferred to the computer from a download site via a digital broadcasting satellite in a wireless fashion or via a network such as a local area network (LAN) or the Internet in a wired fashion. The computer receives the transferred program using a communication unit 208 and installs the received program on the hard disk 205.

The computer includes a central processing unit (CPU) 202. Upon receiving an instruction in response to an operation performed by a user to the input unit 207 composed of a keyboard, a mouse, a microphone, and the like, the CPU 202 executes a program stored on the read-only memory (ROM) 203. Alternatively, the CPU 202 loads to a random-access memory (RAM) 204 one of the program stored on the hard disk 205, the program transferred via the satellite or the network, received by the communication unit 208 and installed on the hard disk 205, and the program read from the removable recording medium 211 on a drive 209 and installed on the hard disk 205, and then the CPU 202 executes the program loaded on the RAM 204. The CPU 202 thus performs the process in accordance with the above-described flowcharts or the process described with reference to the above-described block diagrams. As appropriate, the CPU 202 outputs the process results from an output unit 206 composed of a liquid-crystal display (LCD), a loudspeaker, and the like via the input-output interface 210, transmits the process results from the communication unit 208, or stores the process results onto the hard disk 205.

The process steps described in this specification is performed in the time-series order sequence as previously stated. Alternatively, the process steps may be performed in parallel or separately.

The program may be performed by a single computer or a plurality of computers in a distributed fashion. Alternatively, the program may be transferred to a remote computer to be performed.

The input image, the equiaspect ratio image and the aspect ratio of the display screen of the display 29 are not limited to 4:3 and 16:9.

If neither the target area outline parameter nor the subject outline parameter is stored on the memory 25A in the additional image generation process of FIGS. 13, 15, 19 and 21, a default additional image is generated. If no subject outline parameter is stored on the memory 25A, an additional image may be generated on the premise that a subject outline having a predetermined size is set at a default position, for example, on the center of (gravity of) the input image.

In accordance with embodiments, the additional image generator 26 performs size conversion on only the target area of the input image to generate the additional image. Alternatively, the entire input image may be size converted, and the additional image may be generated by extracting an area of the size converted image corresponding to the target area.

Japanese Unexamined Patent Application Publication No. 2005-215375 discloses a technique in which the entire image is expanded and a portion of the expanded image is then extracted.

In accordance with embodiments of the present invention, the additional image generator 26 generates the additional image from the image obtained by expanding the target area. Alternatively, the additional image may be generated by contracting the target area.

In accordance with the embodiments, the buffer 23 in the display processing apparatus 20 (FIGS. 2 and 16) receives data broadcast by the terrestrial digital broadcasting system. Furthermore, the buffer 23 may receive data reproduced from a recording medium such as a DVD or the like.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for displaying an input image on a display, comprising:
    image converting means for converting the input image into an equiaspect ratio image, the equiaspect ratio image having a same aspect ratio as the input image, the equiaspect ratio image having one of a horizontal size and a vertical size equal to one of a horizontal size and a vertical size of a display screen of the display, the horizontal and vertical sizes of the equiaspect ratio image being magnified by a same magnification to be equal to or smaller than a size of the display screen;

additional image generating means for generating an additional image from the input image when the equiaspect ratio image is displayed on the display with the aspect ratio thereof unchanged, the additional image having an image size corresponding to an extra area on the display screen that remains unused when displaying the equiaspect ratio image;

combination image generating means for generating a combination image including the equiaspect ratio image after magnification and the additional image, the equiaspect ratio image and the additional image not overlapping in the combined image; and display control means for causing the display to display the combination image, wherein a length and width of the additional image is multiplied by a same magnification factor to cause the additional image to fill the entire extra area.

2. The image processing apparatus according to claim 1, wherein the additional image generating means generates as the additional image an image that results from expanding or contracting part of the input image.

3. The image processing apparatus according to claim 2, further comprising target area setting means for setting as a target area the part of the input image, the part of the input image being expanded or contracted to generate the additional image.

4. The image processing apparatus according to claim 3, wherein the target area setting means sets the target area in response to an operation performed by a user.

5. The image processing apparatus according to claim 3, further comprising:

tracking means for tracking a subject appearing in the part of the input image, wherein the target area setting means sets as the target area an area containing the subject being tracked by the tracking means.

6. An image processing method of displaying an input image on a display, comprising:

converting the input image into an equiaspect ratio image, the equiaspect ratio image having a same aspect ratio as the input image, the equiaspect ratio image having one of a horizontal size and a vertical size equal to one of a horizontal size and a vertical size of a display screen of the display, the horizontal and vertical sizes of the equiaspect ratio image being magnified by a same magnification to be equal to or smaller than a size of the display screen;

generating an additional image from the input image when the equiaspect ratio image is displayed on the display with the aspect ratio thereof unchanged, the additional image having an image size corresponding to an extra area on the display screen that remains unused when displaying the equiaspect ratio image;

multiplying a length and a width of the additional image to cause the additional image to fill the entire extra area;

generating a combination image including the equiaspect ratio image after magnification and the additional image, the equiaspect ratio image and the additional image not overlapping in the combined image; and causing the display to display the combination image.

7. A non-transitory computer-readable medium storing computer-readable instructions thereon, the computer-readable instructions when executed by a computer cause the computer to perform a method comprising:

converting the input image into an equiaspect ratio image, the equiaspect ratio image having a same aspect ratio as the input image, the equiaspect ratio image having one of a horizontal size and a vertical size equal to one of a horizontal size and a vertical size of a display screen of the display, the horizontal and vertical sizes of the equiaspect ratio image being magnified by a same magnification to be equal to or smaller than a size of the display screen;

generating an additional image from the input image when the equiaspect ratio image is displayed on the display with the aspect ratio thereof unchanged, the additional image having an image size corresponding to an extra area on the display screen that remains unused when displaying the equiaspect ratio image;

generating a combination image including the equiaspect ratio image after magnification and the additional image, the equiaspect ratio image and the additional image not overlapping in the combined image; and causing the display to display the combination image, wherein a length and width of the additional image is multiplied by a same magnification factor to cause the additional image to fill the entire extra area.

8. An image processing apparatus for displaying an input image on a display, comprising:

an image converting unit to convert the input image into an equiaspect ratio image, the equiaspect ratio image having a same aspect ratio as the input image, the equiaspect ratio image having one of a horizontal size and a vertical size equal to one of a horizontal size and a vertical size of a display screen of the display, the horizontal and vertical sizes of the equiaspect ratio image being magnified by a same magnification to be equal to or smaller than a size of the display screen;

an additional image generating unit to generate an additional image from the input image when the equiaspect ratio image is displayed on the display with the aspect ratio thereof unchanged, the additional image having an image size corresponding to an extra area on the display screen that remains unused when displaying the equiaspect ratio image;

a combination image generating unit to generate a combination image including the equiaspect ratio image after magnification and the additional image, the equiaspect ratio image and the additional image not overlapping in the combined image; and a display control unit causing the display to display the combination image, wherein the additional image generating unit multiplies a length and width of the additional image by a same magnification factor to cause the additional image to fill the entire extra area.

9. The image processing apparatus according to claim 8, further comprising:

a target area selector to select an area of the input image as a target area from which the additional image is generated, the target area selector setting a size of the target area according to the magnification of the equiaspect ratio image.

10. The image processing apparatus according to claim 9, wherein the target area selector selects target areas in subsequent images corresponding to a location of the target area in the input image.

11. The image processing apparatus according to claim 8, wherein the image converting unit interpolates the input image according to the magnification in order to generate the equiaspect ratio image.

12. The image processing apparatus according to claim 8, wherein the image converting unit decimates the input image according to the magnification in order to generate the equiaspect ratio image.

13. The image processing apparatus according to claim 8, wherein the converting unit uses a classification process to generate the equiaspect ratio image according to the magnification.

14. The image processing apparatus according to claim 13, wherein the converting unit classifies a pixel of the input image according to a predetermined rule and selects a corresponding tap coefficient, a corresponding pixel of the equiaspect ratio image being calculated based on the pixel of the input image and the corresponding tap coefficient.

15. The image processing apparatus according to claim 5, wherein the tracked subject moves in both the equiaspect ratio image and the additional image across successive frames.

16. The image processing apparatus according to claim 5, wherein the tracked object moves in the equiaspect image and is fixed in the additional image across successive frames.

* * * * *